(12) United States Patent
Deguchi

(10) Patent No.: US 9,400,723 B2
(45) Date of Patent: Jul. 26, 2016

(54) STORAGE SYSTEM AND DATA MANAGEMENT METHOD

(75) Inventor: Akira Deguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 514 days.

(21) Appl. No.: 13/500,056

(22) PCT Filed: Mar. 15, 2012

(86) PCT No.: PCT/JP2012/001833
§ 371 (c)(1),
(2), (4) Date: Apr. 3, 2012

(87) PCT Pub. No.: WO2013/136371
PCT Pub. Date: Sep. 19, 2013

(65) Prior Publication Data

US 2013/0246710 A1 Sep. 19, 2013

(51) Int. Cl.
*G06F 12/08* (2016.01)
*G06F 11/20* (2006.01)

(52) U.S. Cl.
CPC ........ *G06F 11/2074* (2013.01); *G06F 12/0866* (2013.01); *G06F 2201/855* (2013.01)

(58) Field of Classification Search
CPC .............. G06F 12/0848; G06F 12/023; G06F 12/0866; G06F 11/2074; G06F 2201/855
USPC ........................... 711/129, E12.046, 153, 170
See application file for complete search history.

(56) References Cited

U.S. PATENT DOCUMENTS

| | | | |
|---|---|---|---|
| 6,035,412 A | 3/2000 | Tamer et al. | |
| 6,480,936 B1 * | 11/2002 | Ban et al. | 711/118 |
| 6,732,124 B1 | 5/2004 | Koseki et al. | |
| 7,152,079 B2 | 12/2006 | Hirakawa et al. | |
| 2007/0079088 A1 | 4/2007 | Deguchi et al. | |

FOREIGN PATENT DOCUMENTS

| | | |
|---|---|---|
| JP | H05-342135 A | 12/1993 |
| JP | 2006-318491 A | 11/2006 |

OTHER PUBLICATIONS

International Search Report and Written Opinion on application PCT/JP2012/001833 mailed Nov. 30, 2012; 12 pages.
Japan Patent Office action on application 2014-541813 mailed Apr. 21, 2015; pp. 1-4.

* cited by examiner

*Primary Examiner* — Reginald Bragdon
*Assistant Examiner* — Mehdi Namazi
(74) *Attorney, Agent, or Firm* — Foley & Lardner LLP

(57) ABSTRACT

A storage system is provided with a plurality of physical storage devices, a cache memory, a control device that is coupled to the plurality of physical storage devices and the cache memory, and a buffer part. The buffer part is a storage region that is formed by using at least a part of a storage region of the plurality of physical storage devices and that is configured to temporarily store at least one target data element that is to be transmitted to a predetermined target. The control device stores a target data element into a cache region that has been allocated to a buffer region (that is a part of the cache memory and that is a storage region of a write destination of the target data element for the buffer part). The control device transmits the target data element from the cache memory. In the case in which a new target data element is generated, the control device executes a control in such a manner that the new target data element has a high tendency to be stored for a buffer region in which the transmitted target data element has been stored and to which a cache region has been allocated.

11 Claims, 44 Drawing Sheets

| Type | JVOL# | Address |
|---|---|---|
| Leading head address | 1 | 100 |
| End address | 1 | 300 |

1000a  1000b  1000c  1000

JNCB block management information

JNCB current write block information

JNCB current read block information

JNCB current write address information

JNCB current read address information

Fig. 43

Pool table 224

| Page number (224a) | Start address (224b) | End address (224c) | State (224d) | Allocation destination (224e) |
|---|---|---|---|---|
| 1 | 0 | 99 | Allocated | Virtual volume 1 |
| 2 | 100 | 199 | Allocated | Virtual volume 1 |
| 3 | 200 | 299 | Allocated | Virtual volume 5 |
| 4 | 300 | 399 | Unallocated | — |
| ... | ... | ... | ... | ... |

Fig. 44

Virtual volume table 225

| Virtual volume number (225a) | Address (225b) | Page allocation state (225c) | Page number (225d) |
|---|---|---|---|
| 1 | 0~99 | Allocated | 2 |
| 1 | 100~199 | Allocated | 3 |
| 1 | 200-299 | Allocated | 1 |
| 1 | 300-399 | Unallocated | — |

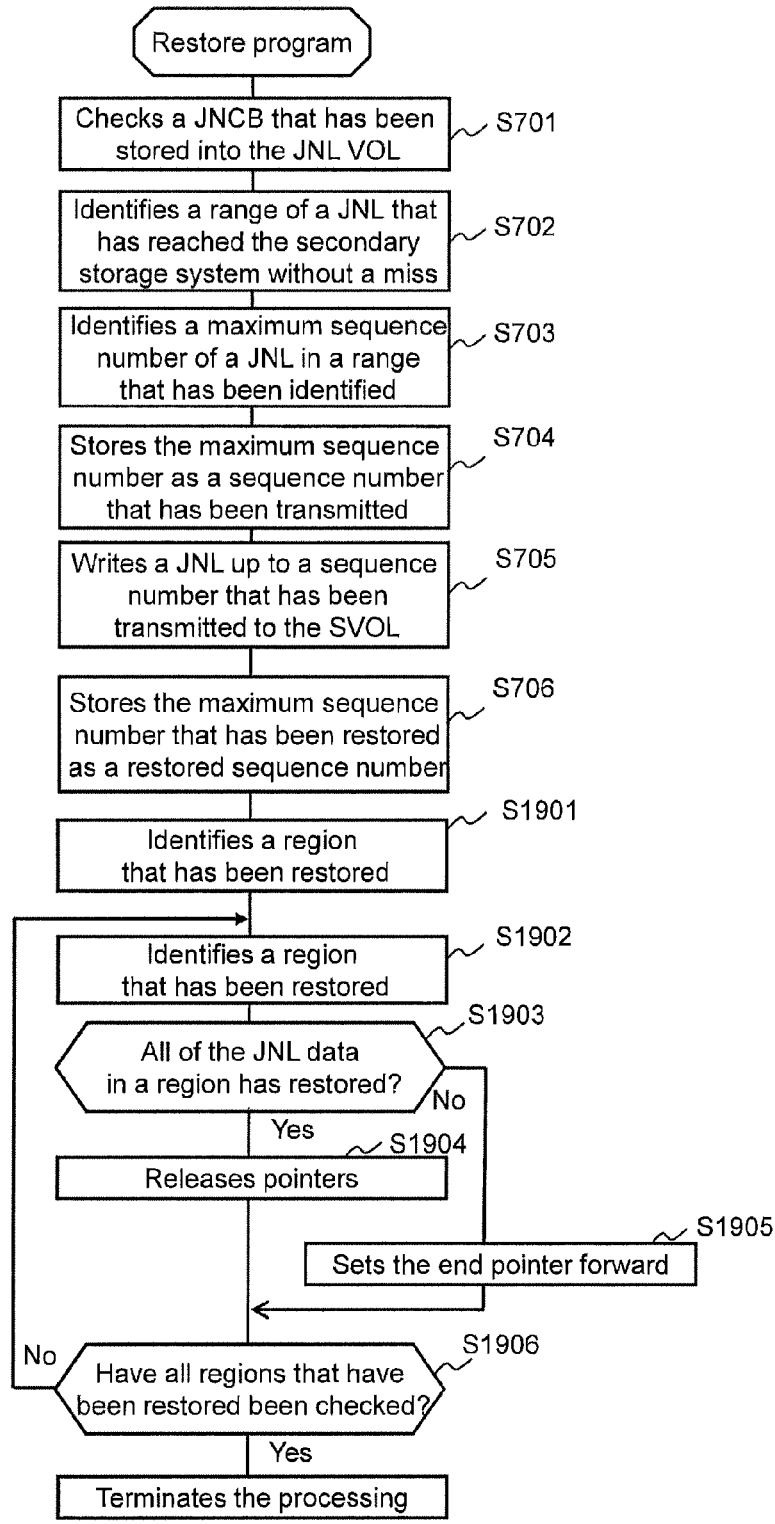

STORAGE SYSTEM AND DATA MANAGEMENT METHOD

TECHNICAL FIELD

The present invention relates to a technique for storing data on a temporary basis into a storage region based on at least a part of a physical storage device.

BACKGROUND ART

A storage system can be provided with a plurality of logical volumes (hereafter referred to as a volume) as a plurality of logical storage devices based on a plurality of nonvolatile physical storage devices (such as an HDD (Hard Disk Drive)). There is a volume that is used as a buffer volume in the plurality of volumes. The buffer volume is a volume that is used as a temporary storage region like a buffer in which data is stored on a temporary basis (see Patent Literature 1 for instance).

A storage system is provided with a cache memory (for instance, a volatile memory) in addition to a physical storage device in general. The storage system receives a write request that specifies a volume from a host computer for instance, stores data (write data) of a write target that conforms to the write request, and returns a response to the host. Hereafter a volume that can be specified by an I/O request (a write request or a read request) from a host computer is referred to as a normal volume in order to distinguish the volume from a buffer volume. The storage system stores write data into a physical storage device that is a basis of a normal volume from a cache memory after responding to the host. A response can be returned to a host after the write data is stored into a normal volume (a physical storage device that is a basis of a normal volume) from a cache memory.

A storage system can also store data that is written to a buffer volume into a cache memory and then store the data from a cache memory to a buffer volume (a physical storage device that is a basis of a buffer volume) at an arbitrary timing in the case in which data is stored into not only a normal volume but also a buffer volume.

There is a journal volume as a buffer volume for instance. A remote copy is to copy a duplicate of a copy source volume (a primary volume) of a primary storage system to a copy destination volume (a secondary volume) of a secondary storage system. For the remote copy, the data of a copy source volume is stored into a journal volume as a journal. A journal volume is used in such a manner that a journal that is corresponded to a write to a primary volume is stored into a leading region at first and other regions in order of precedence for instance. After a journal is stored into a trailing region of a journal volume, the journal volume is used in such a manner a journal is stored into a leading region at first and other regions again.

CITATION LIST

Patent Literature

PTL 1: U.S. Patent Application Laid-Open Publication No. 2007/0079088

SUMMARY OF INVENTION

Technical Problem

In order to store data that is stored into a volume into a cache memory, a cache region (a part of a cache memory) is allocated for a volume region (a part of a volume) that is a write destination of data. The allocation of a cache region is executed by a control device (a processor in a quintessential way) that is included in a storage system.

In the case in which a cache region is newly allocated for a volume region of a write destination every when data is stored into a volume, a cache region is newly allocated for a volume region of a store destination of a journal every when a journal is stored into a journal volume. Consequently, a load is applied to a control device.

Moreover, a cache memory is limited, it is necessary that a cache region that has been allocated and in which a transmitted journal has been stored is released appropriately in order to newly allocate a cache region. This is one of causes of a load to a control device.

Solution of Problem

A storage system is provided with a plurality of physical storage devices, a cache memory, a control device that is coupled to the plurality of physical storage devices and the cache memory, and a buffer part. The buffer part is a storage region that is formed by using at least a part of a storage region of the plurality of physical storage devices and that is configured to temporarily store at least one target data element that is to be transmitted to a predetermined target. The control device executes the following processing (A) to (C):

(A) The control device stores a target data element into a cache region that is a part of the cache memory and that has been allocated to a buffer region that is a storage region of a write destination of the target data element for the buffer part.

(B) The control device transmits the target data element from the cache memory.

(C) In the case in which a new target data element is generated, the control device executes a control in such a manner that the new target data element has a high tendency to be stored for a buffer region in which the transmitted target data element has been stored and to which a cache region has been allocated.

BRIEF DESCRIPTION OF DRAWINGS

FIG. 43 is a view showing an example of a pool table in accordance with the embodiment 4.

FIG. 44 is a view showing an example of a virtual volume management table in accordance with the embodiment 4.

FIG. 55 is a flowchart of a restore processing in accordance with the embodiment 5.

DESCRIPTION OF EMBODIMENTS

Some embodiments will be described with reference to drawings in the following. Any embodiments that will be described in the following do not restrict the invention in accordance with the claims, and all of elements and all of pairs of the elements that will be described in the embodiments are not necessarily essential for the means for solving the problems of the invention.

In the following descriptions, while the information will be described in the expression of "aaa table" in some cases, the information can be represented by other than a data structure such as a table. In order to indicate that the information is not depended on a data structure, the information of "aaa table" or the like can also be referred to as "aaa information".

In the following descriptions, the processing will be described while a program is handled as a subject in some cases. In the case in which the program is executed by a processor, the predetermined processing is executed. Consequently, a subject of a processing can also be a processor. The processing that is disclosed while a program is handled as a subject can also be a processing that is executed by a processor that executes the program or an apparatus that is provided with the processor (for instance, a control device, a controller, and a storage system). Moreover, a part or a whole of a processing that is executed when the processor executes a program can also be executed by a hardware circuit as substitute for or in addition to a processor. A wide variety of programs can be installed to each of the computers by a program distribution server or a storage medium that can be read by a computer.

Embodiment 1

In the first place, a problem of a conventional example and a summary of an embodiment 1 will be described in the following.

Figures 1, 2:
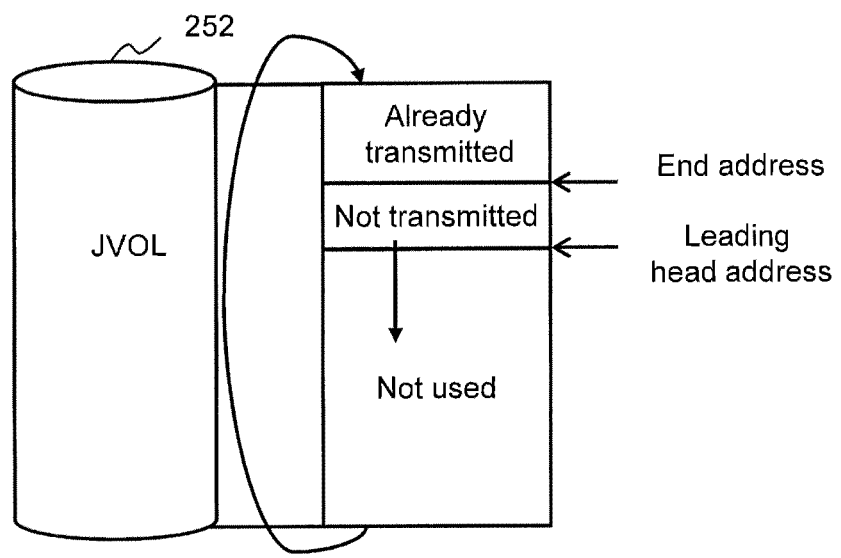
FIG. 1 is a view illustrating a management method of a journal for a journal volume in accordance with a conventional example.
FIG. 2 is a view showing an example of the management information for managing a journal for a journal volume in accordance with a conventional example.

FIG. 1 is a view illustrating a management method of a journal for a journal volume in accordance with a conventional example.

For a management method of a journal in accordance with a conventional example, a JVOL (Journal Volume) 252 that is used as a buffer region for storing a JNL (Journal) on a temporary basis is used by a wraparound method for a primary storage system 200A. In other words, a JNL that has been generated is stored from a leading head address of the JVOL 252 in order of precedence. After a JNL is stored up to the last address, a JNL is stored from a leading head address again. On the other hand, a JNL of a leading head address of the JVOL 252 is taken in order of precedence and is transmitted to a secondary storage system 200B.

FIG. 2 is a view showing an example of the management information for managing a journal for a journal volume in accordance with a conventional example.

The management information 1000 is managed in order to achieve a journal management method that is shown in FIG. 1. The management information 1000 stores a record that is provided with the fields of a type 1000a, a JL number (#) 1000b, and an address 1000c.

The type 1000a stores a type of an address. In this example, a leading head address that indicates an address of a leading head of a free region that is to store a JNL and an end address that indicates an address of an end in which a transmitted JNL has been stored. The JL number (#) 1000b stores a volume number of a JVOL. The address 1000c stores a corresponded address. The volume number is a number for uniquely identifying a volume in the storage system 200.

In the journal management method, a region in which a JNL that has not been transmitted to a secondary storage system 200B has been stored is managed in such a manner that the region is not overwritten by using a leading head address and an end address.

Figure 3:
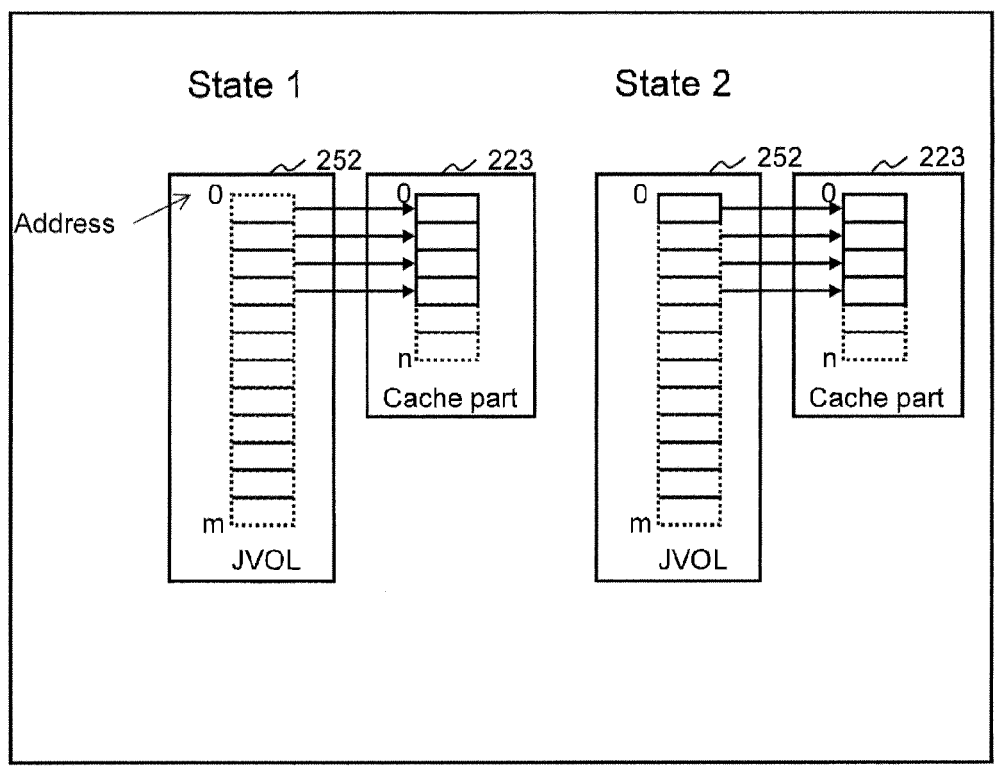
FIG. 3 is a view illustrating a first problem in accordance with a conventional example.

FIG. 3 is a view illustrating a first problem in accordance with a conventional example. In the figure, the rectangles in a volume 252 and a cache part 223 indicate a region in which a JNL is stored. A region in which a JNL has been stored as a practical matter is shown by solid lines and a region in which a JNL has not been stored as a practical matter is shown by dashed lines.

As shown in a state 1 of FIG. 3, in the case in which a JNL that is stored at a leading head of a JVOL 252 is generated, a JNL is not stored into a region of an address to which the JVOL 252 is corresponded, and the JNL is stored into a region of the cache part 223 that has been allocated to the corresponded address.

In the case in which a predetermined time has elapsed after a JNL is stored into the cache part 223, data of the cache part 223 is stored into the JVOL 252 as shown in a state 2 of FIG. 3. In other words, the data of the cache part 223 is destaged.

There is a possibility that a JNL that has been destaged has been transmitted to the secondary storage system 200B. A JNL that has been transmitted to the secondary storage system 200B is data that is not required to be stored into the JVOL 252. In the case in which a processing of destage is executed for such data, a processor resource and a resource of an HDD 240 that are related to the processing of destage go to waste, whereby the utilization efficiency is reduced unfortunately (a first problem).

Figure 4:
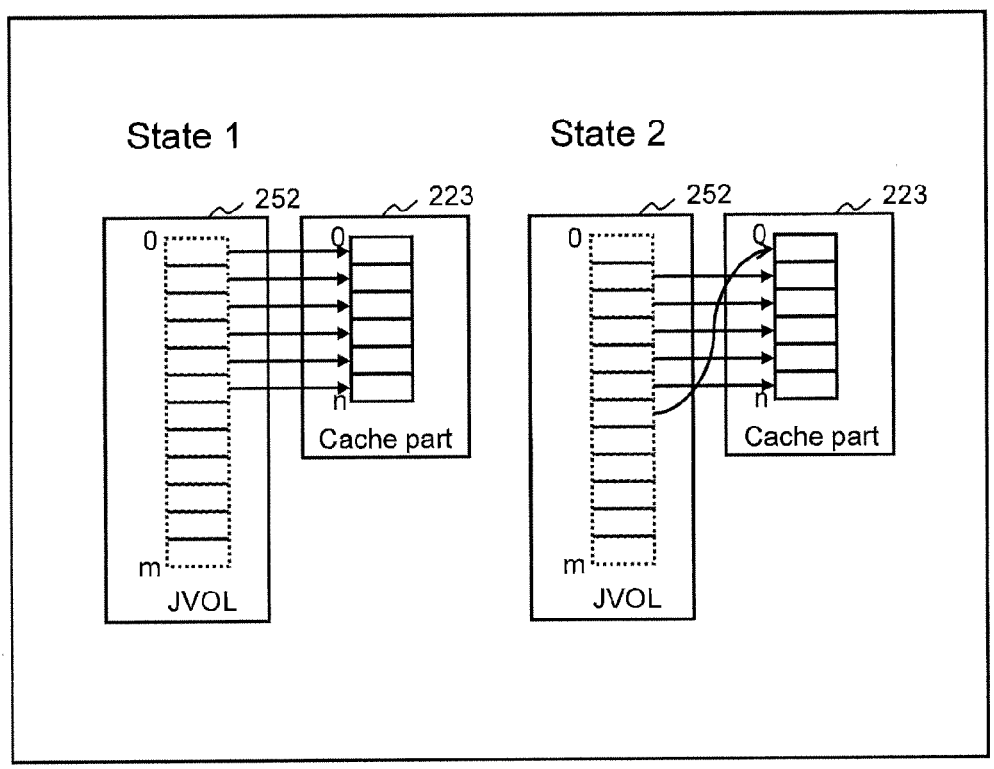
FIG. 4 is a view illustrating a second problem in accordance with a conventional example.

FIG. 4 is a view illustrating a second problem in accordance with a conventional example.

As shown in a state 1 of FIG. 4, in the case in which a new JNL is generated in a sequential manner, a region of the JVOL 252 is allocated to all regions of the cache part 223.

In the case in which a new JNL is further generated after that, as shown in a state 2 of FIG. 4, a region of the cache part 223 is released, the region is allocated to a new region of the JVOL 252, and a JNL is stored into the region. In the case in which a JNL that has been stored into a region that is released for the cache part 223 is dirty data (data that has not been destaged to the JVOL 252) in this case, the region is released and used after a JNL is destaged to the JVOL 252. On the other hand, in the case in which a JNL that has been stored into a region that is released for the cache part 223 is clean data, the region is released and used in a timely fashion. In the case in which the data on the cache part 223 is equivalent to the data that has been stored into the HDD 240, the data on the cache part 223 is clean data. Moreover, the data that is on the cache part 223 and that has not yet been written to the HDD 240 is dirty data.

In this case, a processing of a release of a region of the cache part 223 and a processing of an allocation of a region of the cache part 223 to a new region of the JVOL 252 are executed. Consequently, a processor resource that executes the processing has a load, whereby the utilization efficiency of a processor resource is reduced unfortunately (a second problem).

Figure 5:
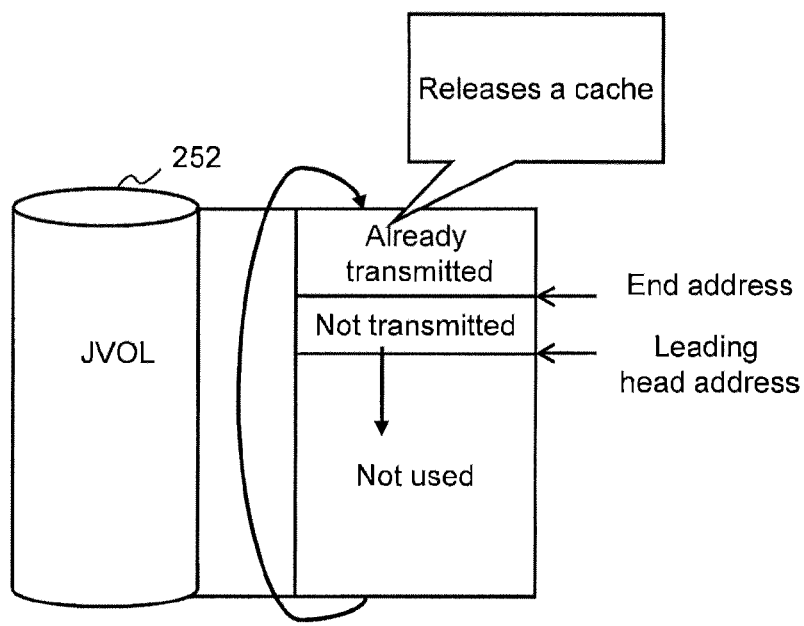
FIG. 5 is a view illustrating a first solving method for solving a problem.
Figure 6:
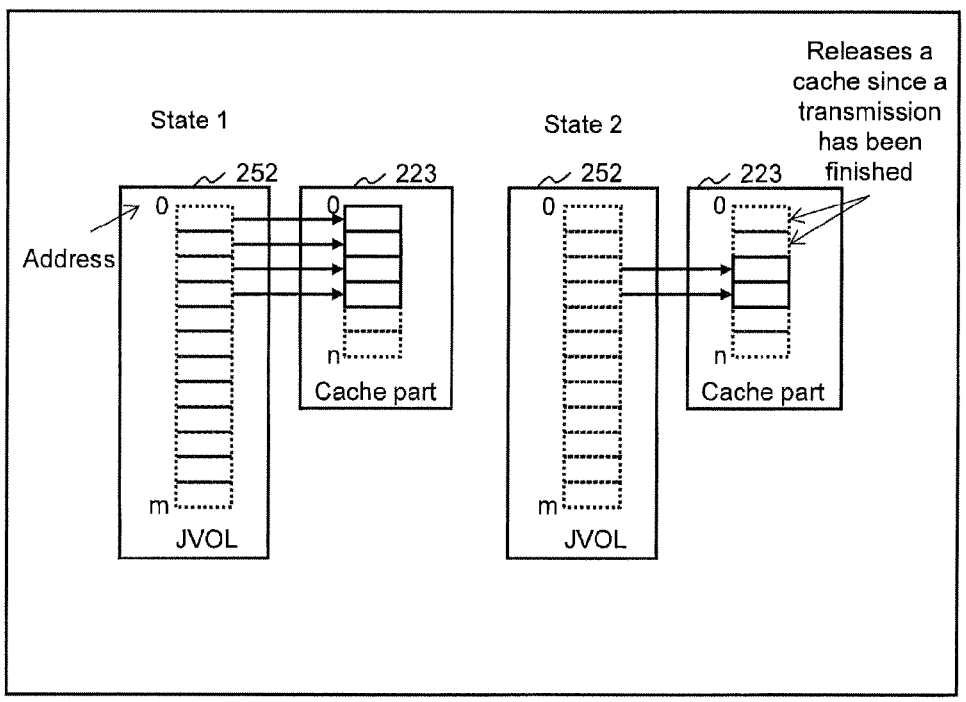
FIG. 6 is a view illustrating a state of a cache part for a first solving method for solving a problem.

FIG. 5 is a view illustrating a first solving method for solving a problem. FIG. 6 is a view illustrating a state of a cache part for a first solving method for solving a problem.

For the first solving method as shown in FIG. 5, a processor 211 releases a region of the cache part 223 that has been allocated to a region of the JVOL 252 in which a JNL that has been transmitted to the secondary storage system 200B, that is, a transmitted JNL is stored for instance. The region of the JVOL 252 in which a transmitted JNL has been stored can be identified by a leading head address and an end address of the management information 1000. Moreover, a region of the cache part 223 that has stored the data can be identified based on the allocation relationship between a region of the JVOL 252 and a region of the cache part 223.

In accordance with this solving method, as shown in the state 1 of FIG. 6, in the case in which a region of the cache part 223 is allocated to a region of the JVOL 252, a region of the cache part 223 that has been allocated to a region of the JVOL 252 that stores a JNL that has been transmitted is released to be in the state 2. As described above, since a JNL that has been transmitted does not exist in a region of the cache part 223, the destage for the JNL is not executed, a useless load to a processor resource and an HDD resource can be reduced.

Figure 7:
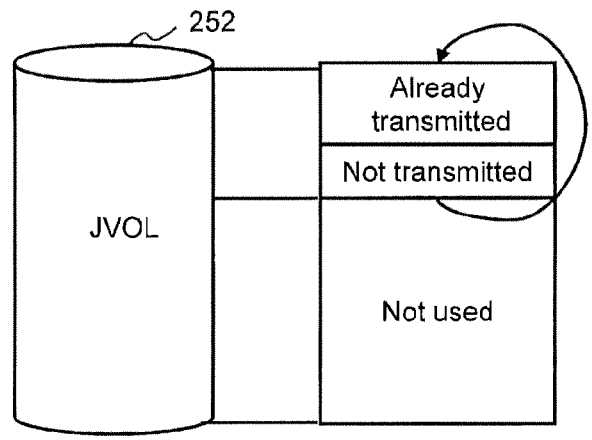
FIG. 7 is a view illustrating a second solving method for solving a problem.
Figure 8:
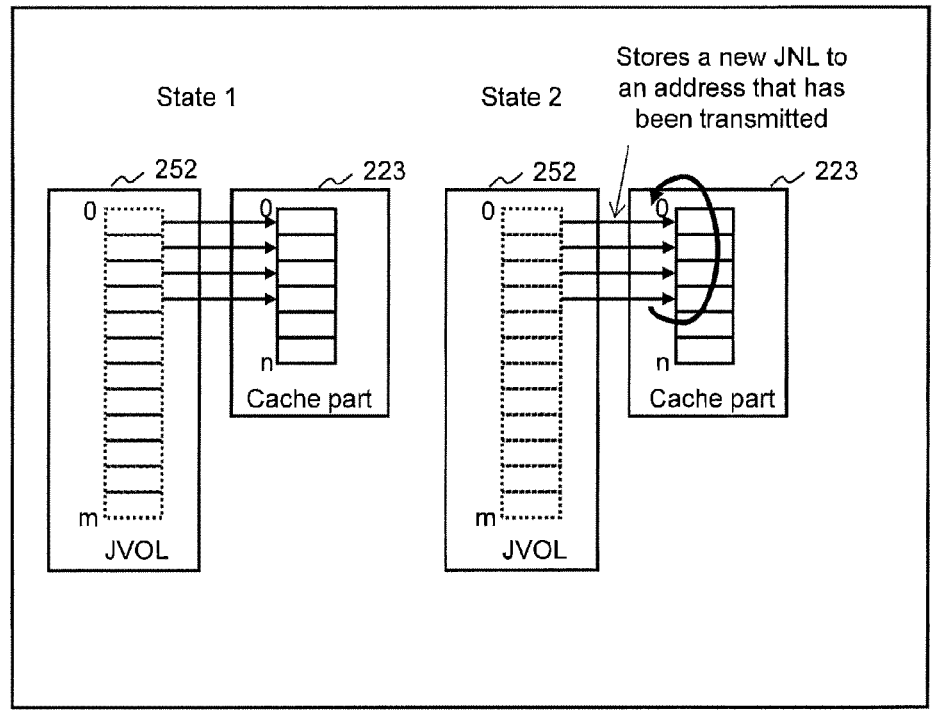
FIG. 8 is a view illustrating a state of a cache part for a second solving method for solving a problem.

FIG. 7 is a view illustrating a second solving method for solving a problem. FIG. 8 is a view illustrating a state of a cache part for a second solving method for solving a problem.

For the second solving method, in the case in which a circuit disturbance or the like does not occur, a JNL is generated and stored into the JVOL 252 (or the cache part 223), and the JNL that has been stored into the JVOL 252 (or the cache part 223) is transmitted to the secondary storage system 200B. Consequently, the second solving method is implemented by focusing attention on that a JNL remains only in a capacity that is sufficiently smaller than the total capacity of the JVOL 252.

In other words, for the first solving method as shown in FIG. 7, a free region of the next address is not used in a sequential manner as a region of the JVOL 252 that stores a JNL, but a region that is used for the JVOL 252 is a comparatively small capacity in such a manner that a region that has been transmitted is sued. Since the region is a comparatively small capacity as described above, there is a high possibility that a region of the cache part 223 is allocated to a region of the JVOL 252.

In accordance with this solving method, as shown in the state 1 of FIG. 8, in the case in which a region of the cache part 223 is allocated to a region of the JVOL 252, a JNL that has been newly generated is stored into a region in which a transmitted JNL of the JVOL 252 is stored, and the JNL can be stored into the cache part 223 without executing a processing for newly allocating a region of the cache part 223 to the region. As described above, it is not necessary to execute a processing for allocating a region of the cache part 223 to the JVOL 252. Consequently, a load to a processor resource can be reduced. Since a possibility of that a JNL that has been transmitted remains in the cache part 223 can be reduced by this solving method, an occurrence of destage can be reduced and the first problem can also be solved.

Figure 9:
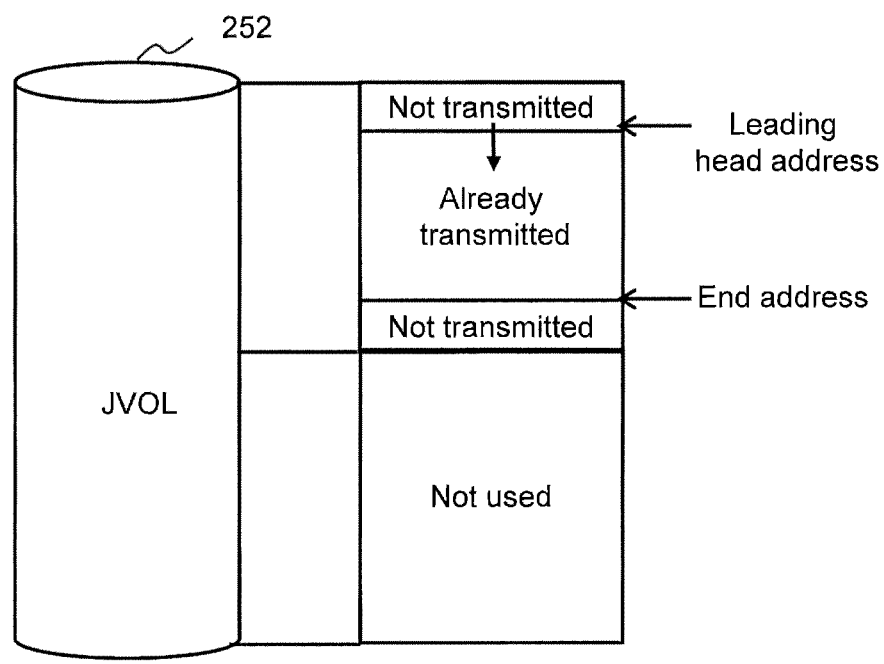
FIG. 9 is a view illustrating a summary of an embodiment 1.
Figure 10:
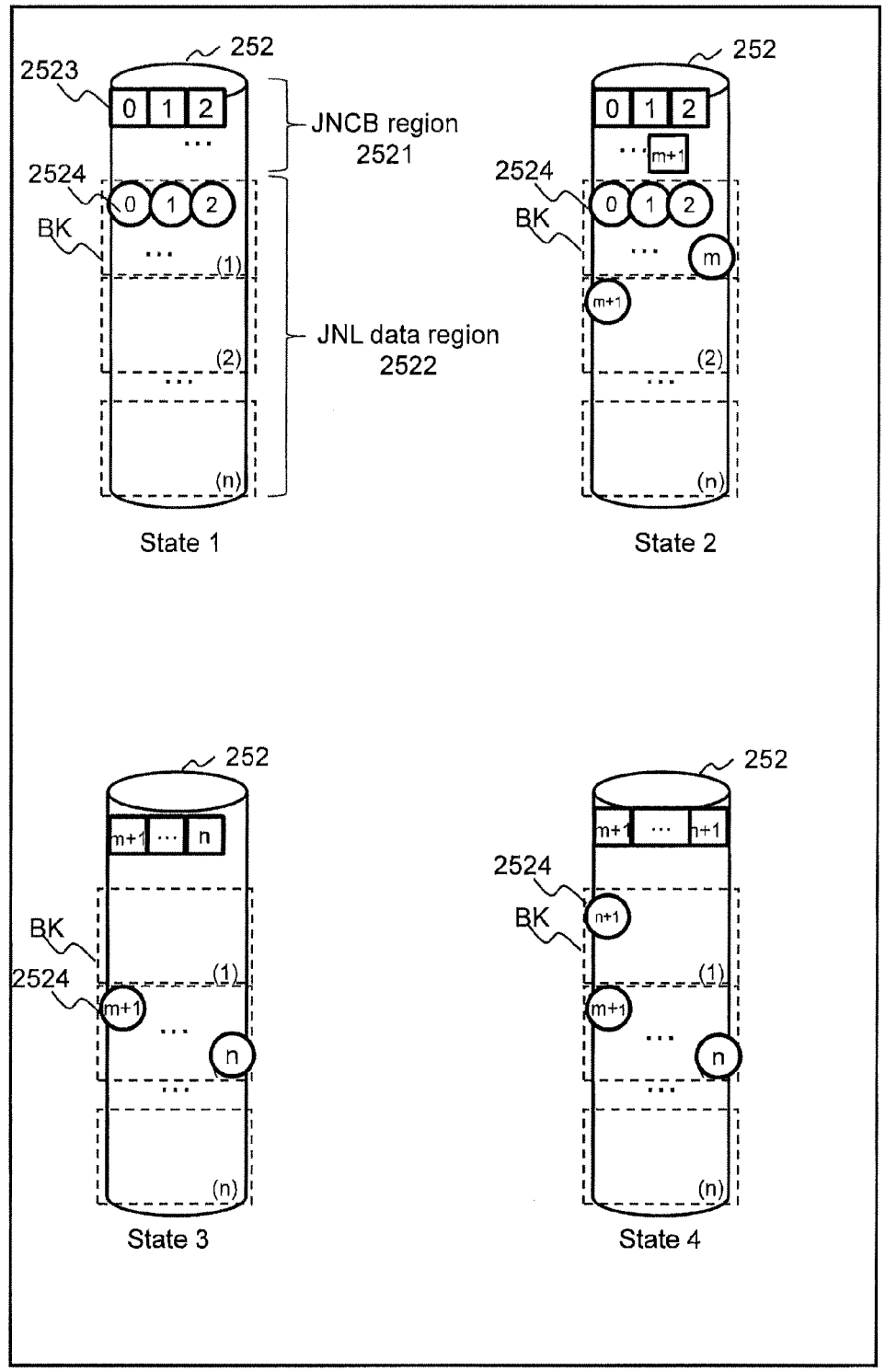
FIG. 10 is a view illustrating a state of a journal volume in accordance with the embodiment 1.

FIG. 9 is a view illustrating a summary of an embodiment 1. FIG. 10 is a view illustrating a state of a journal volume in accordance with the embodiment 1.

In the embodiment 1 as shown in FIG. 9, a free region of the next address is not used in a sequential manner as a region of the JVOL 252 that stores a JNL, and a region that has been transmitted is used to make a region that is used for the JVOL 252 to be a comparatively small capacity. As described above, a region that is used for the JVOL 252 can be made a comparatively small capacity in which a JNL that has been transmitted has been stored. Consequently, there is a high possibility that a region of the cache part 223 is allocated to a region of the JVOL 252, and there is a high possibility that it is not necessary that an allocation of a region of the cache part 223 is executed.

In a state shown in FIG. 9 for instance, in the case in which a JNL is stored into a region that has been transmitted and a circuit disturbance occurs for instance, a leading head address that indicates a region in which a JNL is stored catches up with an end address, and there is no region that stores a JNL. Consequently, in the embodiment 1, a region of the JVOL 252 can be used in an appropriate manner even in such a case.

In the present embodiment, as shown in a state 1 of FIG. 10, a fixed capacity is allocated to a JNCB region 2524 in which a JNCB 2523 is stored, and the JNL data 2524 in a JNL is managed by using a plurality of blocks BK of a predetermined size (a fixed size in this embodiment). The JNCB 2523 is the control data for managing an storage address for the JVOL 252 of the JNL data. At least one JNL data 2524 can be stored into the block BK. In the figure, a JNCB 2523 is indicated by a rectangle, a sequence number that is corresponded to the JNCB is indicated in the rectangle, the JNL data 2524 is shown in a circular form, and a sequence number that is corresponded to JNL data 2524 is indicated in a circular form. A block BK is indicated by a dashed rectangle and a block number (for instance, (1)) is indicated in a rectangle. In other similar figures, a similar description is executed.

In a first place, as shown in a state 1, the JNL data 2524 that has been generated is stored to a leading head block (a block number 1) in order of precedence from a leading head. In the case in which there is no space to which the JNL data 2524 is written in the leading head block BK, a free block BK (a block of a block number 2 in the figure) is searched and the JNL data 2524 is written to the block BK as shown in a state 2 of FIG. 10.

On the other hand, in the case in which all of the JNL data 2524 in the block BK is transmitted to the secondary storage system 200B, the block BK (a block of a block number 1 in the figure) is made to be a free block as shown in a state 3 of FIG. 10.

In the case in which the JNL data 2524 is generated and a free block is searched after that, a block that is not the next block BK (a block of a block number 3) but a block BK that has been used and that becomes a free block recently (a block of a block number 1) is a block BK of a stored destination of the JNL data 2524, and the JNL data 2524 is stored as shown in a state 4 of FIG. 10. Since there is a high possibility that a region of the cache part 223 has been allocated to a block that becomes a free block recently, there is a high possibility that a processing for allocating a region of the cache part 223 to the block BK is not necessary when the JNL data 2524 is stored into the block BK. Consequently, there is a high possibility that the JNL data 2524 is stored into a storage region to which a region of the cache part 223 has been allocated. Therefore, a load to a processor can be reduced and the utilization efficiency of a processor can be improved.

In the next place, a computer system in accordance with the embodiment 1 will be described in detail.

Figure 11:
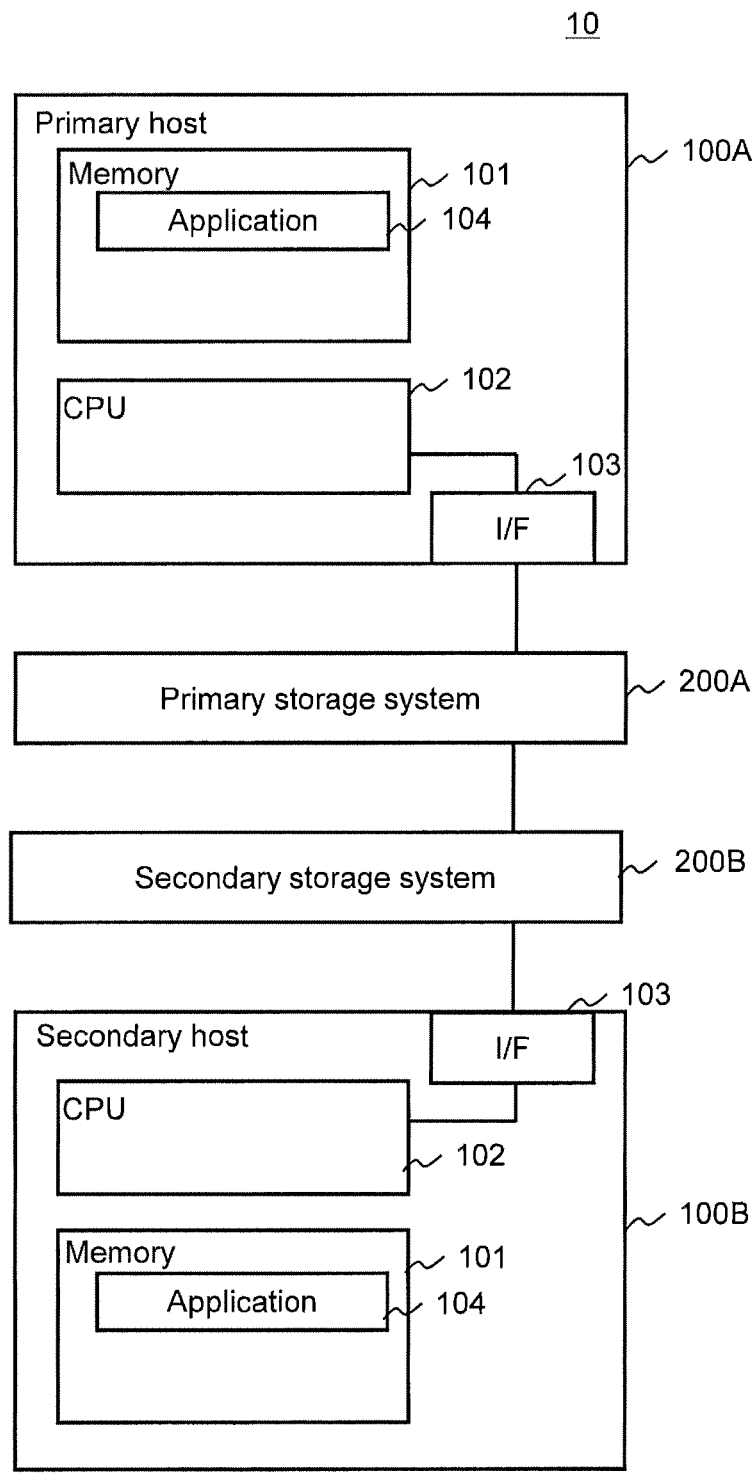
FIG. 11 is a total block diagram showing a computer system in accordance with the embodiment 1.

FIG. 11 is a total block diagram showing a computer system in accordance with the embodiment 1.

A computer system 10 is provided with a primary host computer (a primary host) 100A, a primary storage system 200A, a secondary storage system 200B, and a secondary host computer (a secondary host) 100B. The primary storage system 200A is a storage system that is on a primary side (a copy source) to one volume, and can be a storage system that is on a secondary side (a copy destination) to other volume in some cases. Similarly, the secondary storage system 200B is a storage system that is on a secondary side to one volume, and can be a storage system that is on a primary side to other volume in some cases.

The primary host 100A and the primary storage system 200A are coupled to each other via a network. The primary storage system 200A and the secondary storage system 200B are coupled to each other via a network. The secondary storage system 200B and the secondary host 100B are coupled to each other via a network. It is not always necessary that the secondary host 100B is installed in advance. The secondary host 100B can be installed by no later than when a business processing is executed using the secondary storage system 200B.

The primary host 100A is provided with a memory 101, a CPU (Central Processing Unit) 102, and an interface (I/F) 103. The memory 101 stores an application (such as a data base application) 104 that is software that is configured to execute a business processing. The application 104 stores the data that is used for a business processing into the primary storage system 200A.

The secondary storage system 200B is used for storing a copy of data that has been stored into the primary storage system 200A for a disaster recovery for instance.

The secondary host 100B is a host that is configured to execute a business processing by using data of the secondary storage system 200B in the case in which a failure occurs for the primary host 100A or the primary storage system 200A. The secondary host 100B is provided with a memory 101, a CPU (Central Processing Unit) 102, and an interface (I/F) 103. The memory 101 stores an application 104 that is software that is configured to execute a business processing. The application 104 stores the data that is used for a business processing into the secondary storage system 200B.

Figure 12:
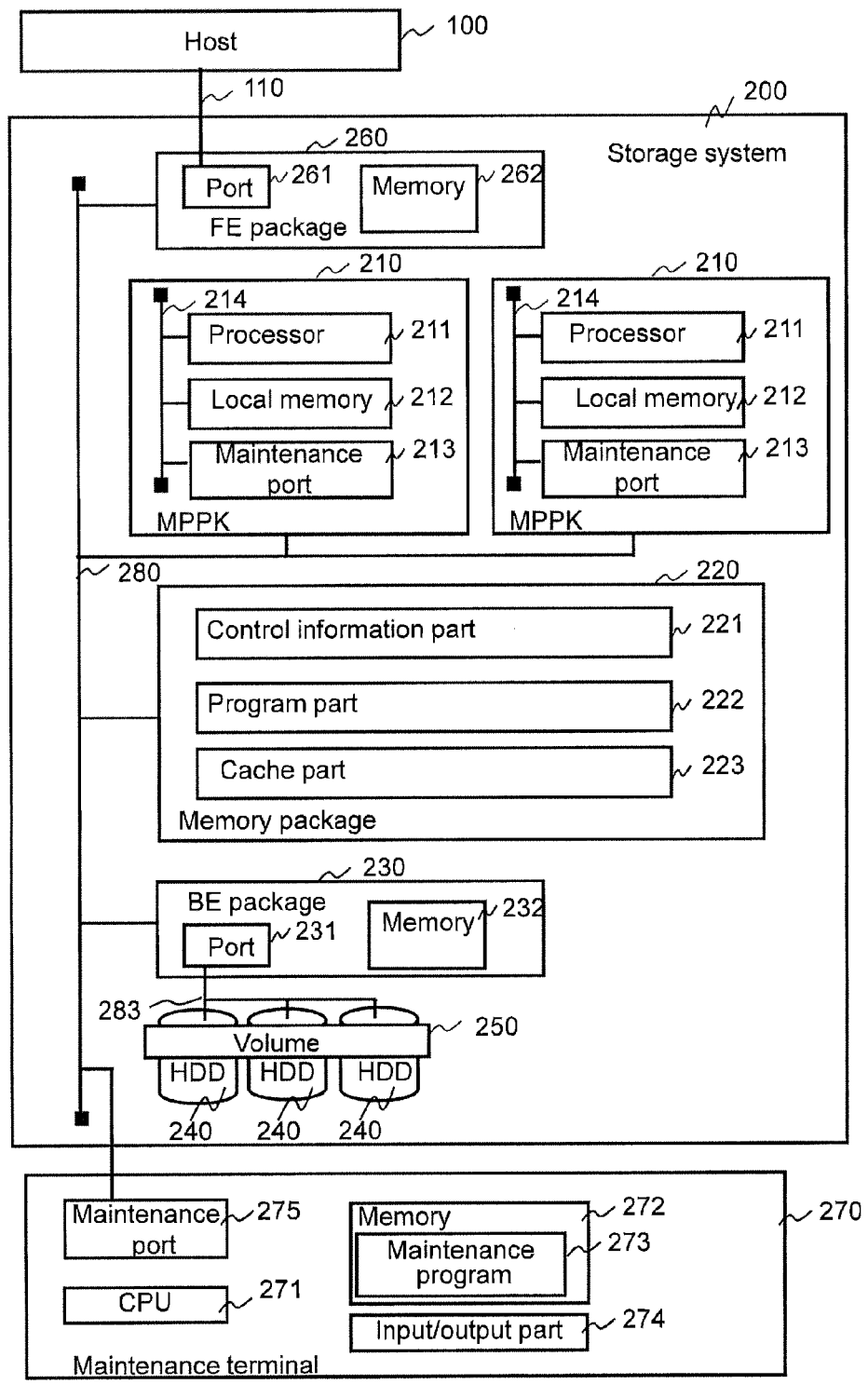
FIG. 12 is a partial block diagram showing a computer system concentrating on the storage system in accordance with the embodiment 1.

FIG. 12 is a partial block diagram showing a computer system concentrating on the storage system in accordance with the embodiment 1.

The storage system 200 (200A, 200B) is provided with at least one microprocessor package (MPPK) 210, a memory package 220, a back end package (BE package) 230, and a front end package (FE package) 260. The MPPK 210, a memory package 220, a BE package 230, and a FE package 260 are coupled to each other via an internal bus 280.

The FE package 260 is provided with a port 261 and a memory 262. The port 261 is coupled to the host 100 (100A, 100B) via a network 110, and mediates a communication with the host 100. The memory 262 stores a wide variety of data that is necessary for a processing of the 1-E package 260. The memory 262 is used for storing data that has been transmitted from the primary host 100A and data that is transmitted to the primary host 100A on a temporary basis.

The memory package 220 is configured by at least one memory device for instance, and is provided with a control information part 221 that is configured to store the control information, a program part 222 that is configured to store a program, and a cache part 223 as an example of a cache memory that is configured to cache data for instance. A capacity of the cache part 223 is smaller than that of a volume 250 in general.

The MPPK 210 is provided with a processor 211, a local memory 212, and a maintenance port 213. The processor 211, the local memory 212, and the maintenance port 213 are coupled to each other via an internal bus 214. The local memory 212 stores a wide variety of data that is necessary for the MPPK 210. The maintenance port 213 mediates a communication with a maintenance terminal 270. The processor 211 executes a wide variety of processing. The processor 211 executes a wide variety of processing by executing a wide variety of programs that have been stored into a program part 222 of the memory package 220. Moreover, the processor 211 executes a wide variety of processing by using a wide variety of information that has been stored into the control information part 221 of the memory package 220.

The BE package 230 is provided with a port 231 and a memory 232. The port 231 is coupled to at least one HDD 240 as an example of a physical storage device via a bus 283. A volume 250 that is configured to manage data is configured by at least one storage region of the HDD 240 for instance. The physical storage device is not restricted to an HDD and can also be an SSD (Solid State Drive) or a DVD for instance. Moreover, at least one HDD 240 can be collected up in a unit of a parity group, and a high reliability technique such as a RAID (Redundant Arrays of Independent Disks) can also be used.

The maintenance terminal 270 that is configured to maintain the storage system 200 is coupled to the storage system 200 via a bus 280. The maintenance terminal 270 is provided with a CPU 271, a memory 272, an input/output part 274, and a maintenance port 275. The memory 272 stores a program for a maintenance (a maintenance program) 273. The CPU 271 executes the maintenance program 273 to execute a maintenance processing. The input/output part 274 is configured by a mouse, a keyboard, a display and so on for instance. The input/output part 274 receives a wide variety of instruction inputs from an operator who carries out the maintenance, and displays a wide variety of information on a display. The maintenance port 275 mediates a communication with the storage system 200.

Figure 13:
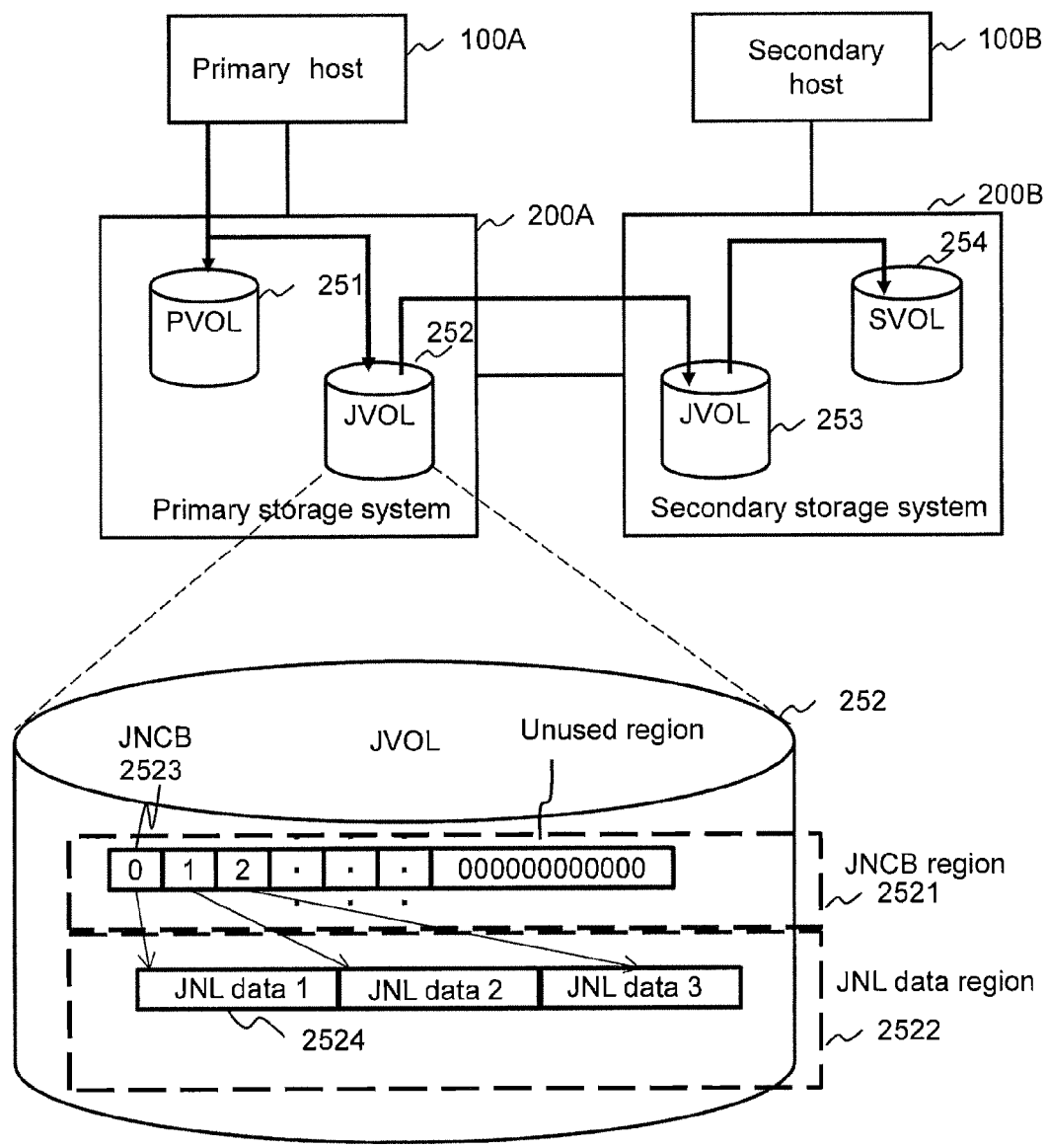
FIG. 13 is a view illustrating a copy of a volume and a journal volume in accordance with the embodiment 1.

FIG. 13 is a view illustrating a copy of a volume and a journal volume in accordance with the embodiment 1.

For the primary storage system 200A, a PVOL (Primary Volume) 251 is managed as a storage region that stores the business data that is related to the business processing by the primary host 100A. For the secondary storage system 200B, a SVOL (Secondary Volume) 254 that is configured to store the copy of the business data that has been stored into the PVOL 251 is managed. Here, the PVOL 251 and the SVOL 254 are called a copy pair.

The primary storage system 200A stores a JVOL (Journal Volume) 252 that is used as a buffer region (a buffer part) that is configured to temporarily store at least one JNL (Journal) that indicates a history of a write to the PVOL 251. The JNL includes a JNCB (journal Control Block) 2523 and the JNL data 2524. The JNCB 2523 includes the control information such as a storage address for the JVOL 252 of the JNL data, a write address for the PVOL 251, and an occurrence order of the JNL, that is, a sequence number that indicates a write order of data to the PVOL 251. The JNL data 2524 is data that is equivalent to data (write data) that has been written from the primary host 100A to the PVOL 251.

The JVOL 252 includes a JNBC region 2521 that stores the JNCB 2523 and a JNL data region 2522 that stores the JNL data 2524. The JVOL 252 can be configured by a plurality of volumes and can store a JNL to a plurality of PVOLs 251.

The secondary storage system 200B stores a JVOL 253 that is stored on a temporary basis in the case in which a JNL that is stored into the JVOL 252 of the primary storage system 200A is received. The configuration of the JVOL 253 is equivalent to that of the JVOL 252. The number of the JVOLs 252 of the primary storage system 200A and the number of the JVOL 253 of the secondary storage system 200B can be different from each other.

An operation summary of an asynchronous copy processing for the computer system 10 will be described in the following.

In the case in which a write of data from the primary host 100A to the PVOL 251 occurs, the primary storage system 200A stores data that has been written to the PVOL 251, generates a JNL that is related to the write data and stores a JNL into the JVOL 252.

After that, the primary storage system 200A acquires a JNL from the JVOL 252 and transmits the JNL to the secondary storage system 200B. The secondary storage system 200B stores the received JNL to the JVOL 253.

In the next place, the secondary storage system 200B acquires the JNL data 2524 in a JNL of the JVOL 253 in accordance with an order of a write from the primary host 100A to the PVOL 251, and generates a copy of the PVOL 251 to the SVOL 254 by writing the JNL data 2524 to the SVOL 254. The order that has been written to the PVOL 251 can be implemented by a sequence number.

A capacity of the JVOL 252 will be described in the following. In the case in which a circuit disturbance occurs between the primary storage system 200A and the secondary storage system 200B for instance, a JNL starts to remain for the JVOL 252. In the case in which the circuit disturbance is resolved after that, a JNL of the JVOL 252 is transmitted to the JVOL 253 of the secondary storage system 200B. Consequently, in the case in which the JVOL 252 is provided with a capacity sufficient to store JNLs that have been generated, a remote copy can be continued without stopping a remote copy. A capacity of the JVOL 252 is designed in accordance with a time in which the capacity can withstand a circuit disturbance. In general, a capacity of the JVOL 252 is a large capacity and is extremely larger than that of a cache part 223 of the memory package 220 for instance. In the case in which a capacity of a cache part 223 is 1 TB for instance, a capacity of the JVOL 252 is several tens TB for instance.

Figure 14:
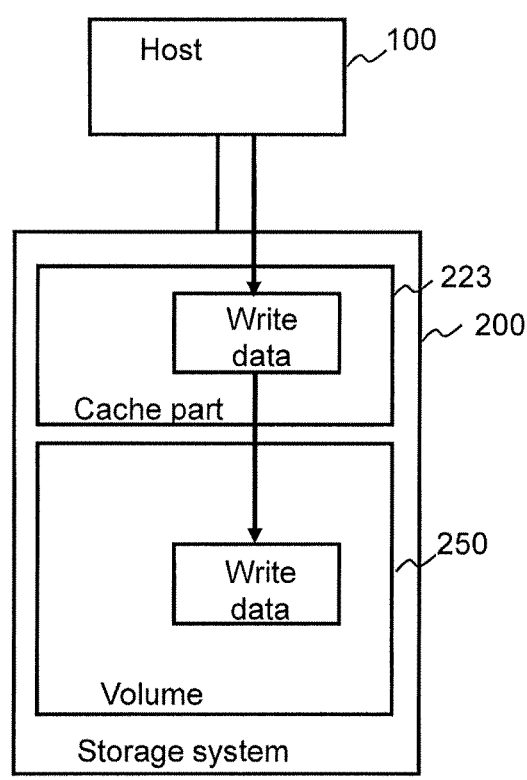
FIG. 14 is a view illustrating a summary of an operation in a data write in accordance with the embodiment 1.

FIG. 14 is a view illustrating a summary of an operation in a data write in accordance with the embodiment 1.

In the case in which a write request is transmitted from the host 100A to the volume 250 of the primary storage system 200A, the primary storage system 200A stores the write data from the host 100A into the cache part 223 of the primary storage system 200A, After that, the primary storage system 200A stores the write data of the cache part 223 into the volume 250 (PVOL 251) asynchronously with the write request. Moreover, a JNL is stored into the cache part 223 and is then stored into the volume (JVOL 252) similarly to the data that has been acquired from the host 100A.

Figure 15:
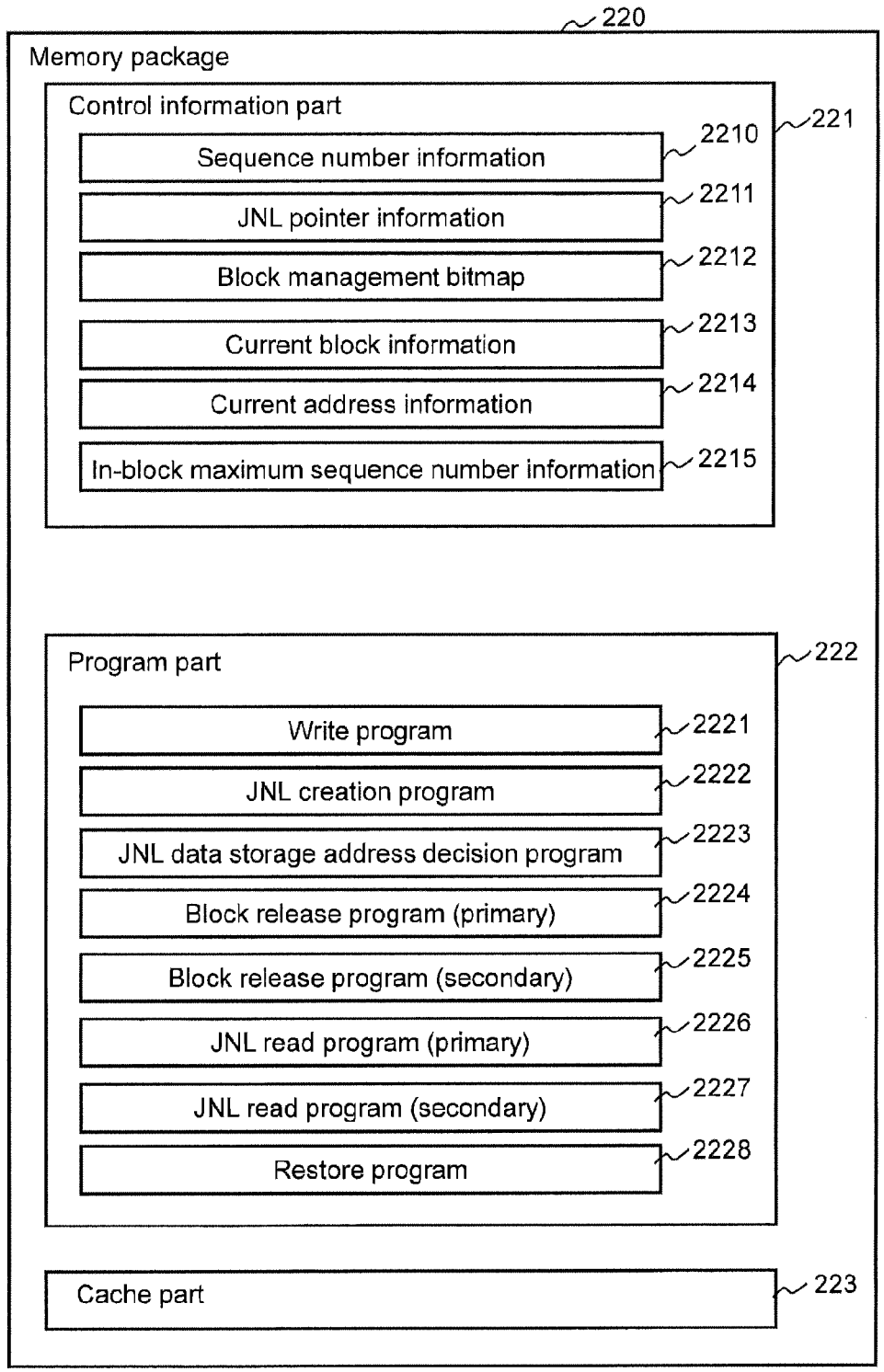
FIG. 15 is a detailed block diagram showing a memory package in accordance with the embodiment 1.

FIG. 15 is a detailed block diagram showing a memory package in accordance with the embodiment 1.

The control information part 221 of the memory package 220 stores the sequence number information 2210, the JNL pointer information 2211, the block management bitmap 2212, the current block information 2213, the current address information 2214, and the in-block maximum sequence number information 2215.

The program part 222 stores a write program 2221, a JNL creation program 2222, a JNL data storage address decision program 2223, a block release program (primary) 2224, a block release program (secondary) 2225, a JNL read program (primary) 2226, a JNL read program (secondary) 2227, and a restore program 2228. In the present embodiment, in consideration of the case in which one storage system is operated as the primary storage system 200A and the case in which one storage system is operated as the secondary storage system 200B, one storage system stores a program that is necessary to be operated as any of the primary storage system 200A and the secondary storage system 200*e* In the case in which one storage system is operated as only one of the primary storage system 200A and the secondary storage system 200B, it is not necessary for the storage system to be provided with all programs.

Figure 16:
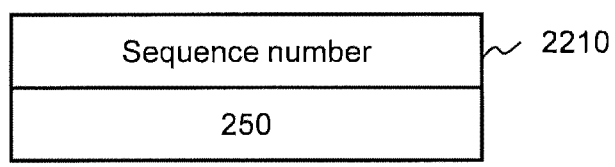
FIG. 16 is a view showing an example of the sequence number information in accordance with the embodiment 1.

FIG. 16 is a view showing an example of the sequence number information in accordance with the embodiment 1.

Figure 17:
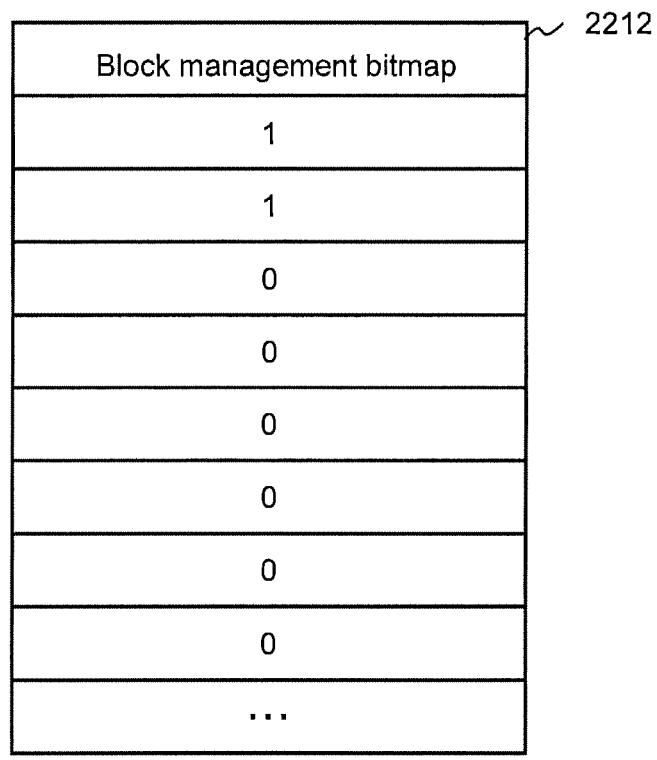
FIG. 17 is a view showing an example of a block management bitmap in accordance with the embodiment 1.
Figure 18:
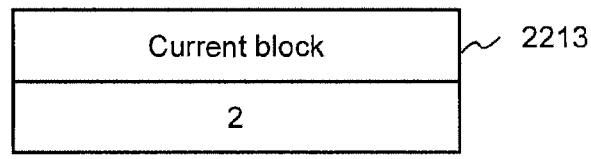
FIG. 18 is a view showing an example of the current block information in accordance with the embodiment 1.
Figure 19:
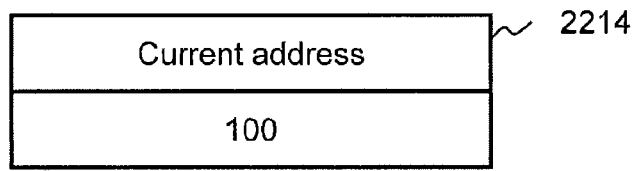
FIG. 19 is a view showing an example of the current address information in accordance with the embodiment 1.

The sequence number information 2210 stores a sequence number that indicates an order in which the storage system 200 receives a write from the primary host 100A. The sequence number is a sequence number of a JNL that has occurred recently for instance. FIGS. 17 to 19 are the information for managing a usage situation of the JVOL 252.

Figure 20:
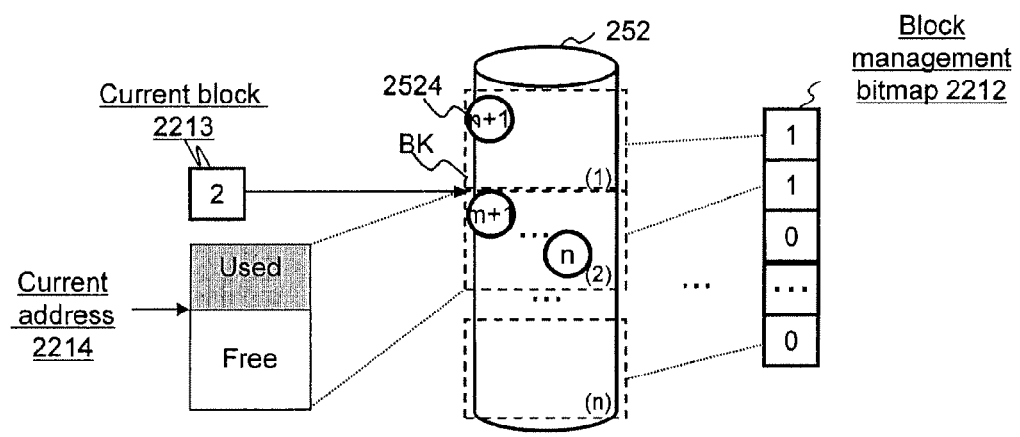
FIG. 20 is a view illustrating a block management bitmap, a current block, and a current address in accordance with the embodiment 1.

FIG. 17 is a view showing an example of a block management bitmap in accordance with the embodiment 1. FIG. 18 is a view showing an example of the current block information in accordance with the embodiment 1. FIG. 19 is a view showing an example of the current address information in accordance with the embodiment 1. FIG. 20 is a view illustrating a block management bitmap, a current block, and a current address in accordance with the embodiment 1.

The block management bitmap 2212 stores a value that indicates whether each block of the JVOL 252 is being used or is not used as shown in FIG. 17. In the present embodiment, a bit value 1 is set in the case in which the corresponded block BK is being used, and a bit value 0 is set in the case in which the corresponded block BK is not used. In the present embodiment, the JVOL 252 is classified into a plurality of blocks of a predetermined common fixed size and is managed. Each block is in a size capable of storing a plurality of JNL data and a size that is sufficiently smaller than a capacity of the cache part 223. More specifically, in the case in which a capacity of the cache part 223 is 1 TB for instance, a size of a block can be 10 MB. Moreover, a size of the JVOL 252 can be several ten TB for instance.

Since the present embodiment shows an example in which each block has a common fixed size, a flag of 1 bit is managed to each block for the block management bitmap 2212. However, in the case in which each block has a different size for instance, a start address, an end address, and a flag of each block can be corresponded to each other to be managed.

The current block information 2213 stores a block number of a current block as shown in FIG. 18. The current block is a target block BK (a block of a block number 1 in the figure) that stores a current JNL (JNL data 2524 in this example) as shown in FIG. 20.

The current address information 2214 stores a current address of a current block as shown in FIG. 19. The current address is an address that indicates a range that has been used in a current block, that is, a range that has stored the JNL data 2524 as shown in FIG. 20.

Figure 21:
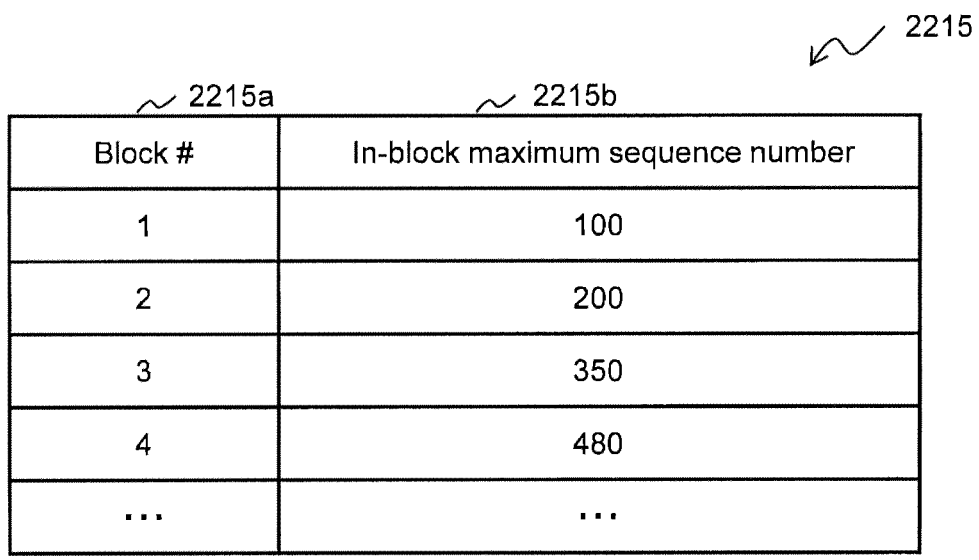
FIG. 21 is a view showing an example of the in-block maximum sequence number information in accordance with the embodiment 1.

FIG. 21 is a view showing an example of the in-block maximum sequence number information in accordance with the embodiment 1. The information shown in FIG. 21 is the information that is used for the release processing of a block that is described in FIG. 24.

The in-block maximum sequence number information 2215 stores a record to which the fields of a block number (#) 2215*a* and an in-block maximum sequence number 2215*b* are corresponded. The block number (#) 2215*a* stores the number of a block (a block #) of the JVOL 252. The in-block maximum sequence number 2215*b* stores a maximum sequence number (an in-block maximum sequence number) of a JNL that has been stored into the corresponded block. For the in-block maximum sequence number information 2215 shown in FIG. 21, it is found that a maximum sequence number of a JNL (JNL data 2524) that has been stored into a block of a block # "3" is "350".

In the next place, an operation of the computer system in accordance with the embodiment 1 will be described in the following.

Figure 22:
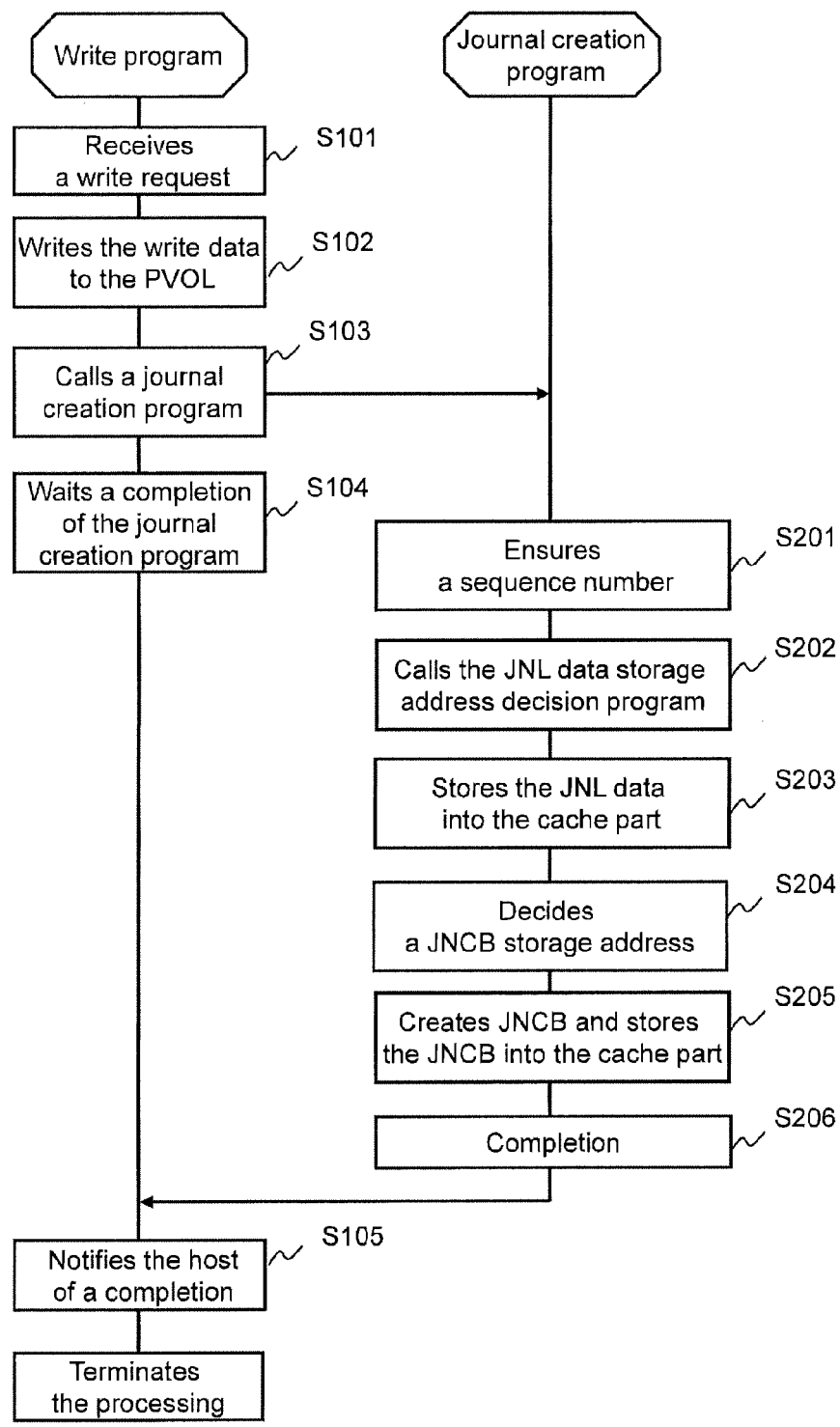
FIG. 22 is a flowchart of a processing in a write in accordance with the embodiment 1.

FIG. 22 is a flowchart of a processing in a write in accordance with the embodiment 1.

In the case in which a write program 2221 receives a write request from the host 100A to the PVOL 251 (step S101), the write program 2221 writes the data of a write target (write data) to the volume 250 (such as the PVOL 251) (step S102). In the next place, the write program 2221 calls a journal creation program (step S103) and waits a completion of the journal (JNL) creation program 2222 (step S104).

In the case in which the journal creation program 2222 is called, the journal creation program 2222 ensures a sequence number of a JNL that is to be created (step S201) and calls the JNL data storage address decision program 2223 (step S202). By these steps, the JNL data storage address decision processing (see FIG. 23) is executed, an address of a JVOL that stores the JNL data is decided, and the journal creation program 2222 is notified of the address.

In the next place, the journal creation program 2222 stores the JNL data 2524 as the data that is stored to the notified address of the JVOL 252 into the cache part 223 (step S203).

In the next place, the journal creation program 2222 decides an address of the JVOL 252 that stores the JNCB 2523 (step S204) and stores the JNCB 2523 as the data that is stored to the decided address of the JVOL 252 into the cache part 223 (step S205). Here, the address that stores the JNCB 2523 is decided as an address next to the JNCB 2523 that has been stored or a leading head address of a JNCB region 2521 in the case in which the JNCB 2523 is stored up to the last of the JNCB region 2521.

In the next place, the journal creation program 2222 notifies the write program 2221 of a completion of a processing (step S206). The write program 2221 that has received the notification notifies the host 100A of a completion report of a write (step S105) and terminates the processing.

Figure 23:
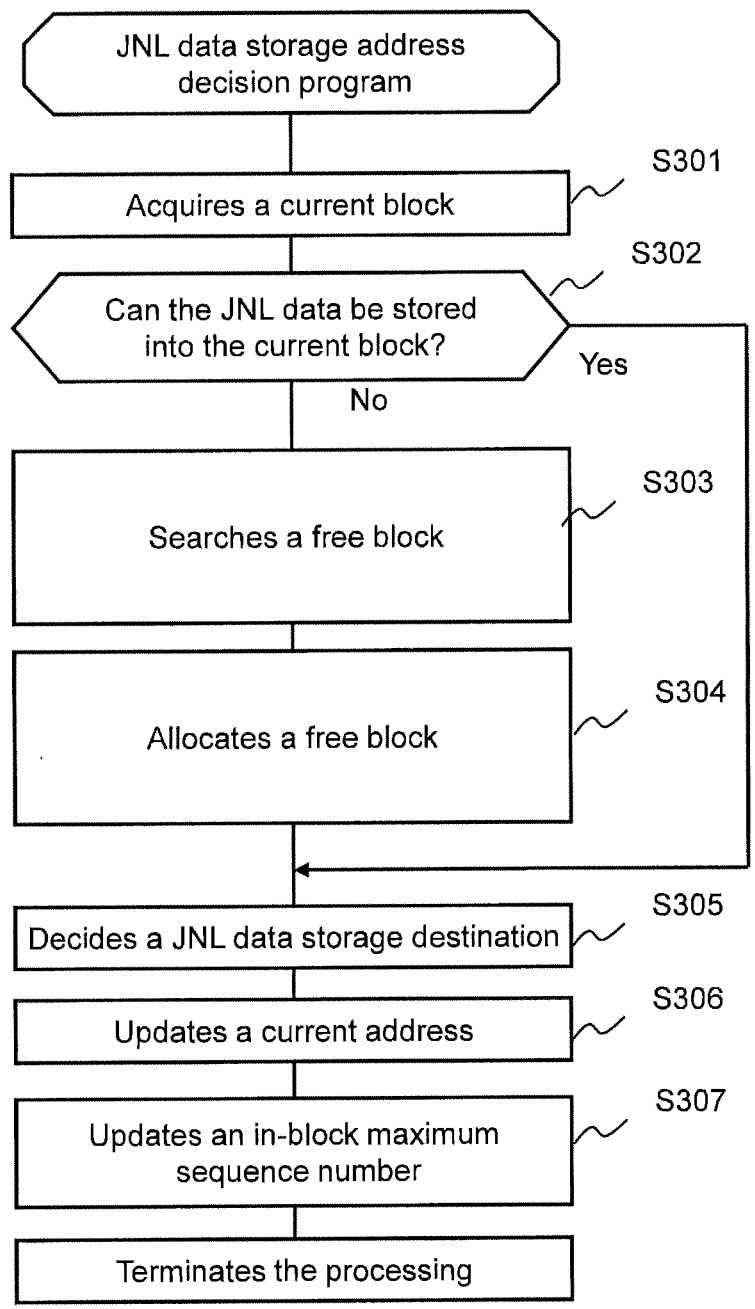
FIG. 23 is a flowchart of a JNL data storage address decision processing in accordance with the embodiment 1.

FIG. 23 is a flowchart of a JNL data storage address decision processing in accordance with the embodiment 1.

A JNL data storage address decision program 2223 acquires a block number of a current block from the current block information 2213 (step S301) and judges whether or not the new JNL data 2524 can be stored into the current block, that is, whether or not the current block has a free space (step S302).

In the case in which the current block has a free space (Yes for the step S302) as a result of the judgment, the JNL data storage address decision program 2223 proceeds to the step S305. On the other hand, in the case in which the current block has no free space (No for the step S302) as a result of the judgment, the JNL data storage address decision program 2223 searches a free block (step S303). In the present embodiment, the JNL data storage address decision program 2223 searches a block that is provided with a bit value of "0" from a leading head of a block management bitmap 2212.

In the next place, the JNL data storage address decision program 2223 allocates the identified block as a block that stores the JNL data 2524 and proceeds to a processing of the step S305 (step S304). More specifically, the JNL data storage address decision program 2223 modifies a bit value of the block management bitmap 2212 to the identified block to be "1" and modifies a block number of the current block information 2213 to be a block number of the identified block.

In the step S305, the JNL data storage address decision program 2223 decides an address that stores the JNL data 2524 of the corresponded block. In the next place, the JNL data storage address decision program 2223 updates a current address of the current address information 2214 to be a decided address (step S306), updates a maximum sequence number to the block of the in-block maximum sequence number information 2215 to be a sequence number of the JNL data 2524 (step S307), and terminates the processing.

In accordance with the above JNL data storage address decision processing, the JNL data 2524 can be stored on a preferential basis into a region that is a block that is located close to the leading head of the JVOL 252 and that is provided with a free space and to which a region of the cache part 223 has a high degree of probability of having been allocated. By this configuration, regions to which the JNL data 2524 is stored can be aggregated to a comparatively small range, and an occurrence of a processing for newly allocating a region of a cache part can be reduced in the case in which the JNL data is stored. An allocating method of a block that stores the JNL data is not restricted to the method. For instance, a free block that has been used most recently can be allocated as a block that stores the JNL data 2524. By this configuration, there is a higher possibility that a region that is corresponded to a region of the free block is managed by the cache part 223, and there is a high possibility that a region of the cache part 223 can be used without executing processing for allocating a region of the cache part to the region in the case in which data is stored into the free block. As a method for acquiring a free block that has been used most recently, the free block can be managed by a stack.

Figure 24:
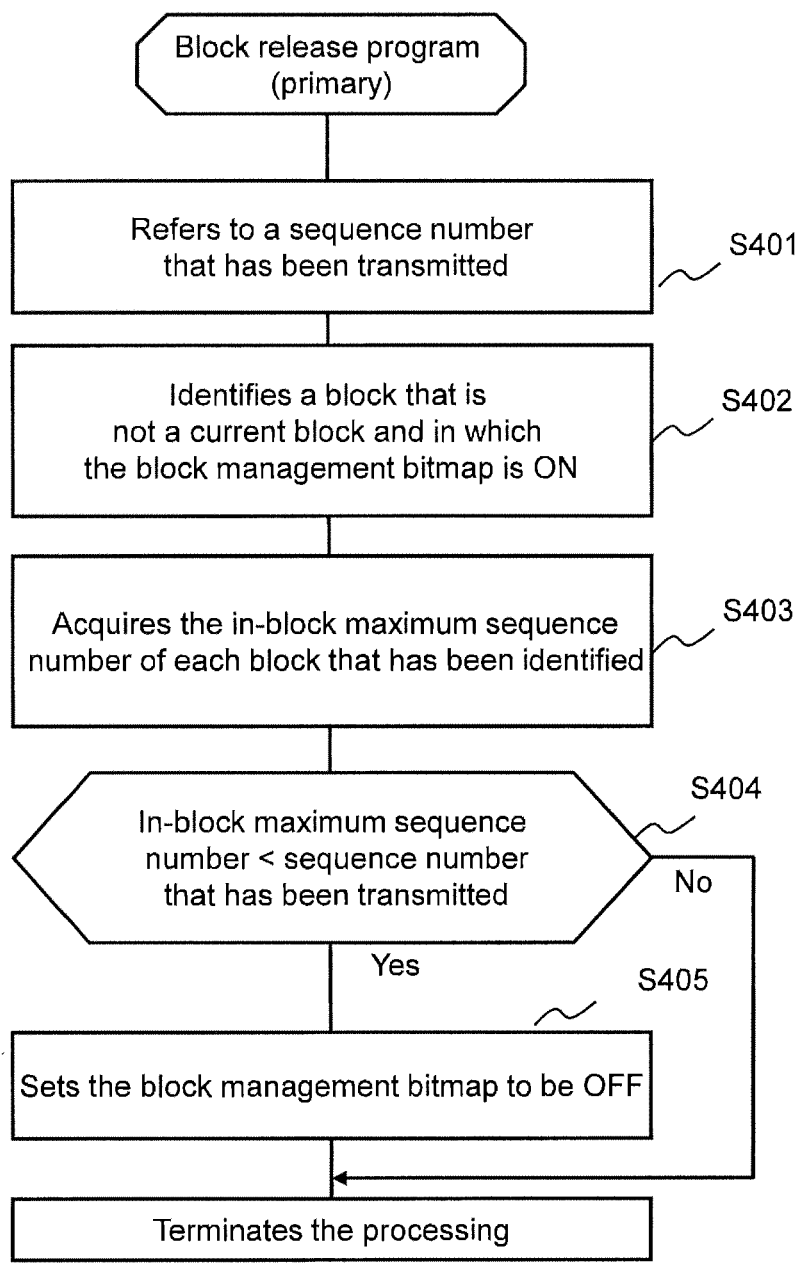
FIG. 24 is a flowchart of a block release processing in accordance with the embodiment 1.

FIG. 24 is a flowchart of a block release processing in accordance with the embodiment 1.

The block release processing is executed on a regular basis by the block release program (primary) 2224 for the primary storage system 200A for instance. Alternatively, the block release processing is called in the JNL read processing shown in FIG. 25, and executed.

The block release program (primary) 2224 refers to a sequence number of a JNL that has been transmitted (a transmitted sequence number) (step S401). The sequence number of a JNL that has been transmitted is stored into the control information part 221 by the primary storage system 200A for instance.

In the next place, the block release program (primary) 2224 identifies a block that is not a current block and in which the block management bitmap 2212 is ON (a bit value is "1") (step S402).

In the next place, the block release program (primary) 2224 acquires the in-block maximum sequence number of each block that has been identified from the in-block maximum sequence number information 2215 (step S403), and judges whether or not the in-block maximum sequence number that has been acquired for each block is smaller than a transmitted sequence number that has been referred to (step S404).

In the case in which the in-block maximum sequence number that has been acquired is smaller than a transmitted sequence number that has been referred to (Yes for the step S404) as a result of the judgment, since it means that all JNLs of the block have been transmitted to the secondary storage system 200B, the block release program (primary) 2224 sets a bit value that is corresponded to the block of the block management bitmap 2212 to be OFF ("0") to make the block to be a free block (step S405). On the other hand, in the case in which the in-block maximum sequence number that has been acquired is not smaller than a transmitted sequence number that has been referred to (No for the step S404) as a result of the judgment, since it means that all JNLs of the block have not been transmitted to the secondary storage system 200B, the processing is terminated.

For the block release processing, all blocks in which the JNL data has been transmitted can be made a free block and can be used for the subsequent storage of the JNL data.

Figure 25:
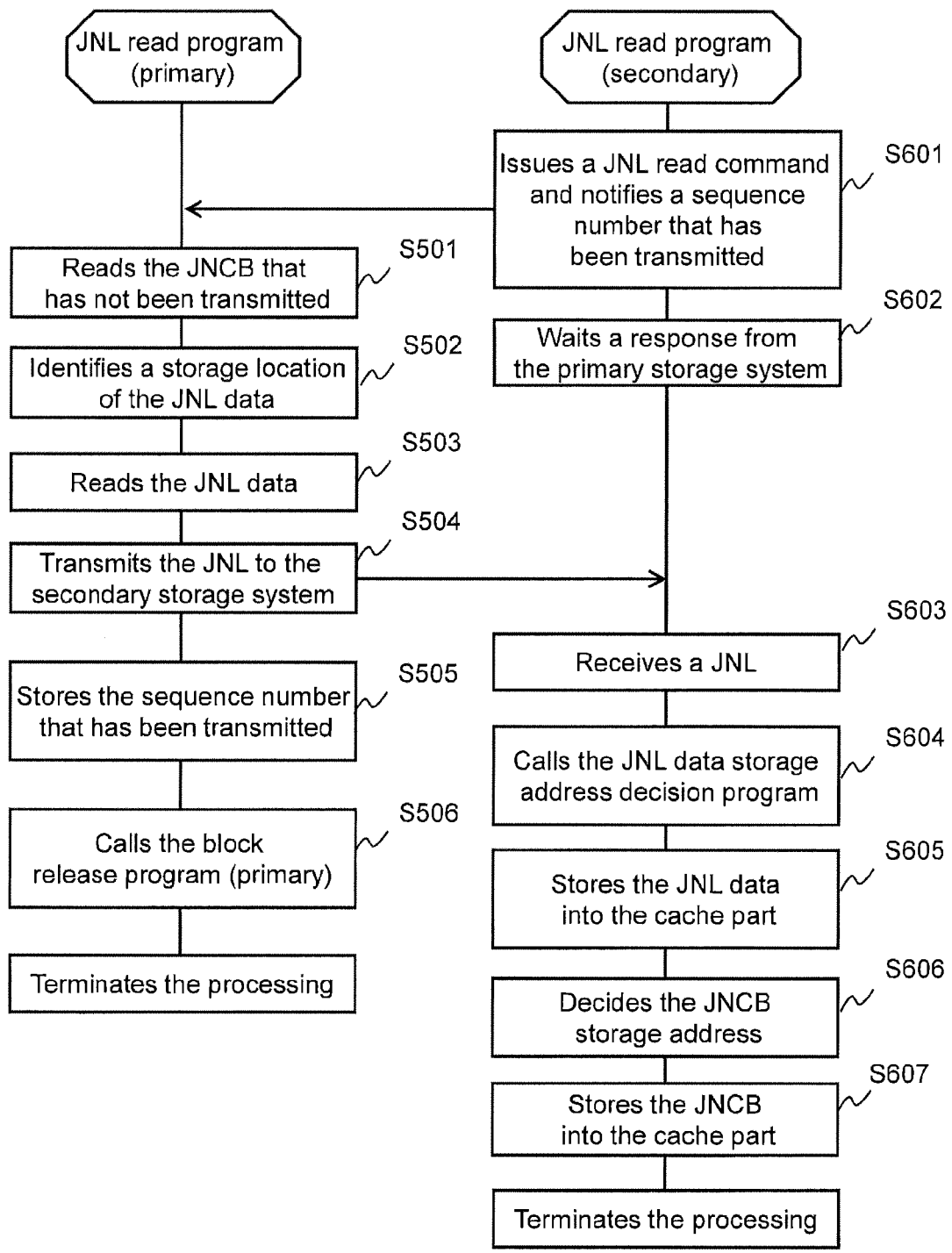
FIG. 25 is a flowchart of a JNL read processing in accordance with the embodiment 1.

FIG. 25 is a flowchart of a JNL read processing in accordance with the embodiment 1.

The JNL read program (secondary) 2227 of the secondary storage system 200B issues a JNL read command to the primary storage system 200A (step S601) and waits a response from the primary storage system 200A (step S602). The JNL read command includes a sequence number of a JNL that has been transmitted to the secondary storage system 200B (a transmitted sequence number).

In the case in which the JNL read program (primary) 2226 receives the JNL read command, the primary storage system 200A reads the JNCB 2523 that has not been transmitted (step S501). Here, the JNCB 2523 that has not been transmitted is identified based on the information that is managed by the primary storage system 200A. In the present embodiment, since the JNCB 2523 is arranged in a sequence number order, the JNCB 2523 that has not been transmitted can be easily identified by managing the JNCB 2523 that has not been transmitted by using a pointer.

In the next place, the JNL read program (primary) 2226 identifies a storage location of the JNL data 2524 by acquiring an address of the JNL data 2524 from the JNCB 2523 that has read (step S502) and reads the JNL data of the storage location that is corresponded (step S503). Here, in the case in which the JNL data 2524 that is corresponded has been stored into the cache part 223, the JNL read program (primary) 2226 reads the JNL data 2524 from the cache part 223. In the case in which the JNL data 2524 that is corresponded has not been stored into the cache part 223, the JNL read program (primary) 2226 reads the JNL data 2524 from the JVOL 252.

In the next place, the JNL read program (primary) 2226 transmits the JNL that has been read (the JNCB 2523 and the JNL data 2524) to the secondary storage system 20013 (step S504). In the next place, the JNL read program (primary) 2226 stores the sequence number that has been transmitted into the control information part 221 (step S505), calls the block release program (primary) 2224 (step S506), and terminates the processing. By these steps, the block release processing is executed (see FIG. 24).

On the other hand, in the case in which the secondary storage system 200B receives a JNL from the primary storage system 200A (step S603), the JNL read program (secondary) 2227 calls the JNL data storage address decision program 2223 (step S604). For the secondary storage system 200B, the JNL data storage address decision processing that is similar to that of FIG. 23 is executed, and a block and an address of the JVOL 253 that stores the JNL data 2524 are decided.

In the next place, the JNL read program (secondary) 2227 stores the JNL data 2524 into the cache part 223 as data that is stored into an address of the decided block of the JVOL 253 (step S605).

In the next place, the JNL read program (secondary) 2227 decides an address of the JVOL 253 that stores the JNCB 2523 (step S606), stores the JNCB 2523 into the cache part 223 as data that is stored to the decided address of the JVOL 253 (step S607), and terminates the processing. Here, the address that stores the JNCB 2523 is decided as an address next to the JNCB 2523 that has been stored or a leading head address of a JNCB region 2521 in the case in which the JNCB 2523 is stored up to the last of the JNCB region 2521.

In accordance with the above JNL read processing, the JNL data 2524 can be stored on a preferential basis into a region that is a block that is located close to the leading head of the JVOL 253 and that is provided with a free space and to which a region of the cache part 223 has a high degree of probability of having been allocated. By this configuration, regions to which the JNL data 2524 is stored can be aggregated to a comparatively small range, and an occurrence of a processing for newly allocating a cache part can be reduced in the case in which the JNL data 2524 is stored. An allocating method of a block is not restricted to the method. For instance, a free block that has been used most recently can be allocated as a block that stores the JNL data. By this configuration, there is a higher possibility that a region that is corresponded to a region of the free block is managed by the cache part 223, and there is a high possibility that a region of the cache part 223 can be used without executing processing for allocating a region of the cache part 223 to the region in the case in which data is stored into the free block.

Figure 26:
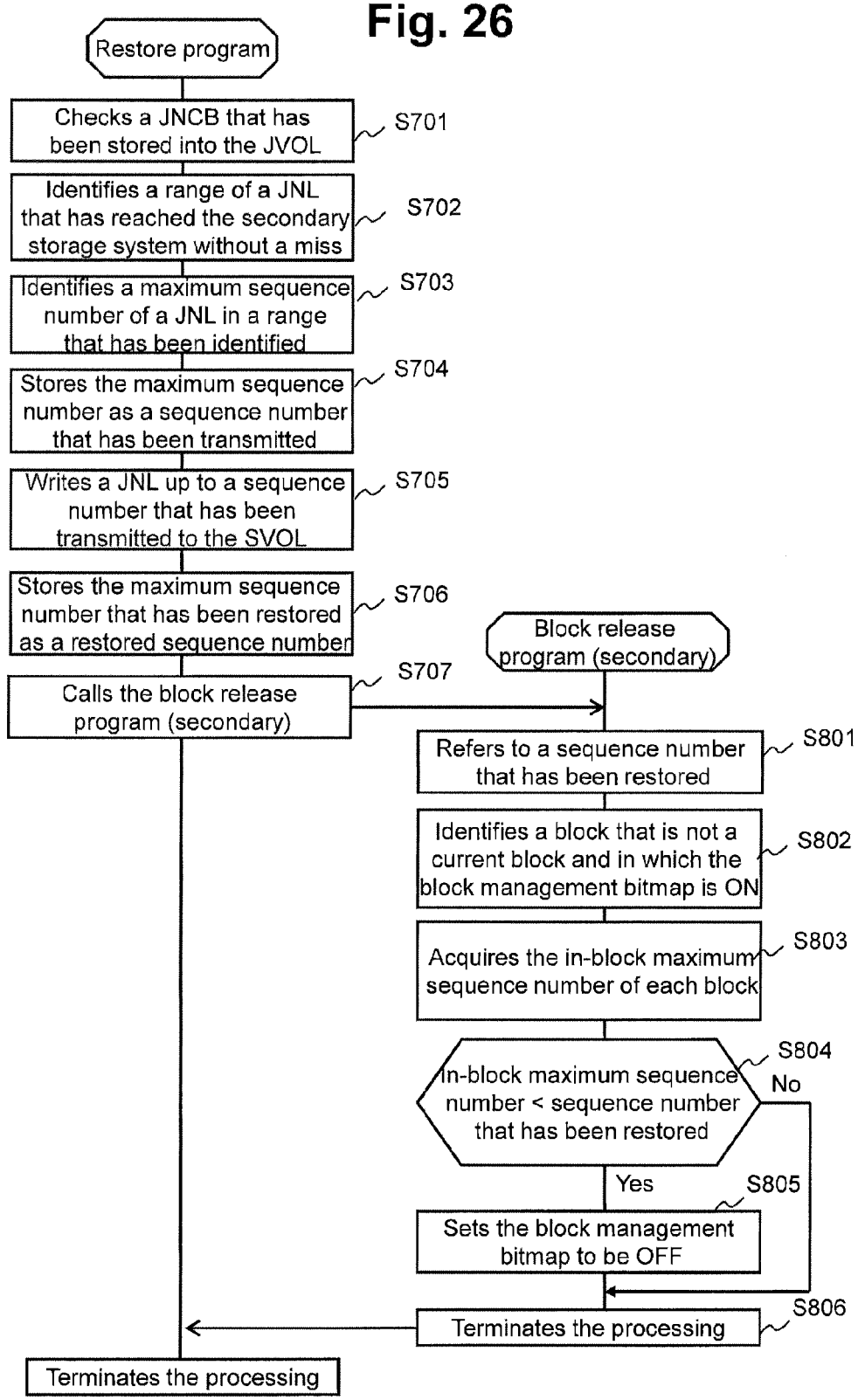
FIG. 26 is a flowchart of a restore processing in accordance with the embodiment 1.

FIG. 26 is a flowchart of a restore processing in accordance with the embodiment 1.

The restore processing is a processing for writing to the SVOL 254 based on a JNL and is executed on a regular basis for the secondary storage system 200B for instance.

The restore program 2228 checks a JNCB that has been stored into the JVOL 253 (step S701) and identifies a range of a JNL that has reached the secondary storage system 200B without a miss (step S702). Here, since the JNCB 2523 of a JNL that has not reached is all 0, a range of a JNL that has reached can be identified in an appropriate manner.

In the next place, the restore program 2228 identifies a maximum sequence number of a JNL in a range that has been identified (step S703) and stores the maximum sequence number as a sequence number that has been transmitted into the control information part 221 (step S704).

In the next place, the restore program 2228 acquires a JNL up to a sequence number that has been transmitted from the JVOL 253 and writes the JNL to the SVOL 254 in an order of a sequence number, that is, restores the JNL (step S705). In the case in which the corresponded JNL data 2524 has been stored into the cache part 223 for an acquisition from the JVOL 253, the restore program 2228 reads the JNL data 2524 from the cache part 223. In the case in which the corresponded JNL data 2524 has not been stored into the cache part 223, the restore program 2228 reads the JNL data 2524 from the JVOL 253. Moreover, in a write to the JVOL 254, the restore program 2228 stores the JNL data 2524 into the cache part 223 as the data of an write address of the JVOL 254.

In the next place, the restore program 2228 stores the maximum sequence number that has been restored as a restored sequence number into the control information part 221 (step S706) and calls the block release program (secondary) 2225 (step S707). The block release program (secondary) 2225 executes the block release processing.

More specifically, the block release program (secondary) 2225 refers to the sequence number that has been restored (step S801) and identifies a block that is not a current block and in which the block management bitmap 2212 is ON (a bit value is "1") (step S802).

In the next place, the block release program (secondary) 2225 acquires the in-block maximum sequence number of each block that has been identified from the in-block maximum sequence number information 2215 (step S803), and judges whether or not the in-block maximum sequence number that has been acquired for each block is smaller than a restored sequence number that has been referred to (step S804).

In the case in which the in-block maximum sequence number that has been acquired is smaller than a restored sequence number that has been referred to (Yes for the step S804) as a result of the judgment, since it means that all JNLs of the block have been restored to the SVOL 254, the block release program (secondary) 2225 sets a bit value that is corresponded to the block of the block management bitmap 2212 to be OFF ("0"), to make the block to be a free block (step S805), terminates the processing (step S806), and notifies the restore program 2228 of that. On the other hand, in the case in which the in-block maximum sequence number that has been acquired is not smaller than a restored sequence number that has been referred to (No for the step S804) as a result of the judgment, the block release program (secondary) 2225 terminates the processing (step S806) and notifies the restore program 2228 of that. In the case in which the restore program 2228 receives the notification of that the processing has been terminated from the block release program (secondary) 2225, the restore program 2228 terminates the restore processing.

For the block release processing, all blocks in which a restore has been executed by the JNL data can be made a free block and can be used for the subsequent storage of the JNL data.

Embodiment 2

In the next place, the computer system in accordance with the embodiment 2 will be described in the following.

While the JNL data 2524 of a JNL is managed based on a block for the computer system in accordance with the embodiment 1, the JNCB 2523 of a JNL is also managed based on a block similarly for the computer system in accordance with the embodiment 2. The elements that are equivalent to those of the computer system in accordance with the embodiment 1 are numerically numbered similarly and the different points will be mainly described.

Figure 27:
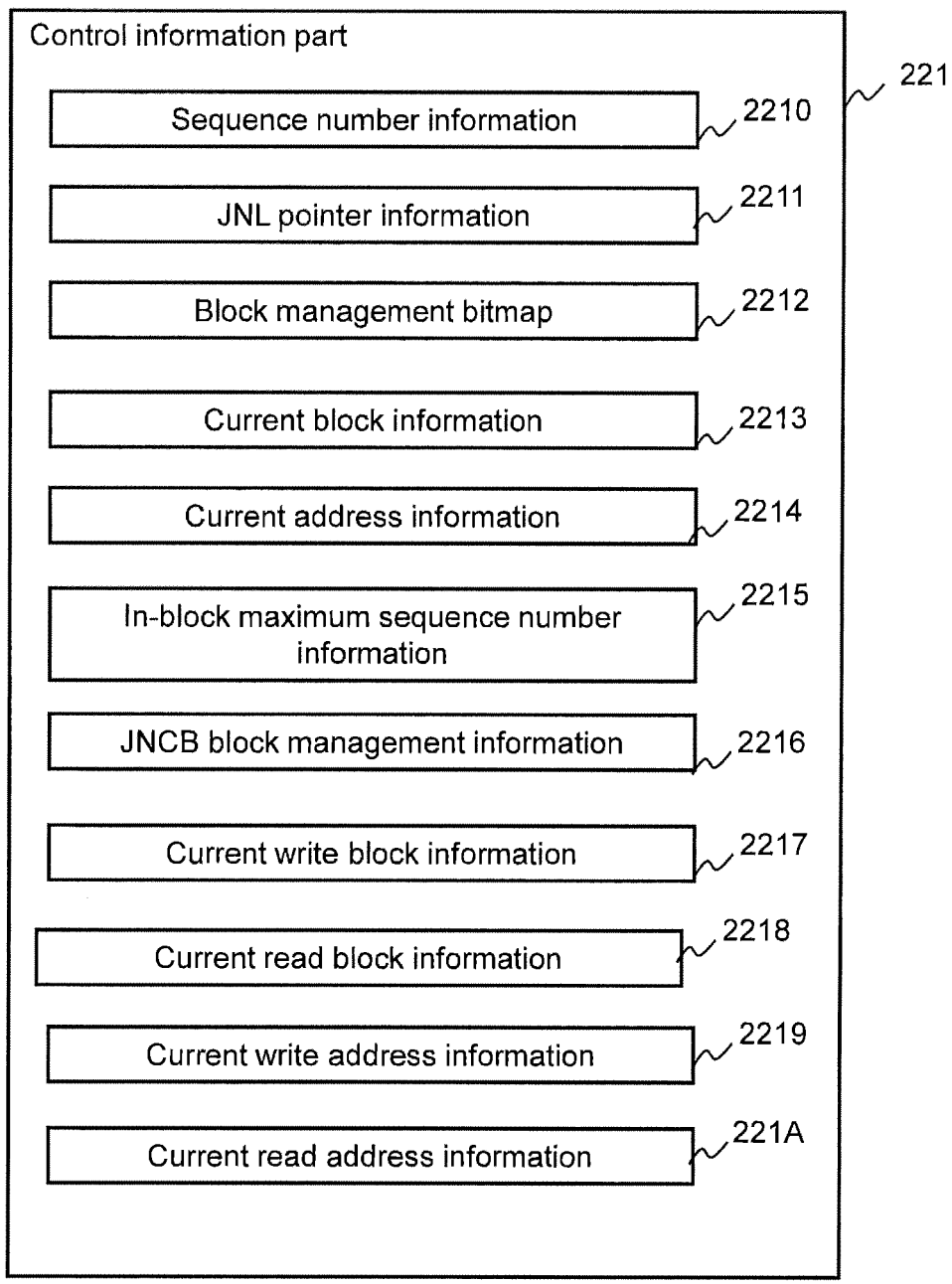
FIG. 27 is a detailed view showing a control information part in accordance with the embodiment 2.
Figure 28:
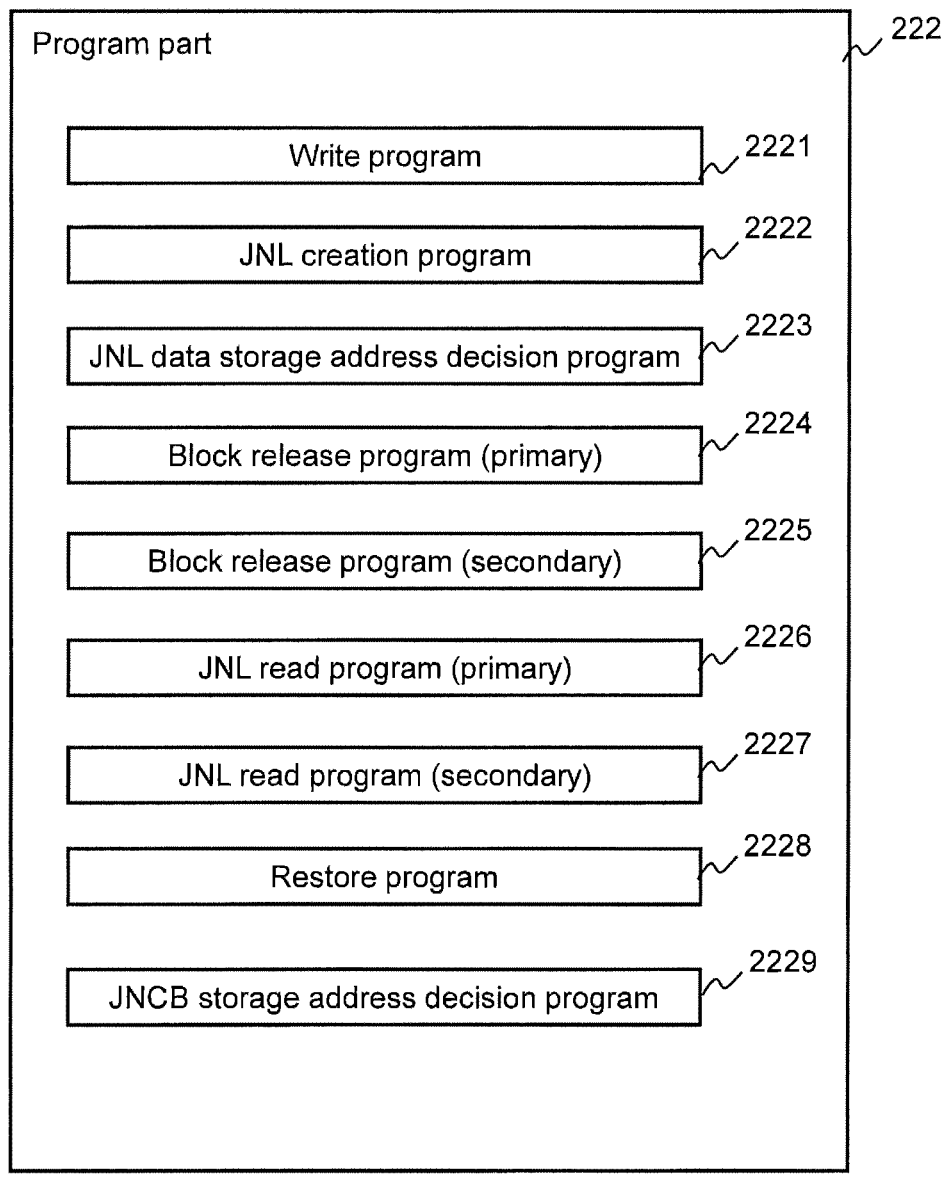
FIG. 28 is a detailed view showing a program part in accordance with the embodiment 2.

FIG. 27 is a detailed view showing a control information part in accordance with the embodiment 2. FIG. 28 is a detailed view showing a program part in accordance with the embodiment 2.

The control information part 221 in accordance with the embodiment 2 further stores the JNCB block management information 2216, the current write block information 2217, the current read block information 2218, the current write address information 2219, and the current read address information 221A to the control information part 221 in accordance with the embodiment 1.

The program part 222 in accordance with the embodiment 2 further stores the JNCB storage address decision program 2229 to the program part 222 in accordance with the embodiment 1.

Figure 29:
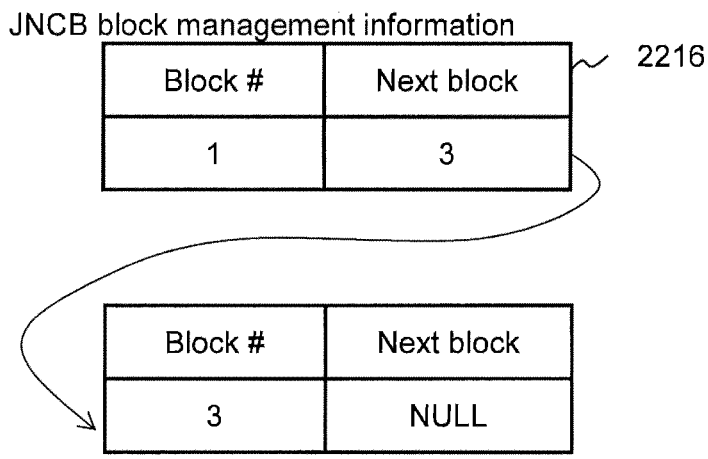
FIG. 29 is a view showing an example of the JNCB block management information in accordance with the embodiment 2.
Figure 30:
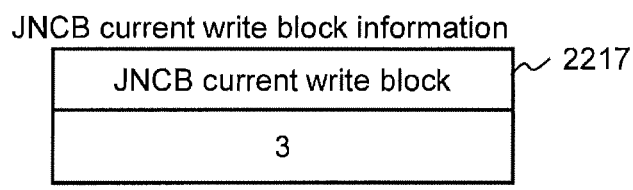
FIG. 30 is a view showing an example of the JNCB current write block information in accordance with the embodiment 2.
Figure 31:
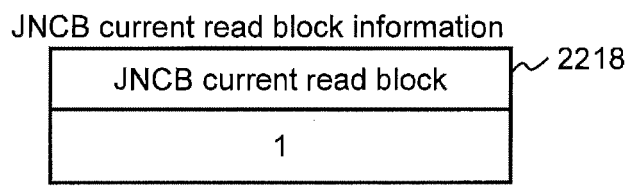
FIG. 31 is a view showing an example of the JNCB current read block information in accordance with the embodiment 2.
Figure 32:
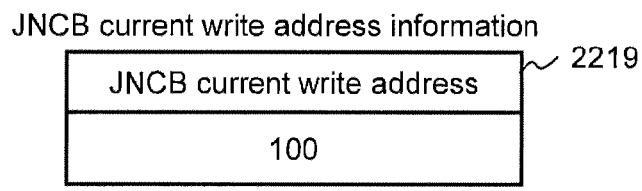
FIG. 32 is a view showing an example of the JNCB current write address information in accordance with the embodiment 2.
Figure 33:
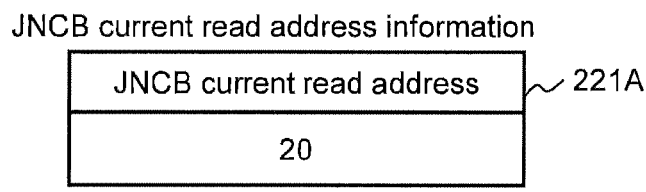
FIG. 33 is a view showing an example of the JNCB current read address information in accordance with the embodiment 2.
Figure 34:
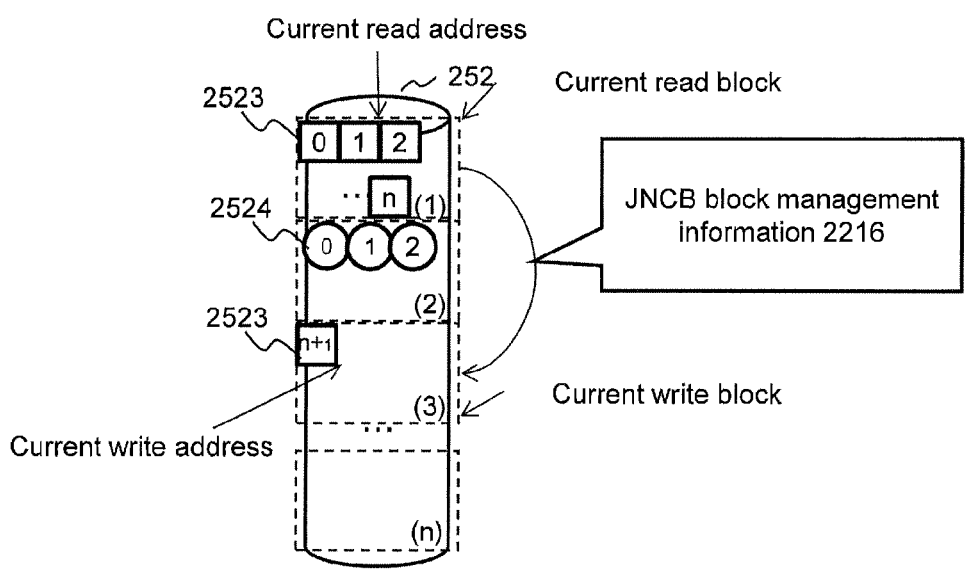
FIG. 34 is a view illustrating a block and an address in accordance with the embodiment 2.

FIG. 29 is a view showing an example of the JNCB block management information in accordance with the embodiment 2. FIG. 30 is a view showing an example of the JNCB current write block information in accordance with the embodiment 2. FIG. 31 is a view showing an example of the JNCB current read block information in accordance with the embodiment 2. FIG. 32 is a view showing an example of the JNCB current write address information in accordance with the embodiment 2. FIG. 33 is a view showing an example of the JNCB current read address information in accordance with the embodiment 2. FIG. 34 is a view illustrating a block and an address in accordance with the embodiment 2.

The JNCB block management information 2216 is the information for managing an order of a block in which the JNCB 2523 is stored. More specifically, a block number of a block in which the JNCB 2523 is stored and a block of the next order, that is, a block number of a block in which the subsequent JNCB 2523 is stored are corresponded to each other for a management. In accordance with the JNCB block management information 2216, as shown in FIG. 34, a block of the next order in which the subsequent JNCB 2523 is stored can be identified.

The JNCB current write block information 2217 is the information for storing a block number of a current write block as shown in FIG. 30. The current write block is a block in which a new JNCB 2523 is to be stored as shown in FIG. 34.

The JNCB current read block information 2218 is the information for storing a block number of a current read block as shown in FIG. 31. The current read block is a block in which a JNCB 2523 that is transmitted in the next place is stored as shown in FIG. 34.

The JNCB current write address information 2219 is the information for storing a current write address of a current write block as shown in FIG. 32. The current write address is an address in a block in which a new JNCB 2523 is stored as shown in FIG. 34.

The JNCB current read address information 221A is the information for storing a current read address of a current read block as shown in FIG. 33. The current read address is an address in a block in which a JNCB 2523 that is transmitted in the next place is stored as shown in FIG. 34.

In the next place, an operation of the computer system in accordance with the embodiment 2 will be described in the following. For an operation of the computer system in accordance with the embodiment 2, a processing for deciding a storage address of the JNCB for the primary storage system 200A, a processing for deciding a storage address of the JNCB for the secondary storage system 200B, a processing for reading the JNCB from the JVOL 252 of the primary storage system 200A, and a processing for reading the JNCB from the JVOL 253 of the secondary storage system 200B are different from those of an operation of the computer system in accordance with the embodiment 1. For a block in which the JNCB 2523 has been stored, the block release processing can be executed by a processing similar to that of a block in which the JNL data 2524 has been stored.

Figure 35:
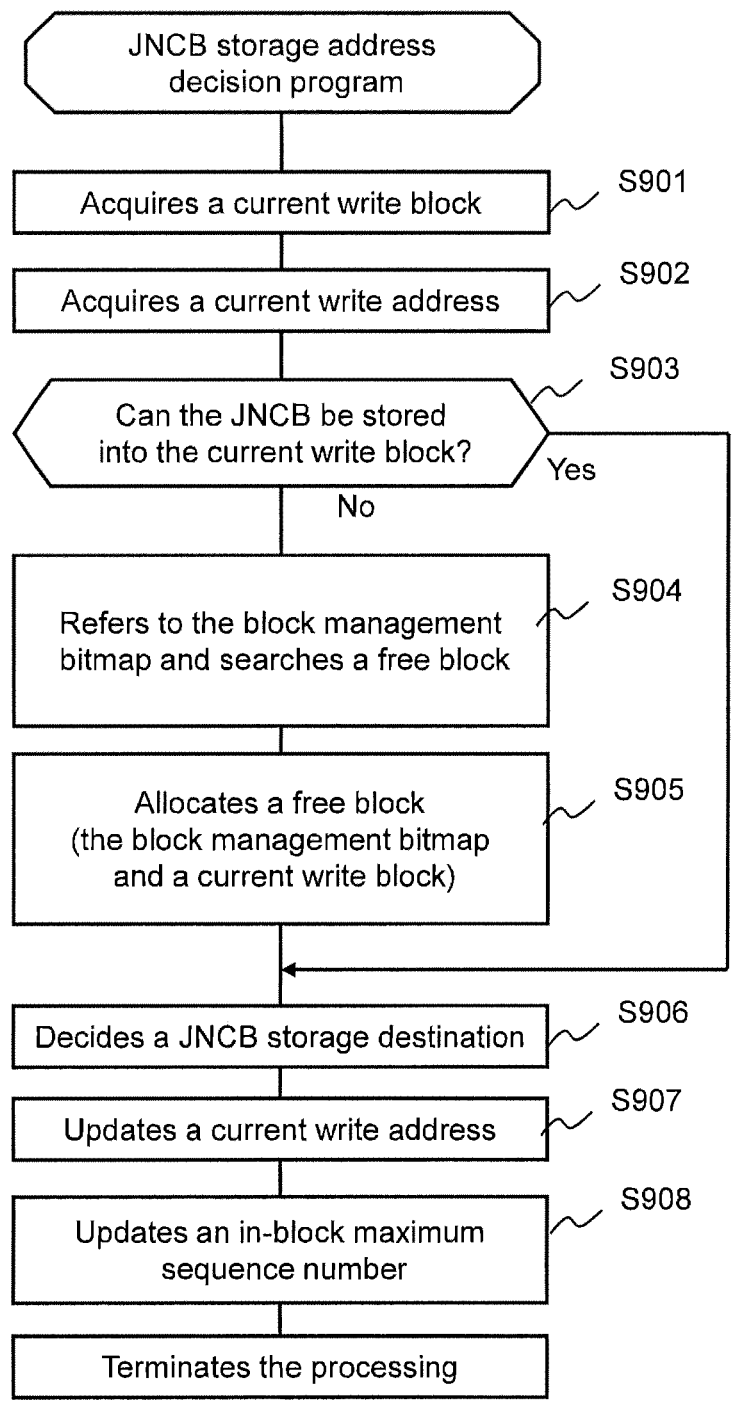
FIG. 35 is a flowchart of a JNCB storage address decision processing in accordance with the embodiment 2.

FIG. 35 is a flowchart of a JNCB storage address decision processing in accordance with the embodiment 2.

The JNCB storage address decision processing is executed for each of the primary storage system 200A and the secondary storage system 200B. For the primary storage system 200A, the JNCB storage address decision processing is called in the S204 of the journal creation program 2222.

A JNCB storage address decision program 2229 acquires a block number of a current block from the current write block information 2217 (step S901), acquires a current write address from the current write address information 2219 (step S902), and judges whether or not the JNCB 2523 can be stored into the current write block, that is, whether or not the current block has a free space (step S903).

In the case in which the current write block has a free space (Yes for the step S903) as a result of the judgment, the JNCB storage address decision program 2229 proceeds to the step S906. On the other hand, in the case in which the current write block has no free space (No for the step S903) as a result of the judgment, the JNCB storage address decision program 2229 searches a free block (step S904). In the present embodiment, the JNCB storage address decision program 2229 searches a block that is provided with a bit value of "0" from a leading head of a block management bitmap 2212.

In the next place, the JNCB storage address decision program 2229 allocates the identified block as a block that stores the JNCB 2523 and proceeds to a processing of the step S906 (step S905). More specifically, the JNCB storage address decision program 2229 modifies a bit value of the block management bitmap 2212 to the identified block to be "1" and modifies a block number of the current write block information 2217 to be a block number of the identified block.

In the step S906, the JNCB storage address decision program 2229 decides an address that stores the JNCB 2523 of the corresponded block. In the next place, the JNCB storage address decision program 2229 updates a current address of the current write address information 2219 to be a decided address (step S907), updates a maximum sequence number to the block of the in-block maximum sequence number information 2215 to be a sequence number of the JNCB 2523 (step S908), and terminates the processing.

In accordance with the above JNCB storage address decision processing, the JNCB 2523 can be stored on a preferential basis into a region that is a block that is located close to the leading head of the JVOL 252 and that is provided with a free space and to which a region of the cache part 223 has a high degree of probability of having been allocated. By this configuration, regions to which the JNCB 2523 is stored can be aggregated to a comparatively small range, and an occurrence of a processing for newly allocating a region of a cache part can be reduced in the case in which the JNCB 2523 is stored. An allocating method of a block is not restricted to the method. For instance, a free block that has been used most recently can be allocated as a block that stores the JNCB 2523. By this configuration, there is a higher possibility that a region that is corresponded to a region of the free block is managed by the cache part 223, and there is a high possibility that a region of the cache part 223 can be used without executing processing for allocating a region of the cache part 223 to the region in the case in which data is stored into the free block. As a method for acquiring a free block that has been used most recently, the free block can be managed by a stack.

Figure 36:
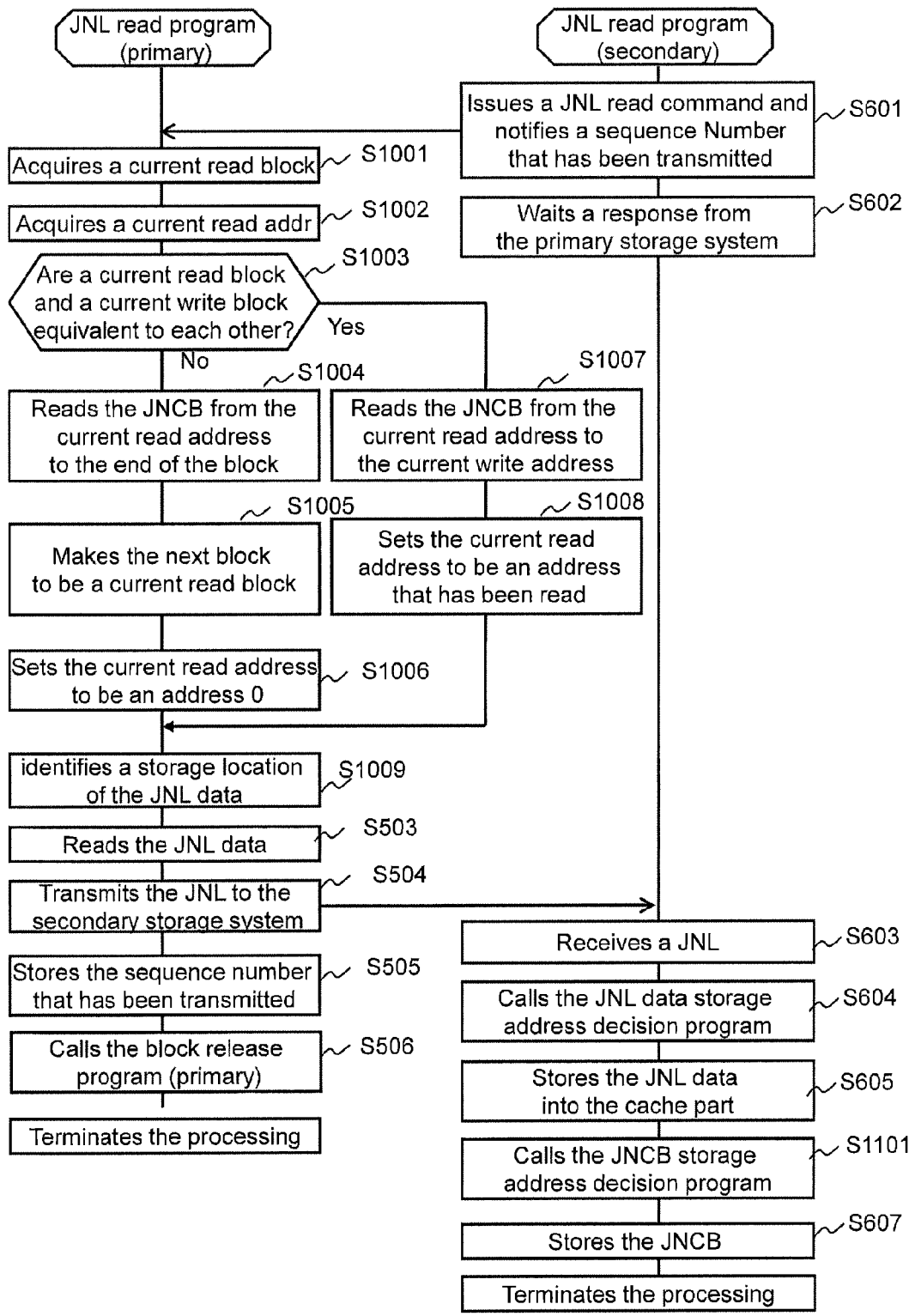
FIG. 36 is a flowchart of a JNL read processing in accordance with the embodiment 2.

FIG. 36 is a flowchart of a JNL read processing in accordance with the embodiment 2. The parts that are equivalent to those of the JNL read processing (see FIG. 25) in accordance with the embodiment 1 are numerically numbered similarly and the different points will be mainly described.

In the case in which the JNL read program (primary) 2226 receives the JNL read command, the primary storage system 200A acquires a current read block number from the current read block information 2218 (step S1001) and acquires a current read address from the current read address information 221A (step S1002). In the next place, the JNL read program (primary) 2226 judges whether or not a current read block and a current write block are equivalent to each other (step S1003).

In the case in which a current read block and a current write block are not equivalent to each other (No for the step S1003) as a result of the judgment, the JNL read program (primary) 2226 reads the JNCB 2523 from the current read address to the end of the current read block (step S1004), identifies the next block based on the JNCB block management information 2216, makes the block to be a current read block (step S1005), sets the current read address of the current read address information 221A to be "0" (step S1006), and proceeds to the step S1009. By these steps, in the case in which the JNL read processing is executed after that, the JNCB 2523 can be read from the subsequent block in an appropriate manner.

On the other hand, in the case in which a current read block and a current write block are equivalent to each other (Yes for the step S1003) as a result of the judgment, the JNL read program (primary) 2226 reads the JNCB 2523 from the current read address to the current write address (step S1007), sets the current read address to be an address that has been read (an address equal to the current write address) (step S1008), and proceeds to the step S1009.

In the step S1009, the JNL read program (primary) 2226 identifies a storage location of the JNL data 2524 from the JNCB 2523 that has been read (step S1009). After that, the JNL read program (primary) 2226 executes the processing of the step S503 and the subsequent steps.

On the other hand, the JNL read program (secondary) 2227 stores the JNL data 2524 into the cache part 223 as data that is stored into an address of the decided block of the JVOL 253 (step S605) and calls the JNCB storage address decision program 2229 (step S1101). After that, the JNL read program (secondary) 2227 acquires a block and an address of the JVOL 253 that stores the JNCB 2523 from the JNCB storage address decision program 2229.

Figure 37:
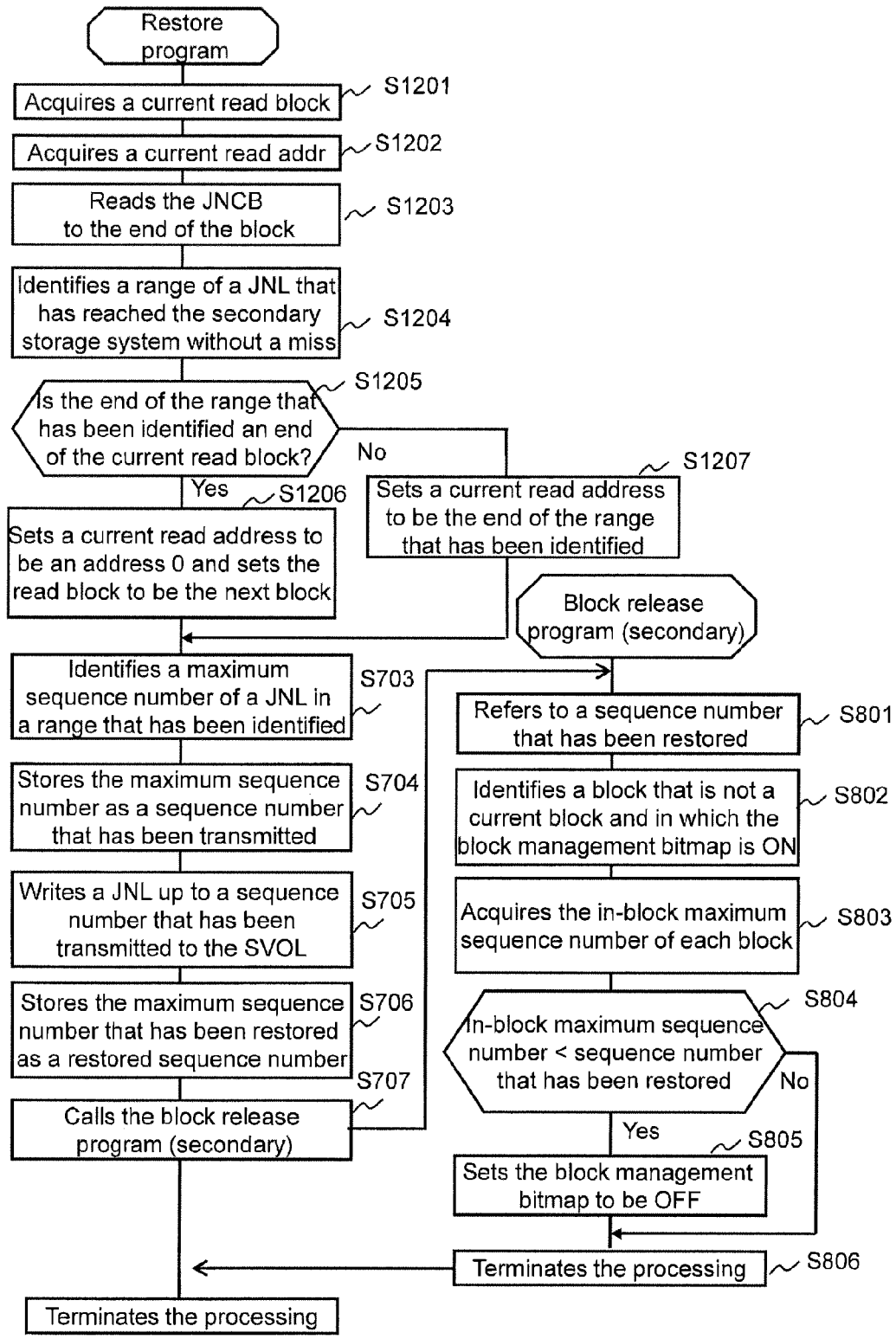
FIG. 37 is a flowchart of a restore processing in accordance with the embodiment 2.

FIG. 37 is a flowchart of a restore processing in accordance with the embodiment 2. The parts that are equivalent to those of the restore processing (see FIG. 26) in accordance with the embodiment 1 are numerically numbered similarly and the different points will be mainly described.

The restore processing is executed on a regular basis for the secondary storage system 200B for instance.

The restore program 2228 acquires a current read block number from the current read block information 2218 (step S1201) and acquires a current read address from the current read address information 221A (step S1202). In the next place, the restore program 2228 reads the JNCB 2523 to the end of the current read block (step S1203) and identifies a range of a JNL that has reached the secondary storage system 200B without a miss (step S1204). Here, since the JNCB 2523 of a JNL that has not reached is all 0, a range of a JNCB 2523 that has reached can be identified in an appropriate manner.

In the next place, the restore program 2228 judges whether or not the end of the range that has been identified is an end of the current read block (step S1205). In the case in which the end of the range that has been identified is an end of the current read block (Yes for the step S1205) as a result of the judgment, the restore program 2228 sets a current read address of the current read address information 221A to be 0, identifies the next block based on the JNCB block management information 2216, sets the block to be a current read block (step S1206), and proceeds to the step S703. By these steps, in the case in which the restore processing is executed after that, the JNCB 2523 can be read in an appropriate manner from the subsequent block in which the JNCB 2523 has been stored.

On the other hand, in the case in which the end of the range that has been identified is not an end of the current read block (No for the step S1205) as a result of the judgment, the restore program 2228 sets a current read address of the current read address information 221A to be an address of the end of the range that has been identified (step S1207), and proceeds to the step S703.

In accordance with the above embodiment 2, the JNCB 2523 can be stored on a preferential basis into a region that is a block that is located close to the leading head of the JVOL 253 and that is provided with a free space and to which a region of the cache part 223 has a high degree of probability of having been allocated. By this configuration, regions to which the JNCB 2523 is stored can be aggregated to a comparatively small range, and an occurrence of a processing for newly allocating a region of a cache part can be reduced in the case in which the JNCB 2523 is stored.

Embodiment 3

In the next place, the computer system in accordance with the embodiment 3 will be described in the following.

While the JVOL 252 and the JVOL 253 are managed based on a plurality of blocks of a common fixed length for the computer system in accordance with the embodiment 2, the JVOL 252 and the JVOL 253 are managed based on two types of blocks of different sizes for the computer system in accordance with the embodiment 3. Consequently, the number of blocks for the JVOL 252 and the JVOL 253 is reduced and the information that is required for a block management is reduced in accordance with the embodiment 3.

Figure 38:
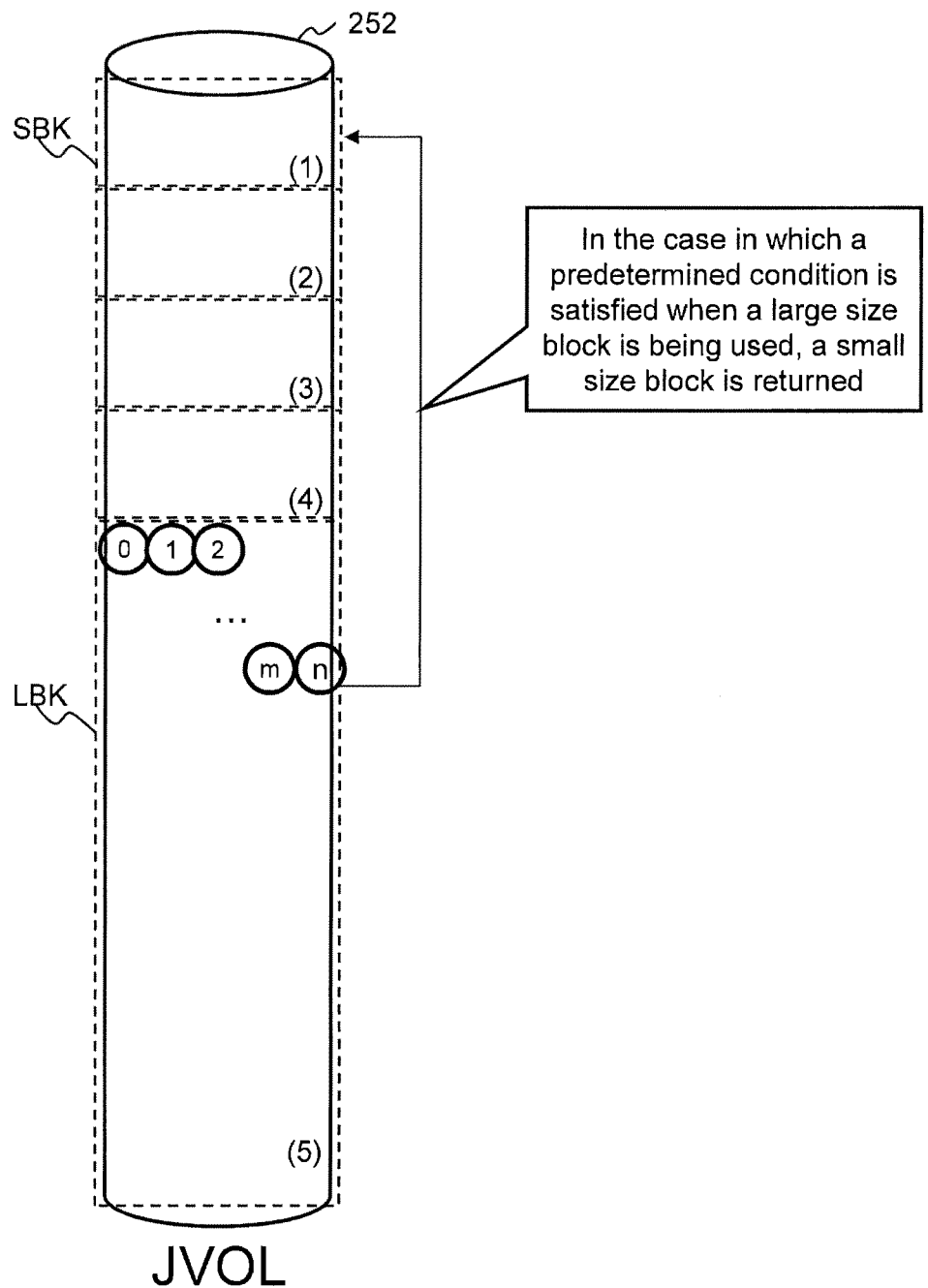
FIG. 38 is a view illustrating a summary of an embodiment 3.

FIG. 38 is a view illustrating a summary of an embodiment 3.

In the present embodiment, the JVOL 252 (253) is divided into a plurality of (four in the figure) blocks of a small size (a small capacity) (a small size block) SBK and one block of a large size (a large capacity) (a large size block) LBK to be managed. By this configuration, the control information amount for managing a block, for instance, the information amount of the information of the block management bitmap 2212 and the in-block maximum sequence number information 2215 can be reduced in addition to the effects of the above described embodiments 1 and 2.

There is a possibility that a write amount from the host 100A is sharply increased on a temporary basis to exceed a pace in which a small size block of the JVOL 252 is released. In this case, a JNL is stored into the large size block LBK in some cases. After a reduction in a write amount, a processor load can be reduced by using a small size block as described in the embodiment 1. However, in a logic that has described in the embodiment 1, a JNL is stored into the large size block LBK until all regions of the large size block LBK is used up.

In the case in which a JNL is stored into the large size block LBK until all regions of the large size block LBK is used up as described above, a processing for destaging a JNL that has been transmitted, a processing for allocating a region of the cache part 223, and a processing for releasing a region of the cache part 223 are executed, whereby a load to the processor is increased.

Consequently, in the embodiment 3, a control is executed in such a manner that a JNL can be stored into the small size block SBK even before all regions of the large size block LBK is used up.

Figure 39:
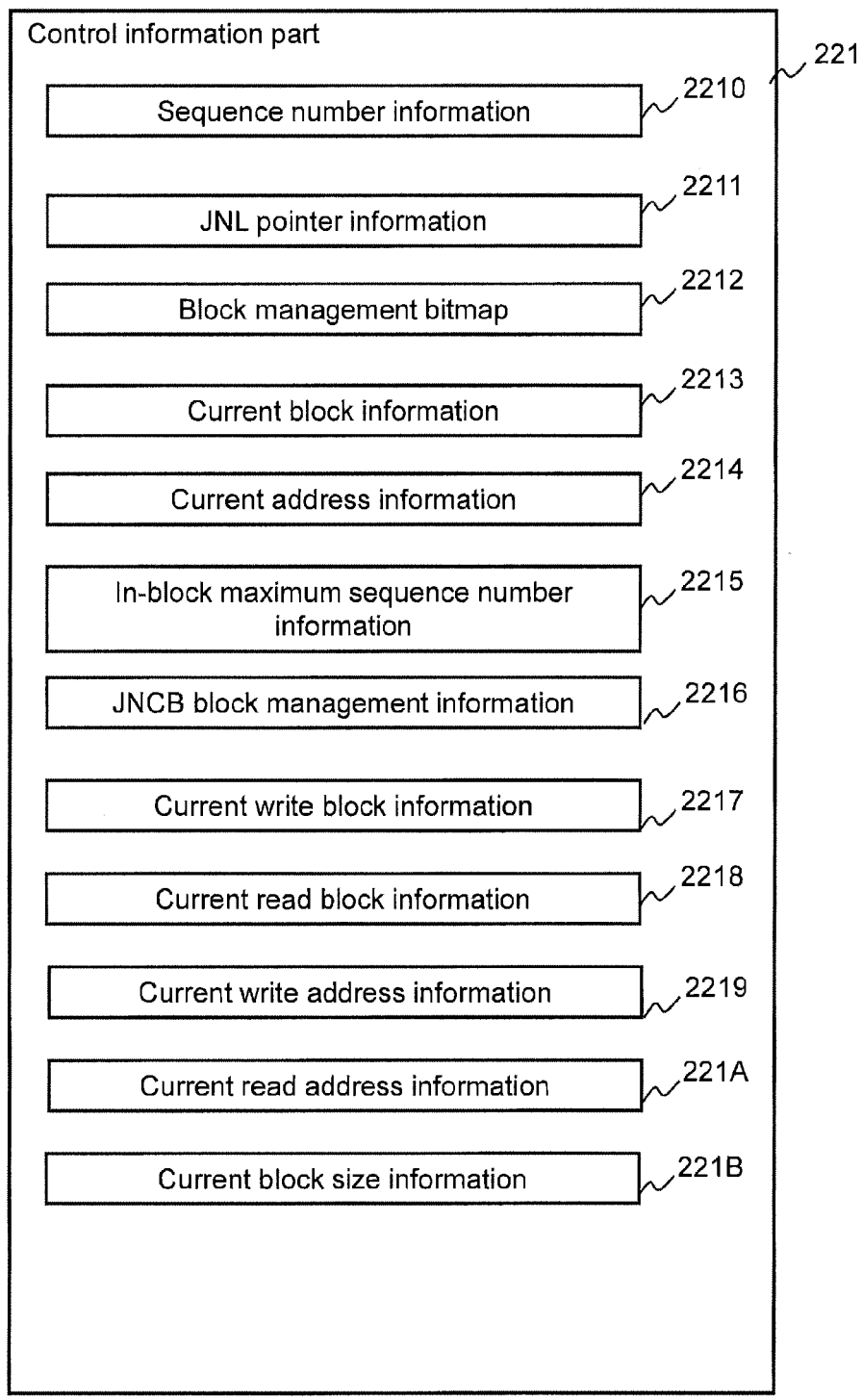
FIG. 39 is a detailed view showing a control information part in accordance with the embodiment 3.

FIG. 39 is a detailed view showing a control information part in accordance with the embodiment 3.

Figure 40:
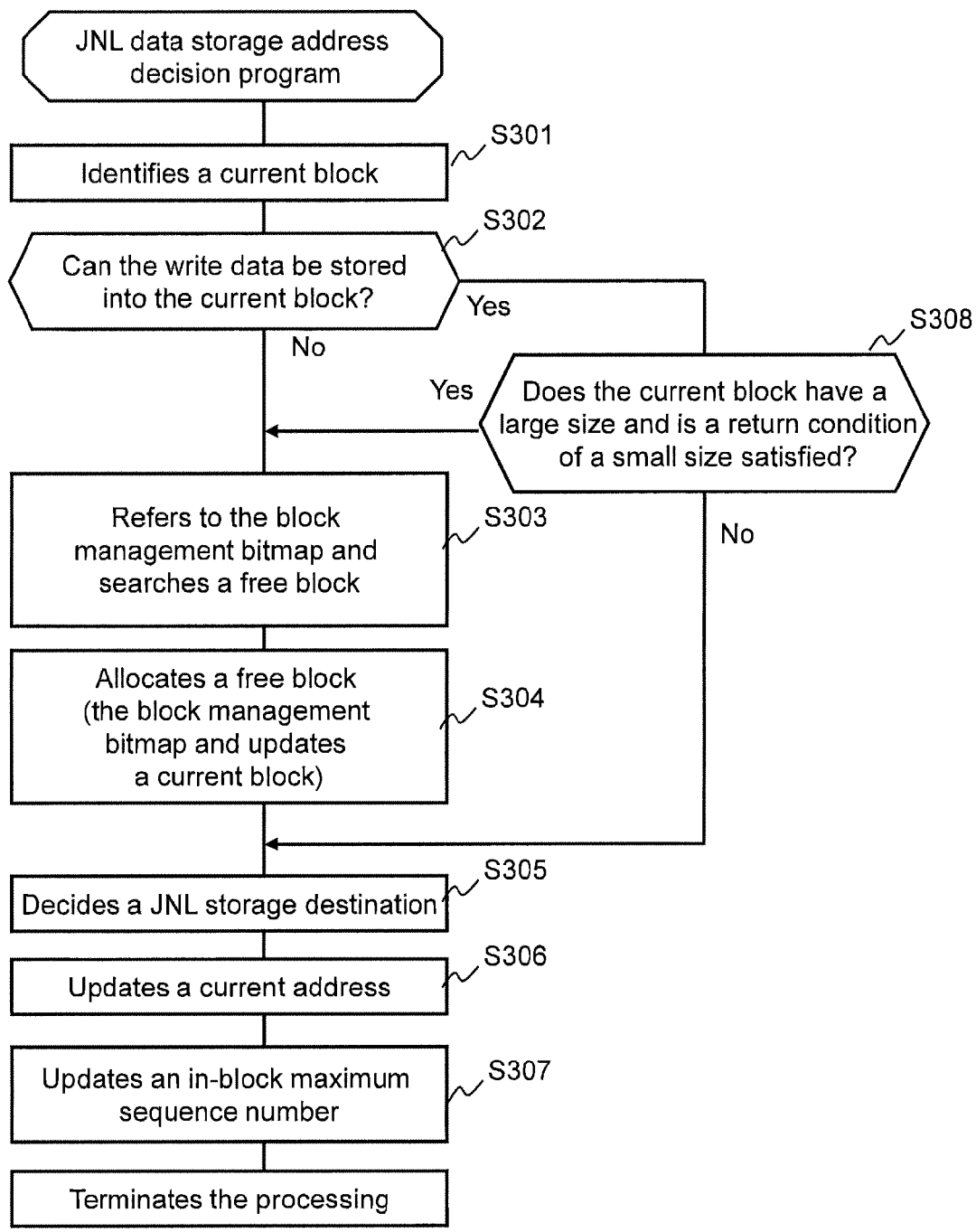
FIG. 40 is a flowchart of a JNL data storage address decision processing in accordance with the embodiment 3.

The control information part 221 in accordance with the embodiment 3 further stores the current block size information 221B to the control information part 221 in accordance with the embodiment 2. The current block size information 221B stores the information that indicates whether a size of a current block is a large size or a small size FIG. 40 is a flowchart of a JNL data storage address decision processing in accordance with the embodiment 3. The parts that are equivalent to those of the JNL data storage address decision processing (see FIG. 23) in accordance with the embodiment 1 are numerically numbered similarly and the different points will be mainly described.

In the case in which it is decided that the current block has a free space in the step S302 (Yes for the step S302), the JNL data storage address decision program 2223 judges whether or not the current block has a large size and a predetermined return condition is satisfied (step S308). Here, the predetermined return condition is a condition for judging whether or not an operation is possible by only a block of a small size in the case in which a remaining amount of the current JNL data 2524 is continued. For instance, the predetermined return condition is a condition in which "an average JNL data amount that remains in the current JVOL 252<the total free capacity of a small size block" in addition to "a small size block has a free space". Moreover, in consideration of a variation of an occurrence of the JNL data 2524 after that, "an average JNL data amount that remains in the current JVOL 252" can be replaced by "an average JNL data amount that remains in the current JVOL 252+A" (A is a predetermined data amount).

In the case in which the current block has a large size and a predetermined return condition is satisfied (Yes for the step S308) as a result of the judgment, the JNL data storage address decision program 2223 proceeds to the step S303 and executes the subsequent processing. By this configuration, the JNL data 2524 can be stored into a small size block from a state in which a large size block is free, and the execution of a processing for destaging a JNL that has been transmitted, a processing for allocating a region of the cache part 223, and a processing for releasing a region of the cache part 223 can be reduced in an appropriate manner. In the case in which the current block has a small size or a predetermined return condition is not satisfied (No for the step S308), the JNL data storage address decision program 2223 proceeds to the step S305.

The JNL data storage address decision processing has been described above. However, a processing for deciding a storage address for the JNCB 2523 (JNCB storage address decision processing) can also be implemented by adding a step that is similar to the step S308 for the JNCB storage address decision processing of the embodiment 2 (see FIG. 35).

Figure 41:
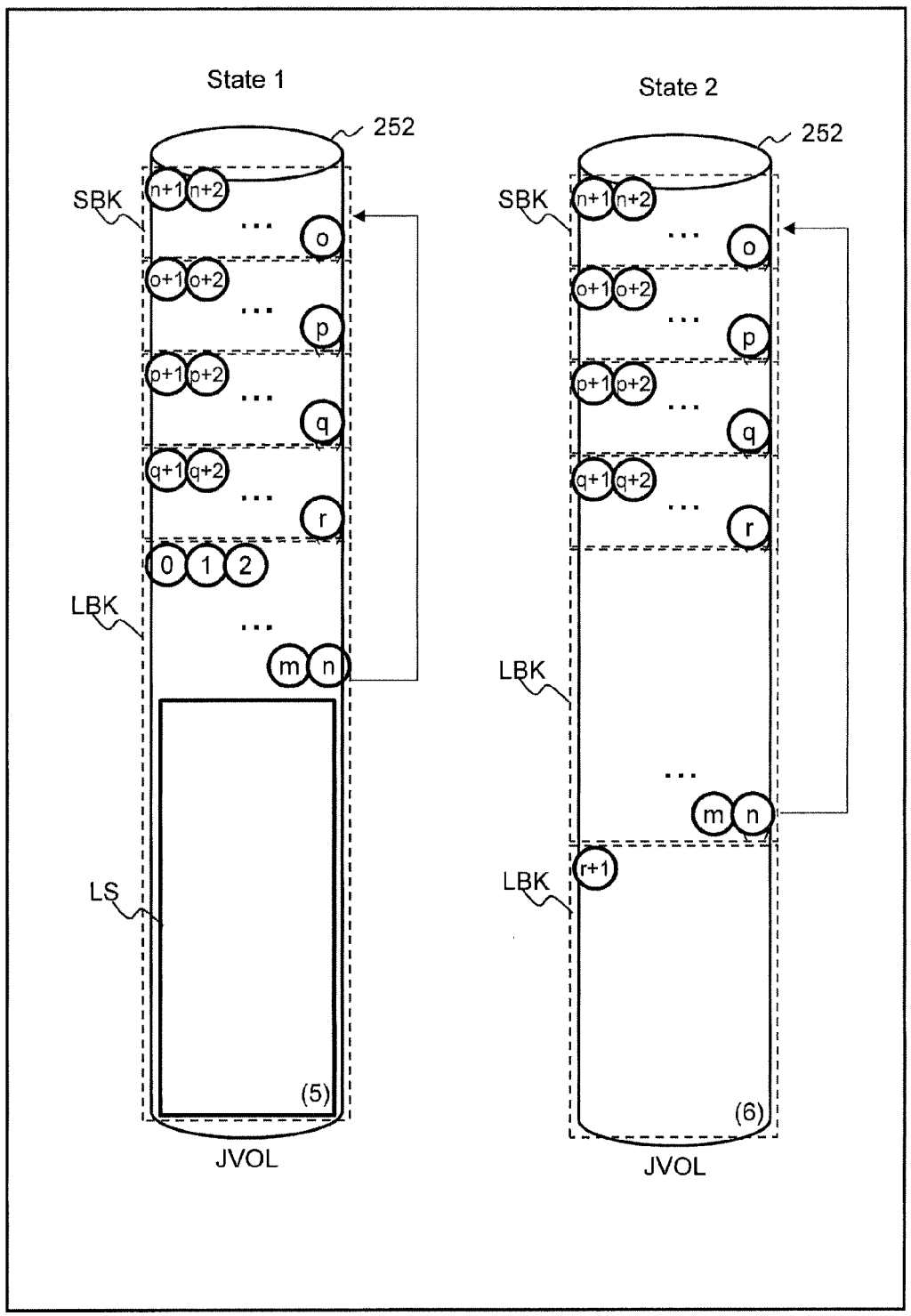
FIG. 41 is a view illustrating a modified example in accordance with the embodiment 3.

FIG. 41 is a view illustrating a modified example in accordance with the embodiment 3.

In the above described example, there is one large size block LBK for the JVOL 252 (253). In this case, as shown in the state 1, in the case in which the large size block LBK has a free region LS and the JNL data 2524 is stored into the small size block SBK, the large size block LBK is managed as a block that is being used before all of the JNL data 2524 that has been stored is transmitted. Consequently, even in the case in which an occurrence of the JNL data 2524 is sharply increased, a situation in which a free region LS is not used occurs.

On the other hand, as shown in the state 2 for instance, it is thought that the JVOL 252 is provided with a plurality of large size blocks LBK. For instance, a size of the large size block LBK can be a common size. In the case in which a plurality of large size blocks LBK is provided with as described above, other large size blocks LBK can be used, whereby a capacity of a useless free region can be reduced.

Embodiment 4

In the next place, the computer system in accordance with the embodiment 4 will be described in the following.

For the computer system in accordance with the embodiment 4, the JVOL 252 and the JVOL 253 are configured with a virtual volume (a virtual VOL) by using a capacity virtualization function (Thin Provisioning) in the above described embodiment.

Figure 42:
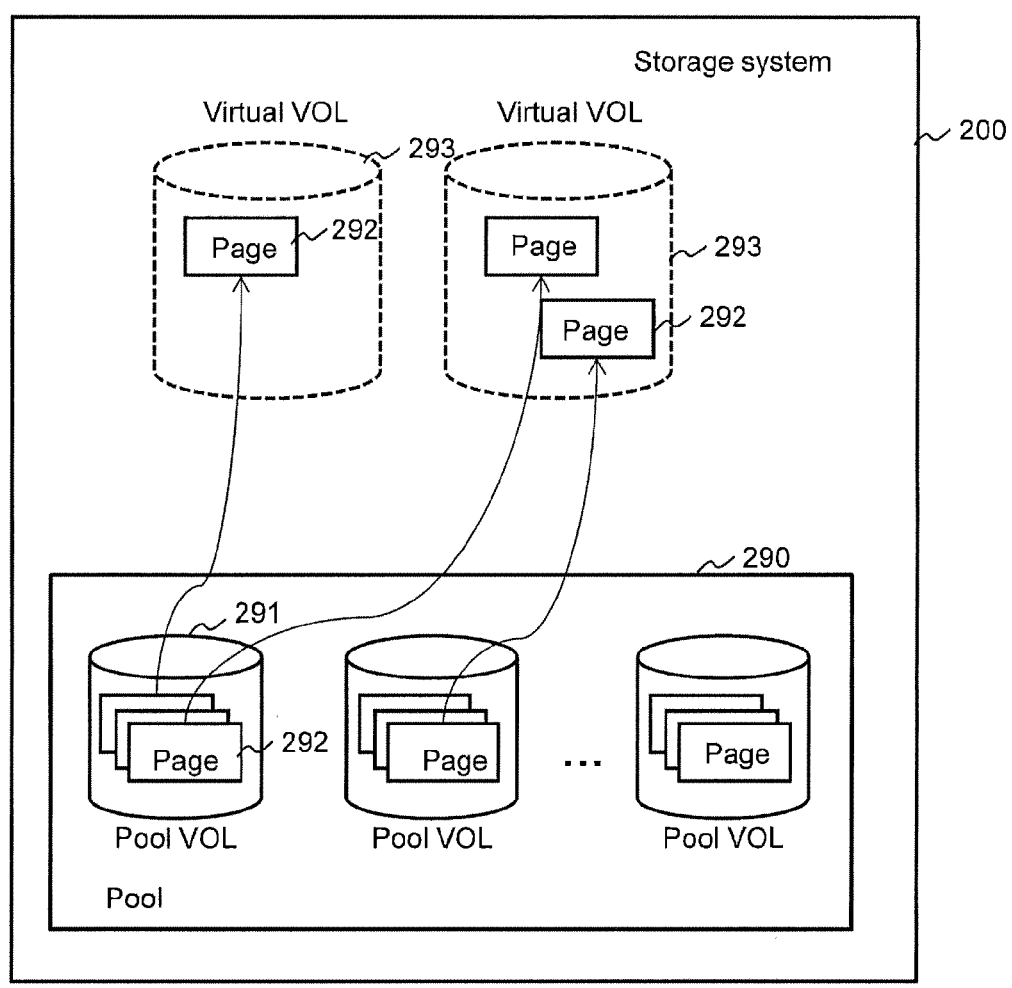
FIG. 42 is a view illustrating a virtual volume in accordance with the embodiment 4.

FIG. 42 is a view illustrating a virtual volume in accordance with the embodiment 4.

The storage system 200 (200A, 200B) is provided with a capacity pool (a pool) 290 that is configured by a plurality of storage regions of HDDs 240. The pool 290 includes a pool volume (a pool VOL) 291 that is configured by a physical storage region of an HDD 240. The pool VOL 291 includes a page that is a physical region that is an allocation unit of a virtual VOL 293. A capacity of a page is in the range of several KB to several tens MB.

In the case in which data is written to a predetermined region for the virtual VOL 293, a page 292 of the pool VOL 291 is allocated to the region. In the present embodiment, the JVOLs 252, 253 is configured as the virtual VOL 293. Consequently, since a page 292 is not allocated to a region in which the JVOLs 252, 253 is not used, a storage region of the HDD 240 can be used in an effective manner. Since the JVOLs 252, 253 is not used by a wraparound method in the present embodiment in particular unlike the conventional system, an allocation amount of a page can be reduced.

FIG. 43 is a view showing an example of a pool table in accordance with the embodiment 4.

A pool table 224 is a table that is configured to manage each page 292 of the pool 290 and is stored into the control information 221 of the memory package 220.

The pool table 224 manages a record to which the fields of a page number 224*a*, a start address 224*b*, an end address 224*c*, a state 224*d*, and an allocation destination 224*e* are corresponded. The page number 224*a* stores a page number that identifies a page 292 of the pool 290. The start address 224*b* stores a start address of a page that is corresponded. The end address 224*c* stores an end address of a page 292 that is corresponded. The state 224*d* stores the information that indicates whether the page 292 that is corresponded has been allocated to the virtual volume 293 or has not been allocated to the virtual volume 293. The allocation destination 224*e* stores a virtual volume number to which the page 292 that is corresponded has been allocated. In accordance with the top record of the pool table 224, it is found that the start address is "0" and the end address is "99" for a page that is provided with a page number of "1" and the page has been allocated to the virtual volume 1.

FIG. 44 is a view showing an example of a virtual volume table in accordance with the embodiment 4.

The virtual volume table 225 is a table that is configured to manage an allocation of a page 292 to the virtual volume 293 and is stored into the control information 221 of the memory package 220.

The virtual volume table 225 manages a record that includes the fields of a virtual volume number 225*a*, an address 225*b*, a page allocation state 225*c*, and a page number 225*d*. The virtual volume number 225*a* stores a virtual volume number that identifies a virtual volume 293. The address 225*b* stores a range of an address of the virtual volume 293 that is corresponded. The page allocation state 225*c* stores the information that indicates whether or not the page 292 has been allocated to a region in the range of an address that is corresponded. The page number 225*d* stores a page number that has been allocated to a region that is corresponded. In accordance with the top record of the virtual volume table 225, it is found that the page 292 that is provided with a page number "2" has been allocated to a region of the addresses 0 to 99 of the virtual volume that is provided with a virtual volume number "1".

Figure 45:
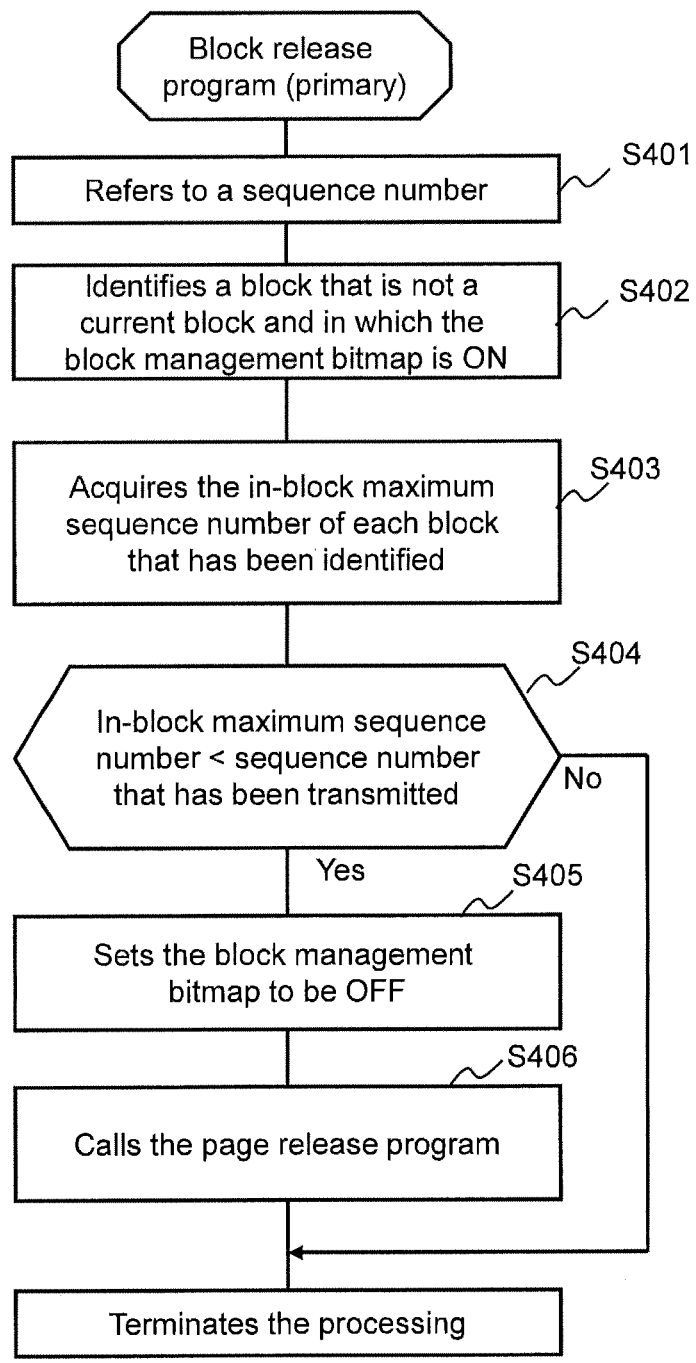
FIG. 45 is a flowchart of a block release processing in accordance with the embodiment 4.

With reference to FIGS. 45 to 48, the following describes the processing for releasing a page that is corresponded to only an unused block by a block release. FIG. 45 is a flowchart of a block release processing in accordance with the embodiment 4. A step S406 for calling a page release program is added immediately after the step S405 of the block release program (primary) 2224 shown in FIG. 24.

Figure 46:
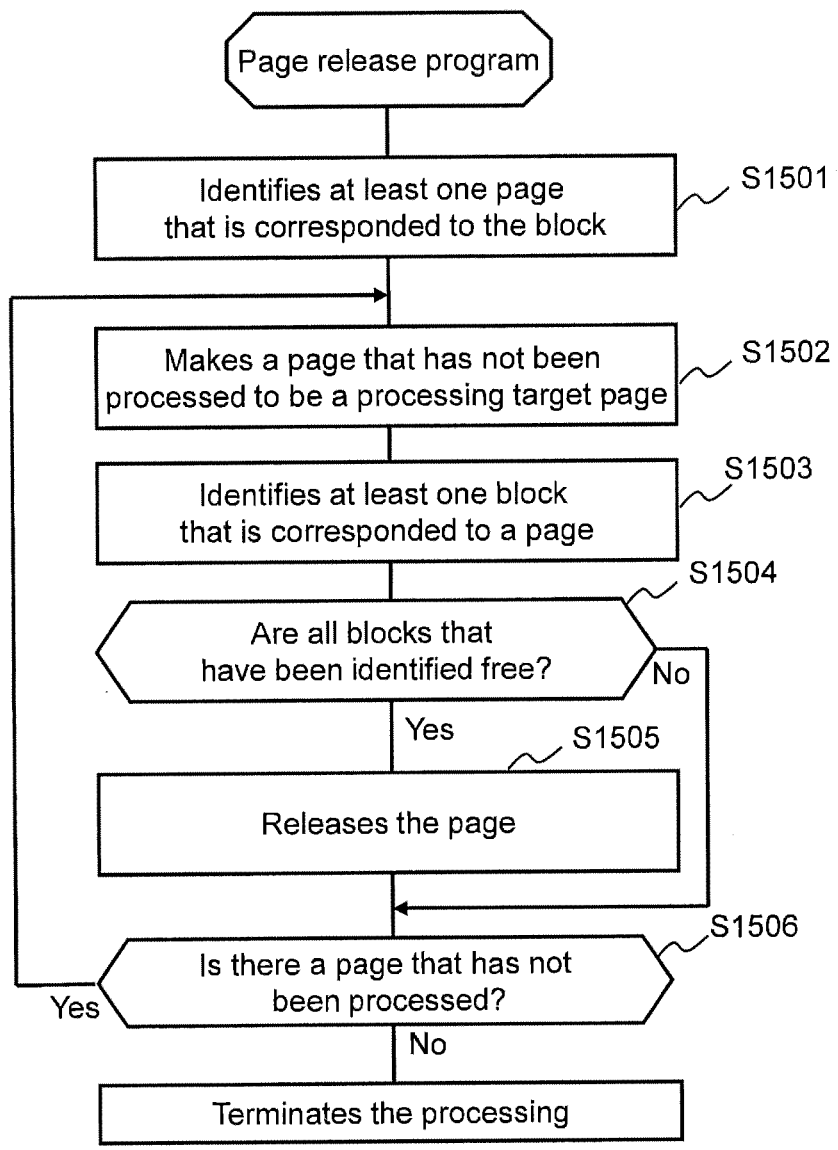
FIG. 46 is a flowchart of a page release processing in accordance with the embodiment 4.
Figure 47:
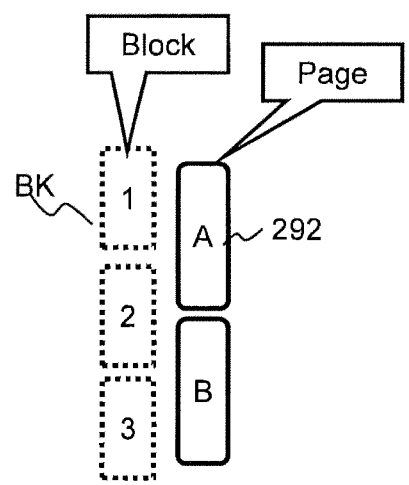
FIG. 47 is a view showing an example of a correspondence relationship between a block and a page in accordance with the embodiment 4.
Figure 48:
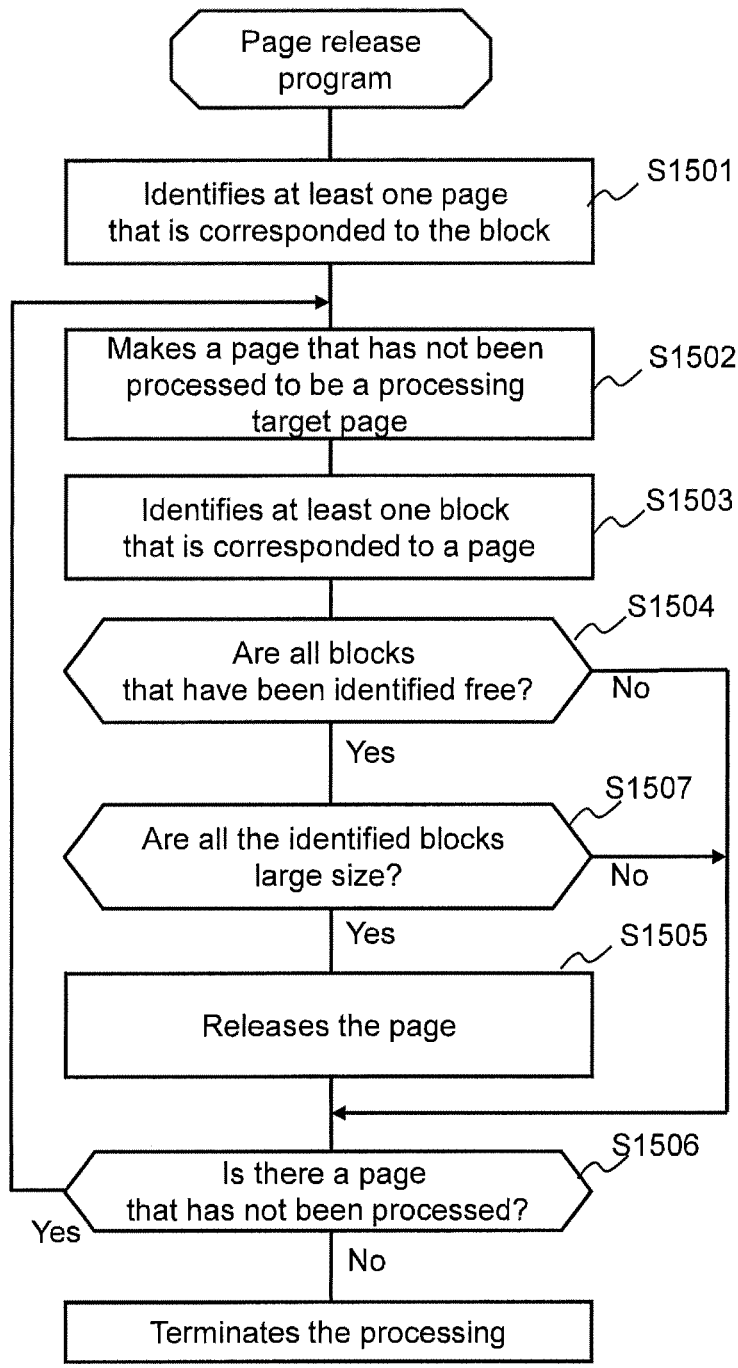
FIG. 48 is a flowchart of a page release processing in accordance with a modified example of the embodiment 4.

FIG. 46 is a view showing an example of a page release program that is called from the step S406 of the block release program (primary) 2224. FIG. 47 is a view showing an example of a correspondence relationship between a block and a page in accordance with the embodiment 4. FIG. 48 is a view showing another example of a page release program.

The processing of FIG. 46 will be described. The page release program identifies at least one page 292 that is corresponded to the block BK (step S1501). A page that is corresponded to a block in which a block number is 1 is a page A in the example of in FIG. 47. Moreover, a page that is corresponded to a block in which a block number is 2 is a page A and a page B. In the next place, the page release program makes a page that has not been processed to be a processing target page (step S1502). In the case in which a block number of a processing target block is 2 in the example shown in FIG. 47 for instance, the page A is a processing target at first. After the steps S1503 to S1505 are executed to the page A, the steps S1503 to S1505 are executed to the page B. In the next place, the page release program identifies at least one block that is corresponded to a page (step S1503). In the case in which the page A shown in FIG. 47 is a processing target for instance, a block 1 and a block 2 are identified.

In the next place, the page release program refers to the block management bitmap 2212 and judges whether or not all blocks that have been identified are free (step S1504). In the case in which all blocks that have been identified are free (Yes for the step S1504) as a result of the judgment, the page release program releases the page (step S1505) and proceeds to the step S1506. In other words, the page release program deletes the allocation information of the corresponded page 292 from the pool table 224 and the virtual volume table 225 and proceeds to the step S1506. On the other hand, in the case in which all blocks that have been identified are not free (No for the step S1504) as a result of the judgment, the page release program proceeds to the step S1506.

In the step S1506, the page release program judges whether or not there is a page 292 that has not been processed. In the case in which there is a page 292 that has not been processed (Yes for the step S1506) as a result of the judgment, the page release program executes the processing from the step S1502. On the other hand, in the case in which there is not a page 292 that has not been processed (No for the step S1506) as a result of the judgment, the page release program terminates the page release processing.

By the page release processing, the page 292 that has been allocated to the block BK that has stored the JNL data 2524 that has been transmitted can be released in an appropriate manner and can be used for an allocation to other region.

For the page release processing shown in FIG. 46, the page 292 that has been allocated to a free block is released. However, there is a high possibility that data is written to the small size block SBK after that and a new page 292 is allocated to the small size block SBK. Consequently, as shown in FIG. 48, the page 292 that has been allocated to the small size block SBK is not released and a load that is required for a reallocation of the page 292 to the small size block SBK can be reduced.

FIG. 48 is a flowchart of a page release processing in accordance with a modified example of the embodiment 4. The parts that are equivalent to those of the page release processing (see FIG. 46) are numerically numbered similarly and the different points will be mainly described.

In the case in which all blocks are free (Yes for the step S1504) as a result of the judgment, the page release program judges whether or not all blocks that have been identified are a large size block LBK (step S1507). In the case in which all blocks that have been identified are large size blocks LBK (Yes for the step S1507) as a result of the judgment, the page release program proceeds to the step S1505 and releases the page 292. On the other hand, in the case in which all blocks that have been identified are not large size blocks LBK (No for the step S1507) as a result of the judgment, the page release program proceeds to the step S1506 without releasing the page 292.

In accordance with this page release processing, the page 292 that has been allocated to the small size block SBK is not released. Consequently, in the case in which the JNL data 2524 is stored into the small size block SBK after that, it is not necessary a processing that is required for a reallocation of the page 292 is executed, whereby a processing load can be reduced.

The virtual volume 293 has a characteristic in which a capacity can be expanded after the virtual volume 293 is created. Here, the processing in the case in which a capacity of the virtual volume 293 is expanded will be described.

Figure 49:
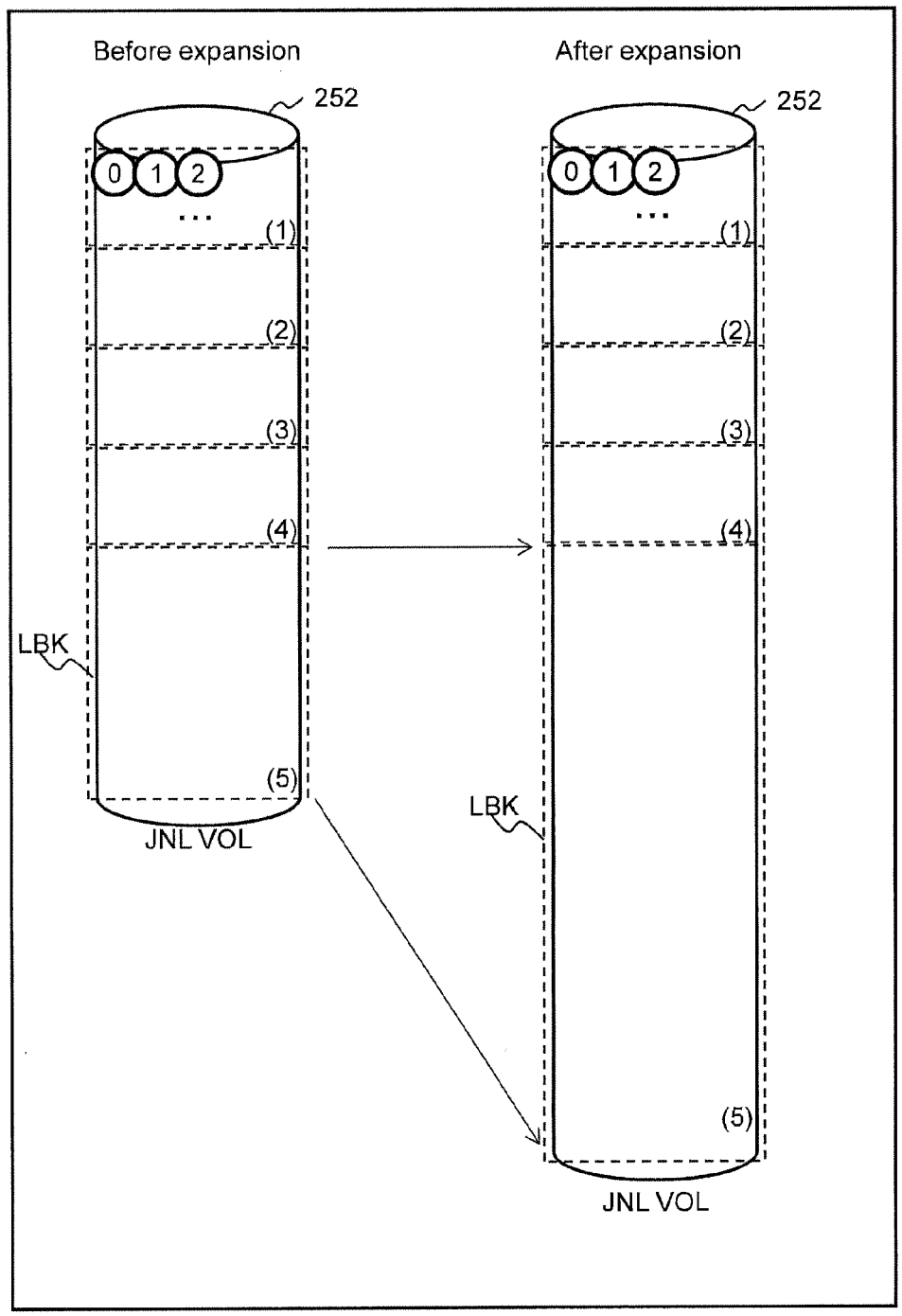
FIG. 49 is a first view illustrating an expansion of a journal volume in accordance with the embodiment 4.

FIG. 49 is a first view illustrating an expansion of a journal volume in accordance with the embodiment 4.

In the case in which a capacity of the JVOL 252 (253) that is shown before an expansion is expanded for instance, only a capacity of the last block (a block of a block number 5 in the figure) of the JVOL 252 can be expanded as shown after an expansion. In this case, since the number of blocks is not modified in accordance with an expansion of a capacity of the JVOL 252, the information amount of the block management bitmap 2212 and the in-block maximum sequence number information 2215 is not modified. Here, the last block can be comprehended as a range from a start address that is calculated by the expression of (a block size of a small size block× the number of small size blocks)+(a block size of a large size block×(the number of large size blocks−1)) to an end address after the expansion of the JVOL 252.

Figure 50:
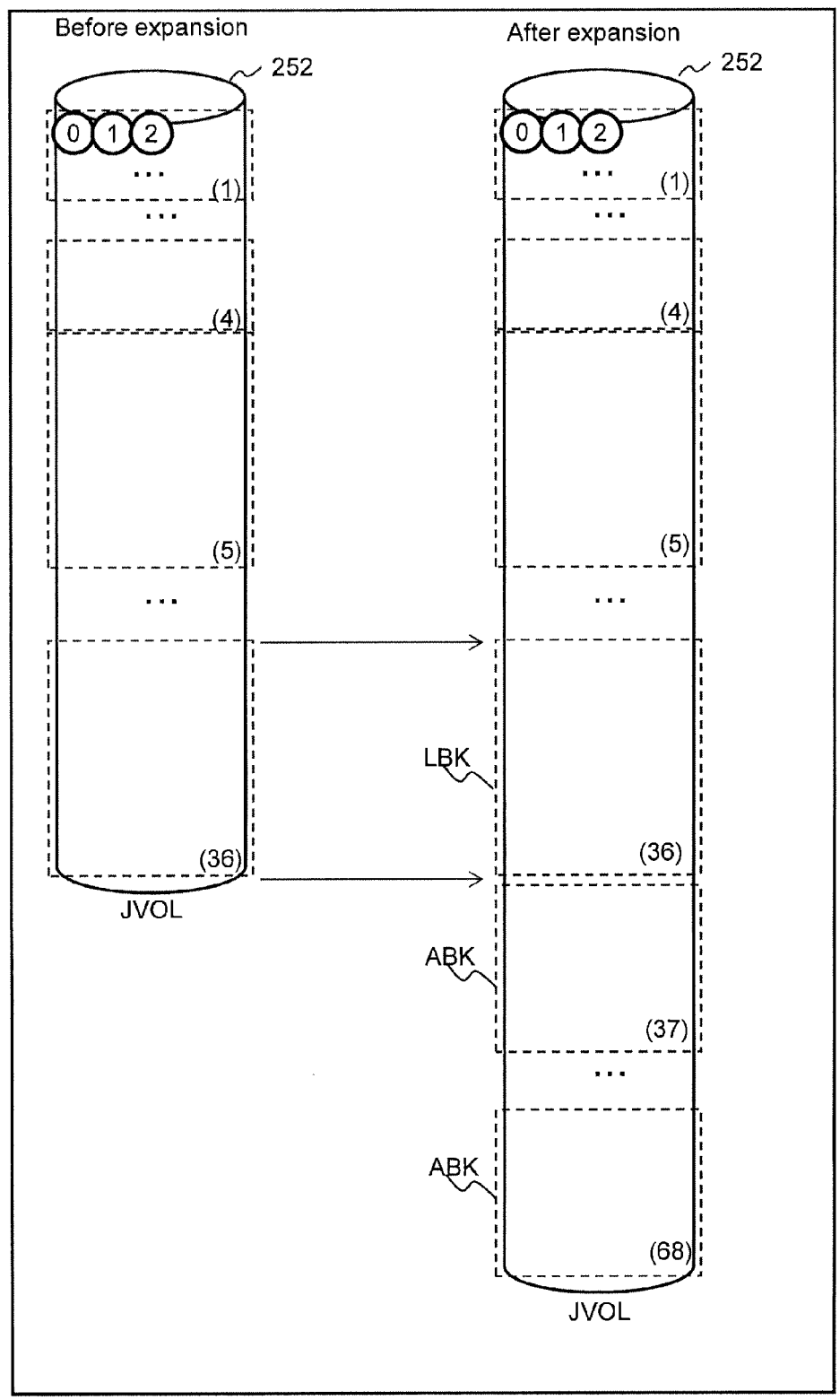
FIG. 50 is a second view illustrating an expansion of a journal volume in accordance with the embodiment 4.

FIG. 50 is a second view illustrating an expansion of a journal volume in accordance with the embodiment 4.

In the case in which a capacity of the JVOL 252 that is shown before an expansion is expanded for instance, the expanded capacity of the JVOL 252 can be divided into a plurality of (32 for instance) blocks (added blocks) ABK and can be managed as shown after an expansion. In this case, it is necessary that a record that is corresponded to the increased blocks ABK is added to the block management bitmap 2212 and the in-block maximum sequence number information 2215. By adopting such a method, a problem in which a usage efficiency of a JVOL is reduced and that has been described in the state 1 of FIG. 41 can be avoided.

Embodiment 5

In the next place, the computer system in accordance with the embodiment 5 will be described in the following.

In the above described embodiment, a management is executed in such a manner that the JNL data 2524 and/or the JNCB 2523 are stored using a block. However, for the computer system in accordance with the embodiment 5, the JNL data 2524 and/or the JNCB 2523 are stored without using a block.

Figure 51:
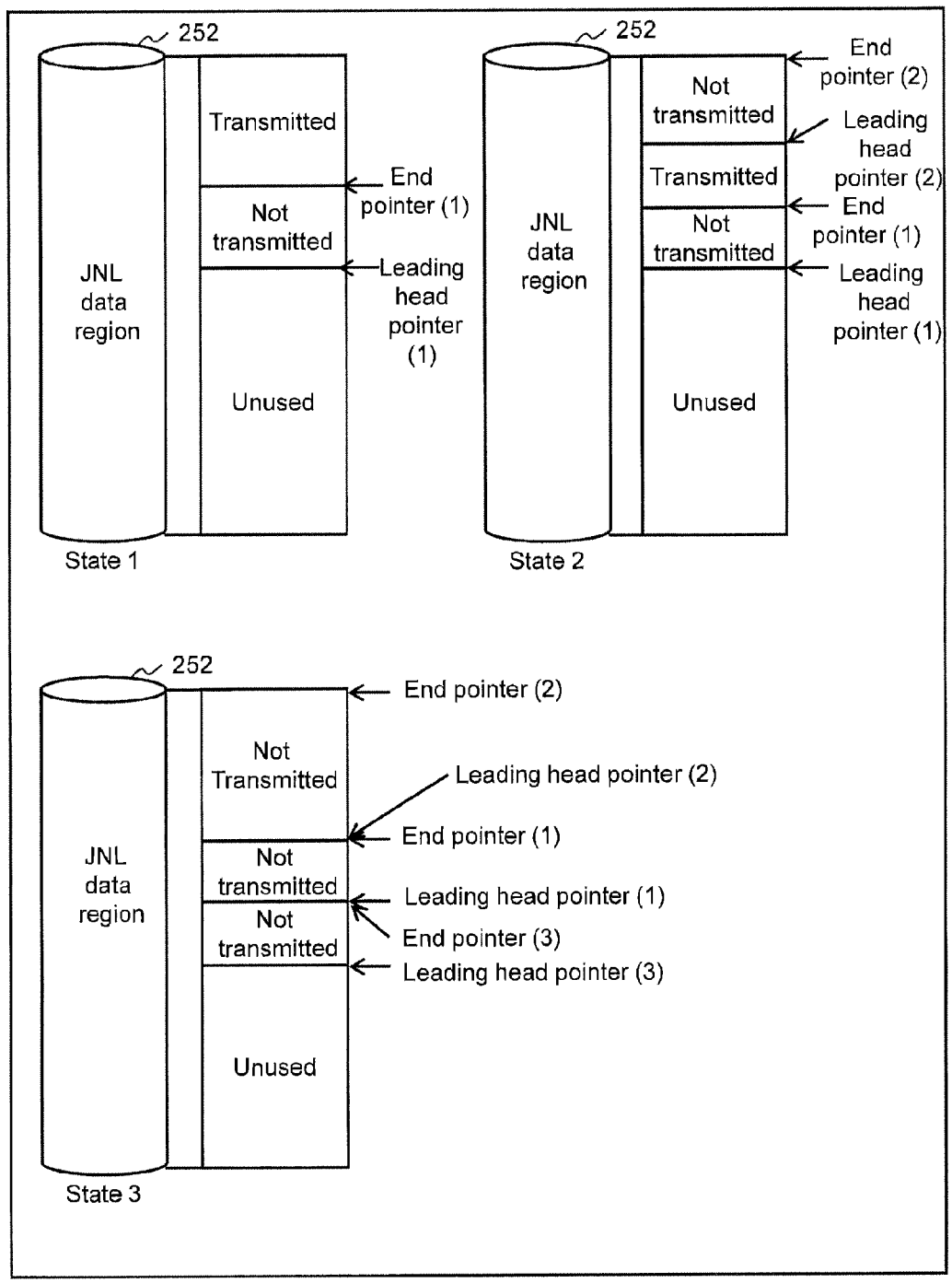
FIG. 51 is a view illustrating a summary of an embodiment 5.

FIG. 51 is a view illustrating a summary of an embodiment 5.

In the present embodiment, as shown in the state 1, a region in which the JNL data 2524 that has not been transmitted has been stored can be managed by managing a pair (the region identification information) of pointers of a leading head pointer (1) that indicates an address of a leading head of a storage destination of the JNL data 2524 that has not been transmitted for the JVOL 252 (253) and an end pointer (1) that indicates an address of an end of the JNL data 2524 that has not been transmitted (an address of a leading head of a storage destination of the JNL data that has been transmitted).

Here, the new JNL data 2524 is stored into a region of the JNL data 2524 that has not been transmitted (a transmitted region) for instance. In other words, in the case in which a region in which the JNL data 2524 that has not been transmitted has been stored is reused, as shown in the state 2, in order to manage a region (a second region) in which the JNL data that has not been transmitted has been stored to a region that is reused, a region of the JNL data 2524 that has not been transmitted for a region that is reused is managed by using another pair of pointers (a leading head pointer (2) and an end pointer (2): the second region identification information).

Moreover, in the case in which the JNL data 2524 is stored to all of regions that is reused, as shown in the state 3, the JNL data 2524 is stored into an unused region after the leading head pointer (1), and a region (a third region) of the JNL data that has not been transmitted is managed by using another pair of pointers (a leading head pointer (3) and an end pointer (3)).

As described above, a region in which of the JNL data that has not been transmitted has been stored can be managed by using a pair of a plurality of pointers (a leading head pointer and an end pointer). Here, in accordance with an order of a pair of pointers that have been created, each JNL data 2524 of a region that is indicated by the pointers is arranged. By this configuration, it can be identified that the JNL data 2524 of a region that is indicated by a pair of pointers that have been created beforehand is the JNL data 2524 that has been created before the JNL data 2524 of a region that is indicated by a pair of pointers that have been created later. Consequently, an occurrence order of the JNL data 2524 can be comprehended in an appropriate manner.

Figure 52:
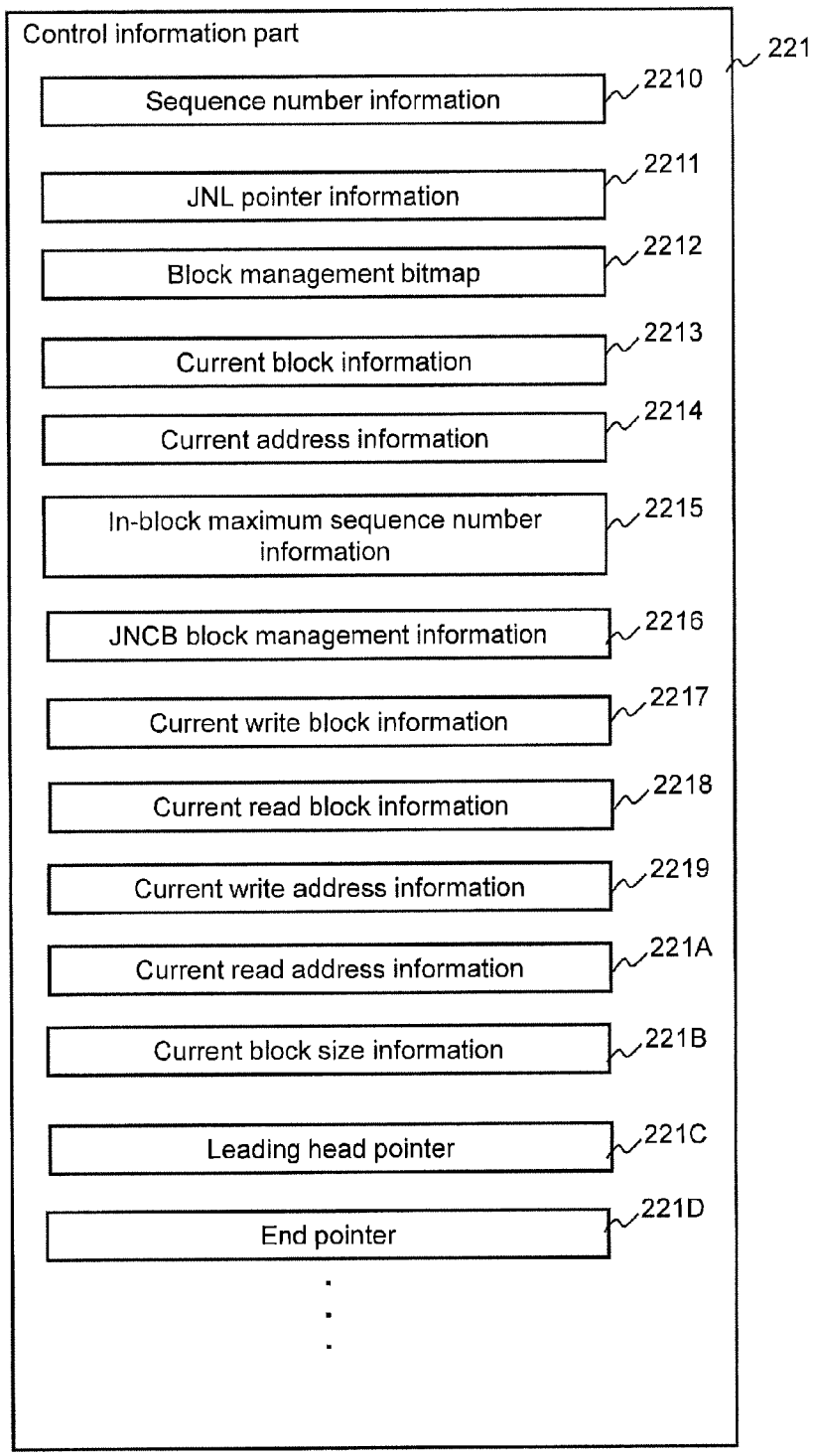
FIG. 52 is a detailed view showing a control information part in accordance with the embodiment 5.

FIG. 52 is a detailed view showing a control information part in accordance with the embodiment 5.

The control information part 221 in accordance with the embodiment 5 further stores a pair of at least one leading head pointer 221C and at least one end pointer 221D (for instance, a leading head pointer (1) and an end pointer (1)) to the control information part 221 in accordance with the embodiment 4.

In the next place, an operation of the computer system in accordance with the embodiment 5 will be described in the following. Here, an operation that is different from that of the embodiment 4 will be described.

Figure 53:
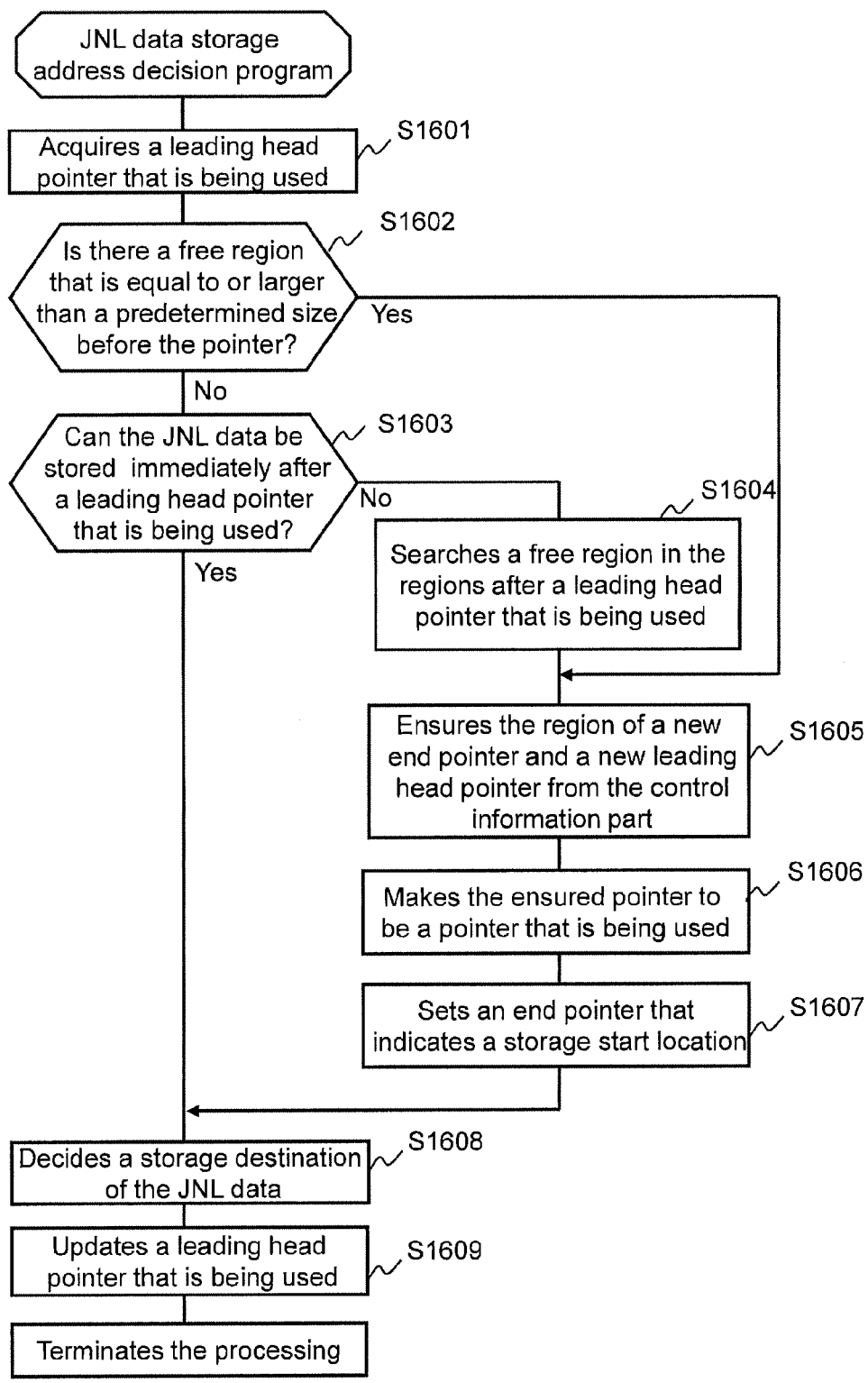
FIG. 53 is a flowchart of a JNL data storage address decision processing in accordance with the embodiment 5.

FIG. 53 is a flowchart of a JNL data storage address decision processing in accordance with the embodiment 5.

A JNL data storage address decision program 2223 acquires a leading head pointer that is being used, that is, a leading head pointer that has been created at last (step S1601) and judges whether or not there is a free region (a transmitted region) that is equal to or larger than a predetermined size before an address that is indicated by the pointer (step S1602).

In the case in which there is not a free region that is equal to or larger than a predetermined size (No for the step S1602) as a result of the judgment, the JNL data storage address decision program 2223 judges whether or not the JNL data 2524 can be stored immediately after an address that is indicated by a leading head pointer that is being used (step S1603). In the case in which the JNL data 2524 can be stored immediately after an address that is indicated by a leading head pointer that is being used (Yes for the step S1603) as a result of the judgment, the JNL data storage address decision program 2223 decides a region immediately after an address that is indicated by a leading head pointer as a storage destination of the JNL data 2524 (step S1608) and updates a leading head pointer that is being used (step S1609).

On the other hand, in the case in which the JNL data 2524 cannot be stored immediately after an address that is indicated by a leading head pointer that is being used (No for the step S1603) as a result of the judgment, the JNL data storage address decision program 2223 searches a free region in the regions after a leading head pointer (step S1604) and proceeds to the step S1605.

Moreover, in the case in which there is a free region that is equal to or larger than a predetermined size (Yes for the step S1602) as a result of the judgment of the step S1602, the JNL data storage address decision program 2223 proceeds to the step S1605.

In the step S1605, the JNL data storage address decision program 2223 ensures a region of a pair of new pointers (an end pointer and a leading head pointer) for the control information part 220, makes the ensured pointer to be a pointer that is being used (step S1606), and sets an end pointer in such a manner that the end pointer indicates a leading head address of a free region (step S1607). In the next place, a region immediately after an address that is indicated by an end pointer is decided as a storage destination of the JNL data 2524 (step S1608) and a leading head pointer that is being used is updated (step S1609). By these steps, in the case in which there is a free region that is equal to or larger than a predetermined size in the regions before a leading head pointer that is being used, the JNL data 2524 can be stored into the free region. In the present embodiment, by making a size of a free region to be equal to or larger than a predetermined size, the number of pairs of pointers for managing a region that stores the JNL data 2524 that has not been transmitted can be reduced. Regardless of a size of a free region, a free region can also be used in the case in which there is a free region. In the case in which a free region cannot be found in the step S1604, since a free region does not exist in the JVOL 252, an abnormal termination is executed.

Figure 54:
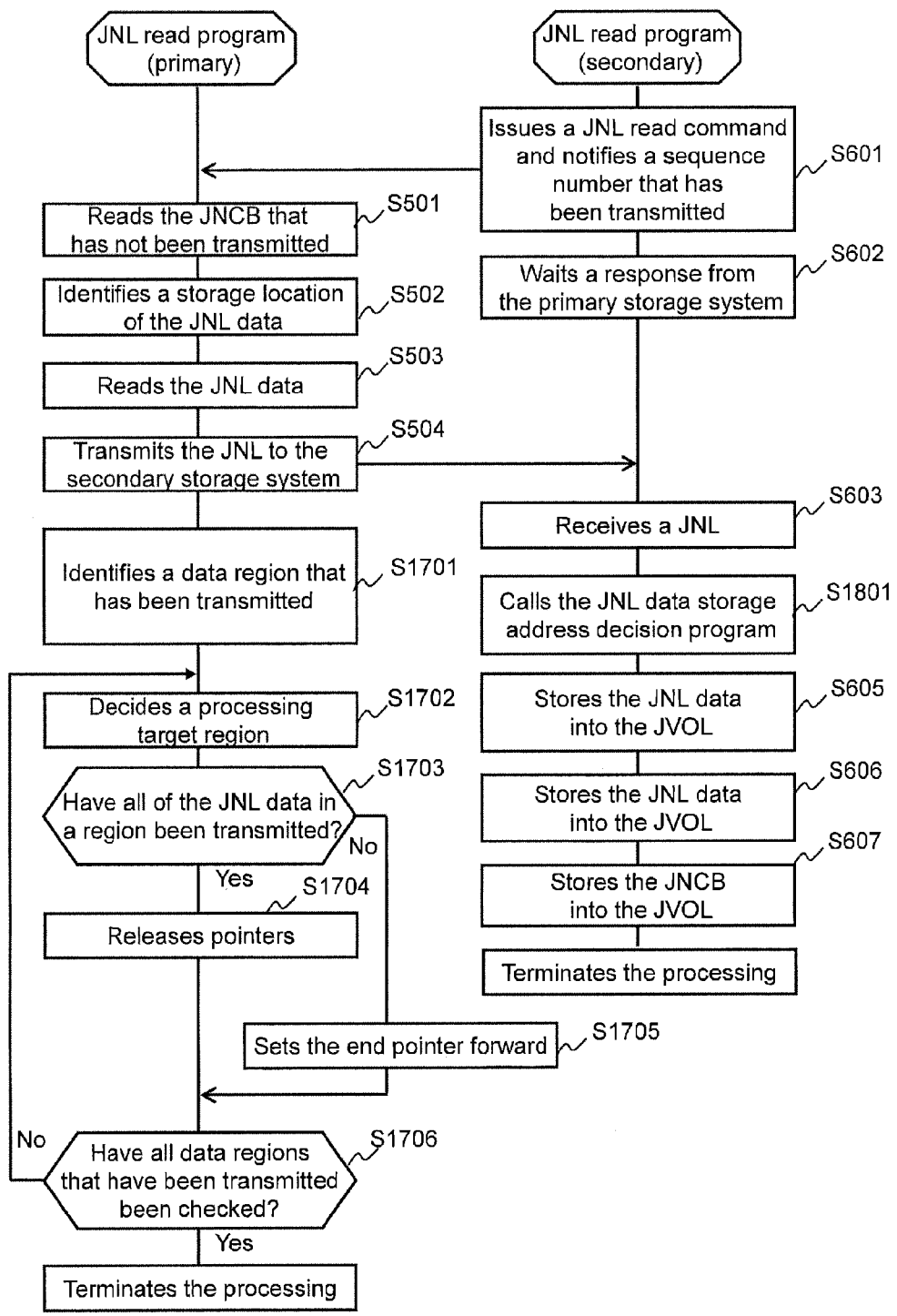
FIG. 54 is a flowchart of a JNL read processing in accordance with the embodiment 5.

FIG. 54 is a flowchart of a JNL read processing in accordance with the embodiment 5. The parts that are equivalent to those of the JNL read processing (see FIG. 25) are numerically numbered similarly and the different points will be mainly described.

For the primary storage system 200A, after the JNL read program (primary) 2226 transmits the JNL (the JNCB 2523 and the JNL data 2524) that has been read to the secondary storage system 200B (step S504), and identifies all regions in which data that has been transmitted has been stored (step S1701). Here, the region in which data that has been transmitted has been stored is a region that is indicated by a pair of pointers. In the next place, one processing target is decided from at least one identified region (step S1702).

In the next place, the JNL read program (primary) 2226 judges whether or not all of the JNL data 2524 in a region that has been decided have been transmitted (step S1703). Here, whether or not all of the JNL data 2524 in a region have been transmitted can be judged by whether or not a region that is indicated by a pair of pointers that are corresponded is included in a data region that has been identified in the step S1701.

In the case in which all of the JNL data 2524 in a region have been transmitted (Yes for the step S1703) as a result of the judgment, the JNL read program (primary) 2226 releases a pair of pointers that are corresponded (step S1704) and proceeds to the step S1706.

On the other hand, in the case in which all of the JNL data 2524 in a region have not been transmitted (No for the step S1703) as a result of the judgment, the JNL read program (primary) 2226 sets the end pointer of a pair of pointers that are corresponded forward to a location of the JNL data 2524 that has been transmitted (step S1705) and proceeds to the step S1706.

In the step S1706, the JNL read program (primary) 2226 judges whether or not all regions of the JNL data 2524 that has been transmitted have been checked. In the case in which all regions of the JNL data 2524 that has been transmitted have not been checked (No for the step S1706) as a result of the judgment, the JNL read program (primary) 2226 proceeds to the step S1702. On the other hand, in the case in which all regions of the JNL data 2524 that has been transmitted have been checked (Yes for the step S1706) as a result of the judgment, the JNL read program (primary) 2226 terminates the processing.

For the secondary storage system 200B, in the case in which a JNL is received from the primary storage system 200A (step S603), the JNL read program (secondary) 2227 calls the JNL data storage address decision program 2223 (step S1801). For the secondary storage system 200B, the JNL data storage address decision processing shown in FIG. 53 is executed and a block and an address of the JVOL 253 that stores the JNL data 2524 are decided.

FIG. 55 is a flowchart of a restore processing in accordance with the embodiment 5. The parts that are equivalent to those of the restore processing (see FIG. 26) are numerically numbered similarly and the different points will be mainly described.

For the secondary storage system 200B, after the restore program 2228 stores the maximum sequence number that has been restored as a restored sequence number (step S706), the restore program 2228 identifies all regions in which the restored data has been transmitted (step S1901). Here, the region in which the restored data has been transmitted is a region that is identified by a pair of pointers. In the next place, one processing target region is decided from at least one identified region (step S1902).

In the next place, the restore program 2228 judges whether or not all of the JNL data 2524 in a region that has been decided has been restored (step S1903). Here, whether or not all of the JNL data 2524 in a region that has been decided has been restored can be judged by whether or not a region that is indicated by a pair of pointers that are corresponded is included in a data region that has been identified in the step S1901.

In the case in which all of the JNL data 2524 in a region has been restored (Yes for the step S1903) as a result of the judgment, the restore program 2228 releases a pair of pointers that are corresponded (step S1904) and proceeds to the step S1906.

On the other hand, in the case in which all of the JNL data 2524 in a region has not been restored (No for the step S1903) as a result of the judgment, the restore program 2228 sets the end pointer of a pair of pointers that are corresponded forward to a location of the JNL data 2524 that has been restored (step S1905) and proceeds to the step S1906.

In the step S1906, the restore program 2228 judges whether or not all regions of the JNL data 2524 that has been restored have been checked. In the case in which all regions of the JNL data 2524 that has been used for a restore have not been checked (No for the step S1906) as a result of the judgment, the restore program 2228 proceeds to the step S1902. On the other hand, in the case in which all regions of the JNL data 2524 that has been used for a restore have been checked (Yes for the step S1906) as a result of the judgment, the restore program 2228 terminates the processing.

While the preferred embodiments in accordance with the present invention have been described above, the present invention is not restricted to the embodiments, and the present invention can be applied to a wide variety of other modes.

For instance, the present invention is applied to a management of a JNL for the JVOL 252 that stores a JNL on a temporary basis in the above embodiments. However, the present invention is not restricted to the embodiments. In the case in which the monitor data that is related to an I/O (input/output) of the computer system 10 is transmitted to an apparatus that is configured to use the monitor data for instance, the present invention can be applied to a management of the monitor data for a buffer region (for instance, a volume) that is used as a buffer that stores the monitor data on a temporary basis. The point is that the present invention can be applied to a management of the data for a region that is used as a buffer that stores data on a temporary basis.

REFERENCE SIGNS LIST

10: Computer system
100: Host
100A: Primary host
100B: Secondary host
200: Storage system
200A: Primary storage system
200B: Secondary storage system

The invention claimed is:
1. A storage system comprising:
a plurality of physical storage devices;
a cache memory;
a control device that is coupled to the plurality of physical storage devices and the cache memory; and
a buffer that is at least a part of a storage region of the plurality of physical storage devices,
wherein the control device is configured to, in a case in which there is a new target data element which will be stored in the buffer:
(x1) determine whether or not the buffer has a buffer region whose state means transmitted,
(x2) if the determination result of (x1) is false, change the state of the buffer region from unused, which means data has not yet been stored, to used, which means that data has been stored but has not yet been transmitted, allocate a cache region of the cache memory to the buffer region and store the new target element data in the allocated cache region, and

(x3) if the determination result of (x1) is true, change the state of the buffer region from transmitted to used, and store the new target element data in a cache region which has been already allocated to the buffer region, and, the control device is configured to transmit a target data element from the cache region which is allocated to the buffer region whose state means used, to a predetermined target, and change the state of the buffer region from used to transmitted.

2. A storage system according to claim 1, wherein:

the buffer region is divided into a plurality of blocks; and in the case in which there is a new target data element which will be stored in the buffer, the control device is configured to decide a second block as a stored destination of the new target data element when there is not a free region in a first block of a predetermined write target and when there is the second block that is a block prior to the first block and in which all target data elements have been transmitted, and the control device is configured to decide a third block that is provided with a free region subsequent to the first block as a stored destination of the target data element when there is not the second block.

3. A storage system according to claim 2, wherein:

the plurality of blocks includes a plurality of blocks of a small size that is a first storage capacity smaller than a storage capacity of the cache memory.

4. A storage system according to claim 3, wherein:

the plurality of blocks includes at least one block of a large size of a second storage capacity larger than the first storage capacity.

5. A storage system according to claim 4, wherein:

the block of a small size is allocated to a storage region on a leading head side of the buffer from the block of a large size.

6. A storage system according to claim 5, wherein:

in the case in which there is a new target data element which will be stored in the buffer, the control device is configured to decide a fourth block as a stored destination of the new target data element when a block of a write target is the block of a large size and when there is the fourth block that is a block prior to the block of a large size and in which all target data elements have been transmitted.

7. A storage system according to claim 6, wherein:

the buffer is a journal volume in which a journal is stored wherein the journal includes data that is transmitted by a remote copy between storage systems and that is stored into a volume of a copy source or a copy destination; and the target data element is the data in the journal.

8. A storage system according to claim 2, wherein:

in the case in which there is a new target data element which will be stored in the buffer, in the case in which the new target data element is generated in order of precedence, the control device is configured to store the new target data element from a storage region capable of storing on a leading head of the buffer in order of precedence and to update a region identification information that is configured to identify the storage region of the buffer part of at least one target data element that has not been transmitted to the predetermined target;

the control device is configured to read the target data element from the storage region of a leading head of the buffer in order of precedence, to transmit the target data element, and to update the region identification information; and in the case in which the new target data element is generated after a storage capacity from a leading head of the buffer to the storage region that is identified by the region identification information becomes a predetermined storage capacity, the control device is configured to store the new target data element that has been generated from the storage region of the leading head of the buffer in order of precedence.

9. A storage system according to claim 2, wherein:

there are a plurality of logical regions based on the plurality of physical storage devices, the buffer is a virtual volume that is a virtual logical volume, the control device is configured to allocate any one of the plurality of logical regions to a block that is a block of a stored destination of the target data element and that is a block of the virtual volume, and in the case in which there is a new target data element which will be stored in the buffer, if there is the second block in the buffer, a logical region which has been allocated to the second block is a destination of the target data element, in the case in which there is a new target data element which will be stored in the buffer, if there is not the second block in the buffer, a logical region which is allocated to a third block in the buffer is a destination of the target data element.

10. A storage system according to claim 1, wherein:

there are a plurality of logical regions based on the plurality of physical storage devices, the buffer is a virtual volume that is a virtual logical volume, the control device is configured to allocate any one of the plurality of logical regions to a virtual region that is a region of a stored destination of the target data element and that is a region of the virtual volume, and in the case in which there is a new target data element which will be stored in the buffer, the control device is configured to decide a write destination of the target data element as a virtual region in which a logical region has been allocated as long as a predetermined condition is satisfied.

11. A data management method for a storage system that is provided with a plurality of physical storage devices, a cache memory, and a buffer that is at least a part of a storage region of the plurality of physical storage devices, comprising the steps of:

in the case in which there is a new target data element which will be stored in the buffer:

(x1) determining whether or not the buffer has a buffer region whose state means transmitted, (x2) if the determination result of (x1) is false, changing the state of the buffer region from unused, which means data has not yet been stored, to used, which means that data has been stored but has not yet been transmitted, allocating a cache region of the cache memory to the buffer region and storing the new target element data in the allocated cache region; and (x3) if the determination result of (x1) is true, changing the state of the buffer region from transmitted to used, and storing the new target element data in a cache region which has been already allocated to the buffer region; and transmitting a target data element from the cache region which is allocated to the buffer region whose state means used, to a predetermined target, and changing the state of the buffer region from used to transmitted.

* * * * *